US012659631B2

(12) United States Patent　　　　　(10) Patent No.:　US 12,659,631 B2
Duthel et al.　　　　　　　　　　　　(45) Date of Patent: 　Jun. 16, 2026

(54) SYSTEMS AND METHODS FOR OPTIMIZATION OF TRANSMISSION SIGNAL QUALITY IN POINT-TO-MULTIPOINT NETWORKS

(71) Applicant: Infinera Corp., San Jose, CA (US)

(72) Inventors: Thomas Duthel, Nuremberg (DE); Amir Rashidinejad, Kanata (CA); Christopher R.S. Fludger, Nuremberg (DE); Steven Joseph Hand, Los Gatos, CA (US)

(73) Assignee: Infinera Corp.

( * ) Notice: Subject to any disclaimer, the term of this patent is extended or adjusted under 35 U.S.C. 154(b) by 356 days.

(21) Appl. No.: 18/545,427

(22) Filed: Dec. 19, 2023

(65) Prior Publication Data

US 2024/0259101 A1　　Aug. 1, 2024

Related U.S. Application Data

(63) Continuation of application No. 18/508,131, filed on Nov. 13, 2023.

(Continued)

(51) Int. Cl.
| | |
|---|---|
| *H04Q 11/00* | (2006.01) |
| *H04B 10/079* | (2013.01) |
| *H04B 10/27* | (2013.01) |
| *H04B 10/272* | (2013.01) |
| *H04B 10/293* | (2013.01) |

(Continued)

(52) U.S. Cl.
CPC ... *H04Q 11/0062* (2013.01); *H04B 10/07953* (2013.01); *H04B 10/27* (2013.01); *H04B 10/272* (2013.01); *H04B 10/2933* (2013.01);

*H04B 10/40* (2013.01); *H04B 10/564* (2013.01); *H04B 10/61* (2013.01); *H04Q 2011/0083* (2013.01);

(Continued)

(58) Field of Classification Search
CPC ....... H04Q 11/0062; H04Q 2011/0083; H04Q 2011/0084; H04Q 2011/0086; H04Q 2011/0096; H04B 10/07953; H04B 10/27; H04B 10/272; H04B 10/2933
See application file for complete search history.

(56) References Cited

U.S. PATENT DOCUMENTS

| | | | | |
|---|---|---|---|---|
| 2006/0188258 | A1* | 8/2006 | Gumaste | ............. H04J 14/0238 398/59 |
| 2012/0070154 | A1* | 3/2012 | Portier | ............. H04B 10/07955 398/136 |

(Continued)

*Primary Examiner* — Pranesh K Barua

(57) ABSTRACT

Disclosed herein are methods and systems for optimizing signal quality in an optical network having two or more hub nodes continuously outputting optical signals to a plurality of leaf nodes. Each of the plurality of leaf nodes may receive a combined optical signal from the hub nodes and determine an optical power and a signal quality of one optical subcarrier group and send a correction signal to the hub node that sent the subcarrier group. The hub nodes may send a power optimization request comprising the optical power and signal quality of each subcarrier group to a network controller. The network controller may use the optical power and signal quality to determine a power update for an optical power of the subcarrier group(s) and send the power update to the hub node transmitting the subcarrier group. The hub node may adjust the optical power based on the power update.

20 Claims, 31 Drawing Sheets

Related U.S. Application Data

(60) Provisional application No. 63/444,653, filed on Feb. 10, 2023, provisional application No. 63/444,649, filed on Feb. 10, 2023, provisional application No. 63/444,652, filed on Feb. 10, 2023, provisional application No. 63/424,548, filed on Nov. 11, 2022.

(51) Int. Cl.

| | | |
|---|---|---|
| *H04B 10/40* | (2013.01) | |
| *H04B 10/564* | (2013.01) | |
| *H04B 10/61* | (2013.01) | |

(52) U.S. Cl.
CPC .............. *H04Q 2011/0084* (2013.01); *H04Q 2011/0086* (2013.01); *H04Q 2011/0096* (2013.01)

(56) References Cited

U.S. PATENT DOCUMENTS

| 2015/0188637 | A1* | 7/2015 | Tanimura | ................ H04J 14/06 |
| | | | | 398/184 |
| 2015/0311975 | A1* | 10/2015 | Pelouch | ................. H04J 14/02 |
| | | | | 398/79 |
| 2016/0112155 | A1* | 4/2016 | Koga | ................... H04B 10/613 |
| | | | | 714/776 |
| 2017/0264371 | A1* | 9/2017 | Fukui | ................. H04J 14/0307 |
| 2018/0294875 | A1* | 10/2018 | Okano | ............ H04B 10/07955 |
| 2019/0149239 | A1* | 5/2019 | Tehrani | ................... G06F 17/18 |
| | | | | 398/183 |
| 2021/0021365 | A1* | 1/2021 | Hand | ................... H04J 14/022 |

\* cited by examiner

SYSTEMS AND METHODS FOR OPTIMIZATION OF TRANSMISSION SIGNAL QUALITY IN POINT-TO-MULTIPOINT NETWORKS

CROSS-REFERENCE TO RELATED APPLICATION

The entirety of the following patent applications are hereby expressly incorporated herein by reference: U.S. Provisional Application No. 63/424,548, entitled "Transmitter output power optimization in a point to multi-point network" filed Nov. 11, 2022, to which the present application claims priority; U.S. Provisional Application No. 63/444,649, entitled "Transmit Output Power Optimization In A Point To Multi-Point Network" filed Feb. 10, 2023, to which the present application claims priority; U.S. Provisional Application No. 63/444,652 entitled "Transmit Output Power Optimization In A Point To Multi-Point Network" filed Feb. 10, 2023, to which the present application claims priority; and U.S. Provisional Application No. 63/444,653 entitled "Transmit Output Power Optimization In A Point To Multi-Point Network" filed Feb. 10, 2023, to which the present application claims priority.

BACKGROUND

Optical networking is a communication means that utilizes signals encoded in light to transmit information, e.g., data, as an optical signal in various types of telecommunications networks. Optical networking may be used in relatively short-range networking applications such as in a local area network (LAN) or in long-range networking applications, such as those spanning countries, continents, and/or oceans. Generally, optical networks utilize optical amplifiers, a light source such as lasers or light emitting diodes (LEDs), and wavelength division multiplexing to enable high-bandwidth communication.

In an optical point to multi-point network, a hub node can receive an optical signal comprised of digital subcarriers sent from a group of leaf nodes and can send an optical signal comprising groups of digital subcarriers to the group of leaf nodes. The leaf nodes can be located in several geographically diverse locations, which means each subcarrier (or subcarrier group) can experience individual clock and carrier frequencies, as well as different link impairments like optical filtering, chromatic dispersion (CD), differential group delay (DGD) and fiber attenuation.

Link impairments can lead to performance degradation in a receiver node. It is important to note that performance degradation due to link losses (and the subsequently added noise) cannot be undone. To overcome the different link losses, optical output power of subcarriers on a transmitter node can be controlled. One approach would be to control a subchannel output power such that the received power is equal for all subchannels. But this may not be optimal from a system performance point of view.

SUMMARY OF THE INVENTION

The presently disclosed inventive concepts solve the problems of signal quality degradation by gathering feedback from one or more points in the network node in the form of signal quality metrics. The signal quality metrics may be used to control output power of the transmitter node for subcarriers and/or subcarrier groups in order to adjust signal quality of the subcarriers and/or subcarrier groups in respect to a target or target range (which may be referred to as a target margin).

In one implementation, an optical transport network system, may comprise: a leaf node of an optical network, comprising: a coherent optical transceiver configured to receive an optical signal continuously transmitted from a hub node over a link connecting the leaf node and the hub node, the optical signal continuously transmitted at a first output power; and signal quality correction circuitry configured to determine a signal quality of the optical signal and send the signal quality to a hub node processor of the hub node, wherein the hub node processor is configured to compare the signal quality of the optical signal to a target signal quality margin, determine that the signal quality of the optical signal is outside the target signal quality margin, adjust the first output power of the optical signal to a second output power different than the first output power, thereby adjusting the signal quality, and continuously transmit the optical signal at the second output power.

The exemplary leaf node, wherein the optical transceiver further comprises a coherent optical receiver and an analog to digital converter configured to convert the optical signal into a digital signal and the signal quality correction circuitry further comprises a digital signal processor, comprising: a digital demodulator and a bits-to-symbol component configured to receive the digital signal and map each bit in the digital signal to a symbol in a constellation; and a processor configured to determine the signal quality of the digital signal using the symbols in the constellation and send the signal quality to the hub node processor of the hub node.

The exemplary leaf node, wherein the signal quality is quantified as one or more of: a signal to noise ratio, a bit error rate, a quality factor, mutual information, and error vector magnitude, combinations thereof.

The exemplary leaf node, wherein the optical signal comprises at least one subcarrier group comprising a plurality of optical subcarriers, wherein a first one of the plurality of optical subcarriers has a first level of optical power and a second one of the plurality of optical subcarriers has a second level of optical power different than the first level of optical power, and the processor is further configured to determine a first signal quality of the first one of the plurality of optical subcarriers and a second signal quality of the second one of the plurality of optical subcarriers using the symbols in the constellation and send the first signal quality and the second signal quality to the hub node processor of the hub node; and wherein the hub node processor is configured to compare the first signal quality of the first one of the plurality of optical subcarriers to a first target signal quality margin and the second signal quality of the second one of the plurality of optical subcarriers to a second target signal quality margin and adjust the first output power of the optical signal to the second output power and continuously transmit the optical signal at the second output power when the hub node processor determines that the first signal quality of the first one of the plurality of optical subcarriers is outside the first target signal quality margin or the second signal quality of the second one of the plurality of optical subcarriers is outside the second target signal quality margin.

The exemplary leaf node, wherein the first optical signal comprises a plurality of optical subcarrier groups each comprising a plurality of optical subcarriers, and wherein the target signal quality margin is determined based on reducing a difference in signal quality between the plurality of optical subcarrier groups while keeping the signal quality within a predetermined range.

An exemplary hub node of an optical network, comprising: an optical transceiver having a coherent optical receiver and an analog to digital converter configured to convert an optical signal into a digital signal; a digital signal processor receiving the digital signal from the optical transceiver, the digital signal including at least a first digital subcarrier group, the digital signal processor configured to determine a first signal quality of the first digital subcarrier group; and a node controller having a node processor and a node memory storing processor executable code that, when executed, causes the node processor to: receive the first signal quality of the first digital subcarrier group from the digital signal processor; compare the first signal quality of the first digital subcarrier group to a first target signal quality margin; determine that the first signal quality is outside the first target signal quality margin; determine a first power adjustment for the first digital subcarrier group; and send a power adjustment signal comprising the first power adjustment to a leaf node that transmitted the first received digital subcarrier group.

The exemplary hub node, wherein the first signal quality is quantified as one or more of: a signal to noise ratio, a bit error rate, a quality factor, an error vector magnitude, mutual information, and combinations thereof.

An exemplary hub node of an optical network, comprising: a digital signal processor supplying outputs based on a plurality of independent data streams, the outputs including a first digital subcarrier having a first frequency bandwidth and a second digital subcarrier having a second frequency bandwidth different than the first frequency bandwidth, the digital signal processor configured to control a first power level of the first digital subcarrier and a second power level of the second digital subcarrier; an optical transceiver having a digital to analog converter and an optical transmitter configured to convert outputs of the digital signal processor to an optical signal and transmit the optical signal to a leaf node over an optical link; and a node controller having a node processor and a node memory storing processor executable code that, when executed, causes the node processor to: determine a power adjustment of at least one of the first power level of the first digital subcarrier and the second power level of the second digital subcarrier when the node processor determines that a first signal quality, received from the leaf node that received the first digital subcarrier, is outside a first target signal quality margin or a second signal quality, received from the leaf node that received the second digital subcarrier, is outside a second target signal quality and adjust at least one of the first power level of the first digital subcarrier and the second power level of the second digital subcarrier using the power adjustment.

Implementations of the above techniques include methods, apparatus, systems, networks, and computer program products. One such computer program product is suitably embodied in one or more non-transitory machine-readable media that stores instructions executable by one or more processors. The instructions are configured to cause the one or more processors to perform the above-described actions.

The details of one or more implementations of the subject matter of this specification are set forth in the accompanying drawings and the description below. Other aspects, features, and advantages will become apparent from the description, the drawings, and the claims.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale, or in schematic in the interest of clarity and conciseness. Not every component may be labeled in every drawing. Like reference numerals in the figures may represent and refer to the same or similar element or function. In the drawings.

DETAILED DESCRIPTION

Figures 1, 2:
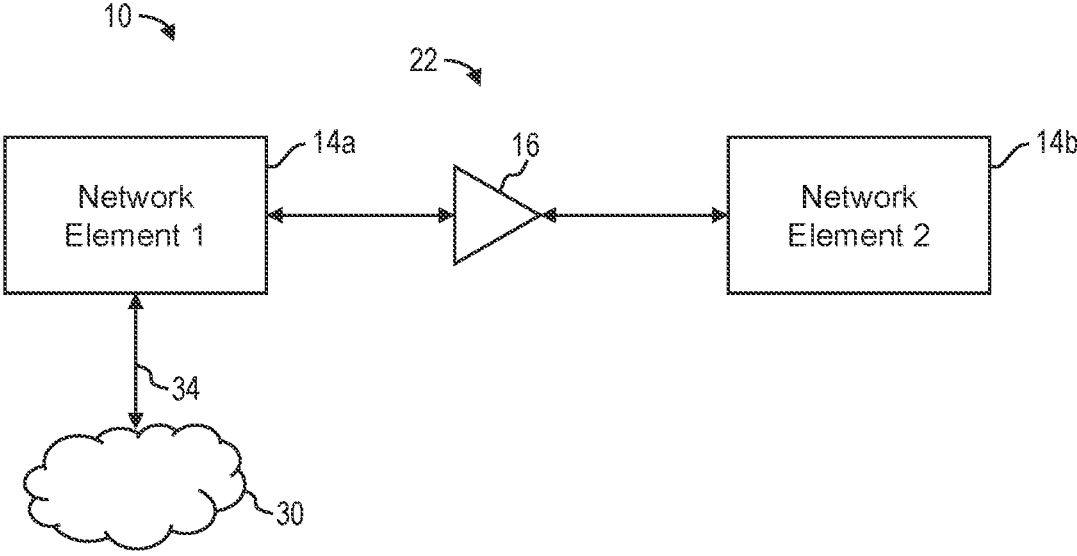
FIG. 1 is a block diagram of an exemplary implementation of a transport network constructed in accordance with the present disclosure.
FIG. 2 is a diagram of an exemplary implementation of a computer system shown in FIG. 1 and constructed in accordance with the present disclosure.

The following detailed description of exemplary embodiments refers to the accompanying drawings. The same reference numbers in different drawings may identify the same or similar elements.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The disclosure is capable of other embodiments or of being practiced or carried out in various ways. Also, it is to be understood that the phraseology and terminology employed herein are for purposes of description and should not be regarded as limiting.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise. Further, use of the term "plurality" is meant to convey "more than one" unless expressly stated to the contrary.

As used herein, qualifiers like "about," "approximately," and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

The use of the term "at least one" or "one or more" will be understood to include one as well as any quantity more than one. In addition, the use of the phrase "at least one of X, Y, and Z" will be understood to include X alone, Y alone, and Z alone, as well as any combination of X, Y, and Z.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

As used herein, any reference to "one embodiment," "an embodiment," "some embodiments," "one implementation," "some implementations," "an implementation," "one example," "for example," or "an example" means that a particular element, feature, structure, or characteristic described in connection with the embodiment/implementation/example is included in at least one embodiment/implementation/example and may be used in conjunction with other embodiments/implementations/examples. The appearance of the phrase "in some embodiments" or "one example" or "in some implementations" in various places in the specification does not necessarily all refer to the same embodiment/implementation/example, for example.

Circuitry, as used herein, may be analog and/or digital components referred to herein as "blocks", or one or more suitably programmed processors (e.g., microprocessors) and associated hardware and software, or hardwired logic. Also, "components" or "blocks" may perform one or more functions. The term "component" or "block" may include hardware, such as a processor (e.g., a microprocessor), a combination of hardware and software, and/or the like. Software may include one or more processor-executable instructions that when executed by one or more components cause the component to perform a specified function. It should be understood that the algorithms described herein may be stored on one or more non-transitory memory. Exemplary non-transitory memory may include random access memory, read-only memory, flash memory, and/or the like. Such non-transitory memory may be electrically based, optically based, and/or the like.

Software may include one or more processor-readable instruction that when executed by one or more component, e.g., a processor, causes the component to perform a specified function. It should be understood that the algorithms described herein may be stored on one or more non-transitory processor-readable medium, which is also referred to herein as a non-transitory memory. Exemplary non-transitory processor-readable mediums may include random-access memory (RAM), a read-only memory (ROM), a flash memory, and/or a non-volatile memory such as, for example, a CD-ROM, a hard drive, a solid-state drive, a flash drive, a memory card, a DVD-ROM, a Blu-ray Disk, a disk, and an optical drive, combinations thereof, and/or the like. Such non-transitory processor-readable media may be electrically based, optically based, magnetically based, and/or the like. Further, the messages described herein may be generated by the components and result in various physical transformations.

As used herein, the terms "network-based," "cloud-based," and any variations thereof, are intended to include the provision of configurable computational resources on demand via interfacing with a computer and/or computer network, with software and/or data at least partially located on a computer and/or computer network.

The generation of laser beams for use as optical data channel signals is explained, for example, in U.S. Pat. No. 8,155,531, entitled "Tunable Photonic Integrated Circuits", issued Apr. 10, 2012, and U.S. Pat. No. 8,639,118, entitled "Wavelength division multiplexed optical communication system having variable channel spacings and different modulation formats," issued Jan. 28, 2014, which are hereby fully incorporated in their entirety herein by reference.

As used herein, an optical link may be one or more optical fiber and associated hardware, such as one or more optical repeater, carrying one or more of an optical channel, an optical super-channel (e.g., multiple optical channels that are routed together), a super-channel group, an optical carrier group, a set of spectral slices, an optical control channel (e.g., sometimes referred to herein as an optical supervisory channel, or an "OSC"), and an optical data channel (e.g., sometimes referred to herein as "BAND").

As used herein, an "optical communication path" and/or an "optical route" may correspond to an optical path and/or an optical light path. For example, an optical communication path may specify a path along which light is carried between two or more network entities along an optical link, e.g., an optical fiber.

As used herein, a transmission line segment (which may be referred to as an optical link or an optical multiplex section) is the portion of a transmission line from a first node (e.g., a first muxponder) transmitting a transmission signal to a second node (e.g., a second muxponder) receiving the transmission signal. The transmission line segment may include one or more optical in-line amplifier situated between the first node and the second node. In some implementations, an optical multiplex section (OMS) has the same scope as the transmission line segment (TLS). In some implementations, the OMS may be a subset of a TLS.

As used herein, optical control channel refers to a channel (e.g., a dedicated wavelength) in an optical network that is accessed at each network element or node and is used for monitoring and managing the optical network. Functions performed using the optical control channel include, but are not limited to, performance monitoring (e.g., signal power, bit error rate (BER), and other parameters), network management (e.g., monitor and configure network elements, fault detection, and conduct maintenance activities such as remote software upgrades and network management information), and protection and restoration. The optical control channel is not used to carry payload traffic (i.e., client signals).

As used herein, target signal quality margin (or desired signal quality margin) refers to a range of signal quality in which data is received with up to a predetermined level of distortion and/or errors.

As used herein, required signal quality margin (or acceptable signal quality margin) refers to a range of signal quality that is outside the range of the optimal signal quality margin but still allows data to be reliably received.

Referring now to the drawings, and in particular to FIG. 1, shown therein is a diagram of an exemplary implementation of a simplified transport network 10 constructed in accordance with the present disclosure. The transport network 10 is depicted as having a plurality of network elements 14a-n (which may be referred to herein in the singular as network element 14 and in the plural as network elements 14), including a first network element 14a and a second network element 14b. Though two network elements 14 are shown for the purposes of illustration, it will be understood that the plurality of network elements 14a-n may comprise more or fewer network elements 14. Data transmitted within the transport network 10 may be transmitted along optical paths formed by a transmission line segment 22 (which may also be referred to as "media lane 22"). The transport network 10 may be provided with one or more optical in-line amplifiers (ILA) disposed in the transmission line segment 22 such as ILA 16. Though a single transmission line segment 22 is shown, it will be understood that the transport network 10 may comprise additional transmission line segments 22, such as between additional network elements 14.

In one implementation, a user may interact with a computer system 30 (which may also be referred to as a "network controller 30"), e.g., via a user device, that may be used to communicate with one or more of the network elements 14a-n (hereinafter "network element 14") via a communication channel 34. Each element of the computer system 30 may be partially or completely network-based or cloud-based, and may or may not be located in a single physical location.

In some implementations, the computer system 30 is connected to one or more network element 14 via the communication channel 34. In this way, the computer system 30 may communicate with each of the one or more network element 14, and may, via the communication channel 34 transmit or receive data from each of the one or more network element 14. In other embodiments, the computer system 30 may be integrated into each network element 14 and/or may communicate with one or more pluggable card within the network element 14. In some implementations, the computer system 30 may be a remote network element.

The communication channel 34 may permit bi-directional communication of information and/or data between the computer system 30 and/or the network elements 14 of the transport network 10. The communication channel 34 may interface with the computer system 30 and/or the network elements 14 in a variety of ways. For example, in some embodiments, the communication channel 34 may interface by optical and/or electronic interfaces, and/or may use a plurality of network topographies and/or protocols including, but not limited to, Ethernet, TCP/IP, circuit switched path, combinations thereof, and/or the like. The communication channel 34 may utilize a variety of network protocols to permit bi-directional interface and/or communication of data and/or information between the computer system 30 and/or the network elements 14.

The communication channel 34 may be a network connection. For example, in some embodiments, the communication channel 34 may be a version of an Internet network (e.g., exist in a TCP/IP-based network). In one implementation, the communication channel 34 is the Internet. It should be noted, however, that the communication channel 34 may be almost any type of network and may be implemented as the World Wide Web (or Internet), a local area network (LAN), a wide area network (WAN), a metropolitan network, a wireless network, a cellular network, a Bluetooth network, a Global System for Mobile Communications (GSM) network, a code division multiple access (CDMA) network, a 3G network, a 4G network, an LTE network, a 5G network, a satellite network, a radio network, an optical network, a cable network, a public switched telephone network, an Ethernet network, combinations thereof, and/or the like.

If the communication channel 34 is the Internet, a primary user interface of the computer system 30 may be delivered through a series of web pages or private internal web pages of a company or corporation, which may be written in hypertext markup language, JavaScript, or the like, and accessible by the user. It should be noted that the primary user interface of the computer system 30 may be another type of interface including, but not limited to, a Windows-based application, a tablet-based application, a mobile web interface, a VR-based application, an application running on a mobile device, and/or the like. In one embodiment, the communication channel 34 may be connected to one or more of the user devices, computer system 30, and the network elements 14*a-n*.

The transport network 10 may be, for example, made up of interconnected individual nodes (that is, the network elements 14). The transport network 10 may include any type of network that uses light as a transmission medium. For example, the transport network 10 may include a fiber-optic based network, an optical transport network, a light-emitting diode network, a laser diode network, an infrared network, a wireless optical network, a wireless network, combinations thereof, and/or other types of optical net-works.

The number of devices and/or networks illustrated in FIG. 1 is provided for explanatory purposes. In practice, there may be additional devices and/or networks, fewer devices and/or networks, different devices and/or networks, or dif-ferently arranged devices and/or networks than are shown in FIG. 1. Furthermore, two or more of the devices illustrated in FIG. 1 may be implemented within a single device, or a single device illustrated in FIG. 1 may be implemented as multiple, distributed devices. Additionally, or alternatively, one or more of the devices of the transport network 10 may perform one or more functions described as being performed by another one or more of the devices of the transport network 10. Devices of the computer system 30 may inter-connect via wired connections, wireless connections, or a combination thereof. For example, in one embodiment, the user device and the computer system 30 may be integrated into the same device, that is, the user device may perform functions and/or processes described as being performed by the computer system 30, described below in more detail.

Referring now to FIG. 2, shown therein is a diagram of an exemplary embodiment of the computer system 30 con-structed in accordance with the present disclosure. In some embodiments, the computer system 30 may include, but is not limited to, implementations as a pluggable computer housed in a network chassis, a personal computer, a cellular telephone, a smart phone, a network-capable television set, a tablet, a laptop computer, a desktop computer, a network-capable handheld device, a server, a digital video recorder, a wearable network-capable device, a virtual reality/aug-mented reality device, and/or the like.

In some embodiments, the computer system 30 may include one or more input devices 38 (hereinafter "input device 38"), one or more output devices 42 (hereinafter "output device 42"), one or more processors 46 (hereinafter "processor 46"), one or more communication devices 50 (hereinafter "communication device 50") capable of inter-facing with the communication channel 34, one or more non-transitory processor-readable medium (hereinafter "computer system memory 54") storing processor-execut-able code and/or software application(s) 58, for example including, a web browser capable of accessing a website and/or communicating information and/or data over a wire-less or wired network (e.g., the communication channel 34), and/or the like, and a database 62. The input device 38, the output device 42, the processor 46, the communication device 50, and the computer system memory 54 may be connected via a path 66 such as a data bus that permits communication among the components of the computer system 30.

In some implementations, the processor 46 may comprise one or more processors 46 working together, or indepen-dently, to read and/or execute processor executable code and/or data, such as stored in the computer system memory 54. The processor 46 may be capable of creating, manipu-lating, retrieving, altering, and/or storing data structures into the computer system memory 54. Each element of the computer system 30 may be partially or completely net-work-based or cloud-based, and may or may not be located in a single physical location.

Exemplary implementations of the processor 46 may include, but are not limited to, a digital signal processor (DSP), a central processing unit (CPU), a field program-mable gate array (FPGA), a microprocessor, a multi-core processor, an application specific integrated circuit (ASIC), combinations, thereof, and/or the like, for example. The processor 46 may be capable of communicating with the computer system memory 54 via the path 66 (e.g., data bus). The processor 46 may be capable of communicating with the input device 38 and/or the output device 42.

The processor 46 may be further capable of interfacing and/or communicating with the network elements 14 via the communication channel 34 using the communication device 50. For example, the processor 46 may be capable of communicating via the communication channel 34 by exchanging signals (e.g., analog, digital, optical, and/or the like) via one or more ports (e.g., physical or virtual ports) using a network protocol to provide information to the one or more network element 14.

The computer system memory 54 may store a software application 58 that, when executed by the processor 46, causes the computer system 30 to perform an action such as communicate with, or control, one or more component of the computer system 30, the transport network 10 (e.g., the one or more network element 14*a-n*), and/or the communication channel 34.

In some implementations, the computer system memory 54 may have a data store that may store data such as network element version information, firmware version information, sensor data, system data, metrics, logs, tracing, and the like in a raw format as well as transformed data that may be used for tasks such as reporting, visualization, analytics, signal routing, power loading operations and/or coordination, etc. The data store may include structured data from relational databases, semi-structured data, unstructured data, time-series data, and binary data. The data store may be a data base, a remote accessible storage, or a distributed filesystem. In some embodiments, the data store may be a component of an enterprise network.

In some implementations, the computer system memory 54 may be located in the same physical location as the computer system 30, and/or one or more computer system memory 54 may be located remotely from the computer system 30. For example, the computer system memory 54 may be located remotely from the computer system 30 and communicate with the processor 46 via the communication channel 34. Additionally, when more than one computer system memory 54 is used, a first computer system memory may be located in the same physical location as the proces-sor 46, and additional computer system memory may be located in a location physically remote from the processor 46. Additionally, the computer system memory 54 may be implemented as a "cloud" non-transitory processor-readable storage memory (i.e., one or more of the computer system memories 54 may be partially or completely based on or accessed using the communication channel 34).

In one implementation, the database 62 may be a time-series database, a relational database or a non-relational database. Examples of such databases comprise, DB2®, Microsoft® Access, Microsoft® SQL Server, Oracle®, mySQL, PostgreSQL, MongoDB, Apache Cassandra, influxDB, Prometheus, Redis, Elasticsearch, TimescaleDB, and/or the like. It should be understood that these examples have been provided for the purposes of illustration only and should not be construed as limiting the presently disclosed inventive concepts. The database 62 can be centralized or distributed across multiple systems.

The input device 38 may be capable of receiving information input from the user, another computer, and/or the processor 46, and transmitting such information to other components of the computer system 30 and/or the communication channel 34. The input device 38 may include, but is not limited to, implementation as a keyboard, a touchscreen, a mouse, a trackball, a microphone, a camera, a fingerprint reader, an infrared port, a slide-out keyboard, a flip-out keyboard, a cell phone, a PDA, a remote control, a fax machine, a wearable communication device, a network interface, combinations thereof, and/or the like, for example.

The output device 42 may be capable of outputting information in a form perceivable by the user, another computer system, and/or the processor 46. For example, implementations of the output device 42 may include, but are not limited to, a computer monitor, a screen, a touch-screen, a speaker, a website, a television set, a smart phone, a PDA, a cell phone, a fax machine, a printer, a laptop computer, a haptic feedback generator, a network interface, combinations thereof, and the like, for example. It is to be understood that in some exemplary embodiments, the input device 38 and the output device 42 may be implemented as a single device, such as, for example, a touchscreen of a computer, a tablet, or a smartphone. It is to be further understood that as used herein the term "user" is not limited to a human being, and may comprise a computer, a server, a website, a processor, a network interface, a user terminal, a virtual computer, combinations thereof, and/or the like, for example.

In general, the network element 14 transmits and receives data traffic and control signals. Nonexclusive examples of implementations of the network element 14 include a muxponder, optical line terminals (OLTs), optical cross connects (OXCs), optical line amplifiers, optical add/drop multiplexer (OADMs) and/or reconfigurable optical add/drop multiplexers (ROADMs), interconnected by way of optical fiber links.

Figure 3:
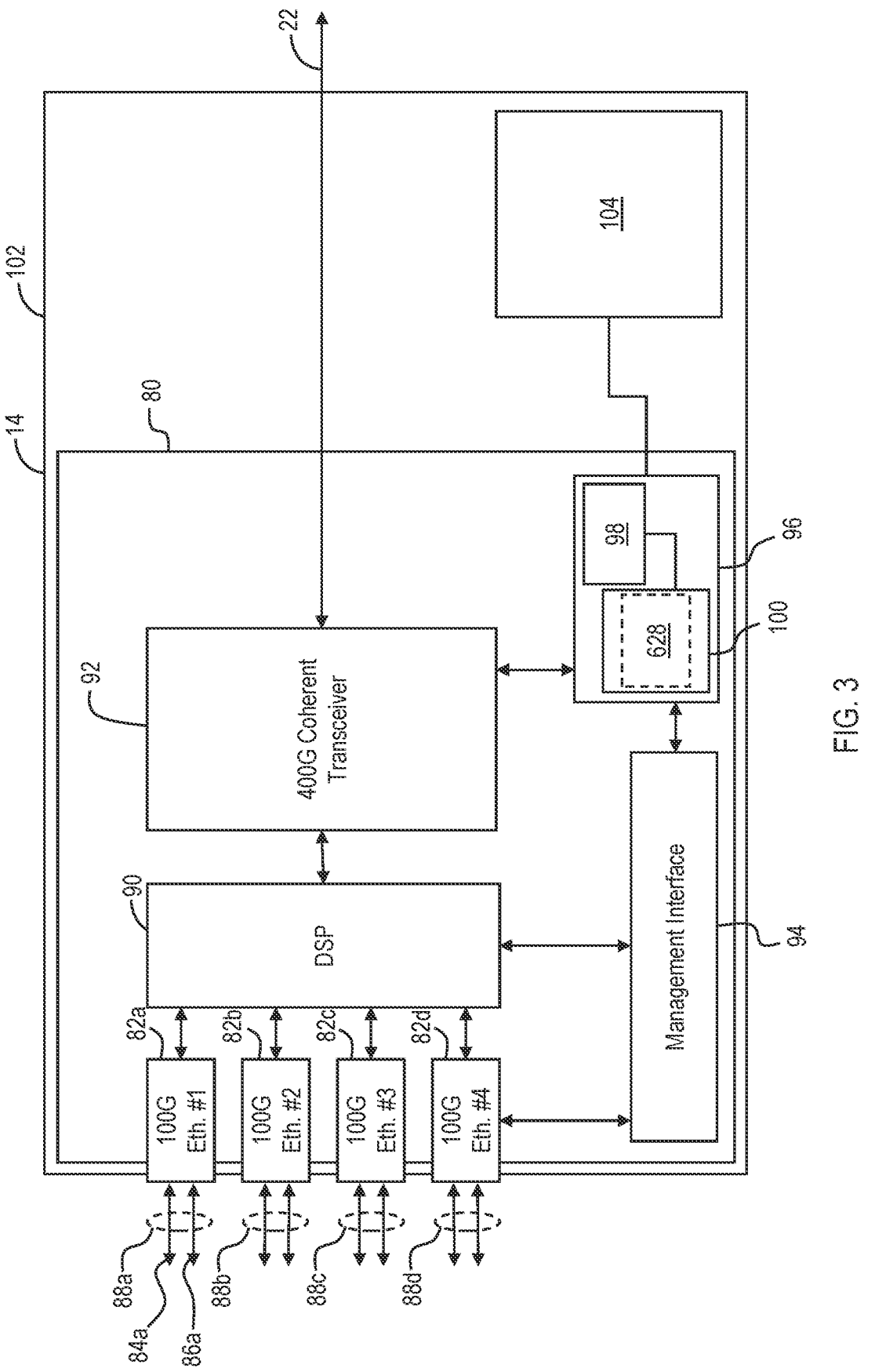
FIG. 3 is a block diagram of an exemplary implementation of a network element being a muxponder constructed in accordance with the present disclosure.

Referring now to FIG. 3, shown therein is a block diagram of an exemplary implementation of the network element 14 constructed in accordance with the present disclosure. In the implementation illustrated in FIG. 3, the network element 14 may be, or may be provided with, a muxponder 80. The muxponder 80 may be configured to aggregate multiple electrical network services, such as Ethernet, SONET/SDH, Fibre Channel, HD/SD-SDI, OTU2/3/4, etc., into an optical signal or signals. The muxponder 80 may be provided with a plurality of electrical ports 82*a-n* (illustrated for exemplary purposes as a first electrical port 82*a*, a second electrical port 82*b*, a third electrical port 82*c*, and a fourth electrical port 82*d*), each of the electrical ports 82*a-82n* having an associated first electrical register 84*a-n* (which may also be referred to as a first host lane or host lane 1, only one of which is labeled in FIG. 3 for clarity) and a second electrical register 86*a-n* (which may be referred to as a second host lane or host lane 2, only one of which is labeled in FIG. 3 for clarity), the associated first electrical register 84*a-n* and second electrical register 86*a-n* as a pair may be referred to as a host lane group and are assigned a hub identification code 88*a-88n* (referred to herein as hub-client-ID 88*a-88n*, and illustrated for exemplary purposes as a hub identification code 88*a*, a second hub identification code 88*b*, a third hub identification code 88*c*, and a fourth hub identification code 88*d*). It should be noted, however, that other terms besides "hub identification" and/or "hub-client-ID" may be used to identify host lanes and/or host lane groups. For instance, in some implementations, "cross-connect identification" and/or "cross-connect ID" may be used. In some implementations, "service identification" and/or "service ID" may be used on one side of a transmission line segment and "cross-connect identification" and/or "cross-connect ID" may be used on the other side of the transmission line segment.

In some implementations, the muxponder 80 may further comprise one or more digital signal processor 90 (hereinafter individually as "DSP 90" and collectively as "DSPS 90"), an optical transceiver 92, a management interface 94, and/or a controller 96. The controller 96 may be provided with a mux processor 98 and non-transitory computer readable memory 100 (hereinafter "mux memory 100").

The processor 98 executing an application stored in mux memory 100 may become a special-purpose machine particularly suited for performing various actions, operations, analyses, and/or the like in accordance with the systems and methods described herein and illustrated in the FIGS. 3-19.

In the illustrated implementation, the electrical ports 82*a-82n* are shown each having a 100-gigabit capacity. In such an implementation, each of the first electrical register 84*a-n* and the second electrical register 86*a-n* would have a 50-gigabit capacity. An exemplary implementation of the electrical ports 82*a-82n* includes, but is not limited to implementation as a 100GAUI-2 electrical interface that may be part of a pluggable 400*g* module.

The muxponder 80 may be hardwired and/or programmed to receive electrical data signals via the electrical ports 82*a-82n* (which may be referred to as a "host side"), process the electrical data with DSP 90 to convert the electrical data signals to digital data signals comprising at least one digital subcarrier, aggregate or multiplex the digital data signals in the multiplexer/demultiplexer 170 (FIG. 4), convert the digital data signals to an optical signal and transmit the optical signal via the optical transceiver 92 over the transmission line segment 22 (which may be referred to as a "media side").

In some implementations, the network element 14 may be a chassis system 102 and the muxponder 80 maybe a line card inserted in or part of the chassis system 102. The chassis system 102 may be provided with a controller 104 which may be comprised of similar elements as computer system 30.

In FIG. 3, the muxponder 80 is illustrated as a 400-gigabit module having four 100 gigabit electrical ports 82*a-82d*. However, is should be noted that in other implementations, the muxponder 80 may be provided having any capacity. For instance, the muxponder 80 may be an 800-gigabit module having eight electrical ports 82 with each electrical port 82 having a 100-gigabit capacity. In another exemplary implementation, the muxponder 80 may be an 800-gigabit module having five electrical ports 82 with four of the electrical ports having a 100-gigabit capacity and one of the electrical ports having a 400-gigabit capacity.

Figure 4A:
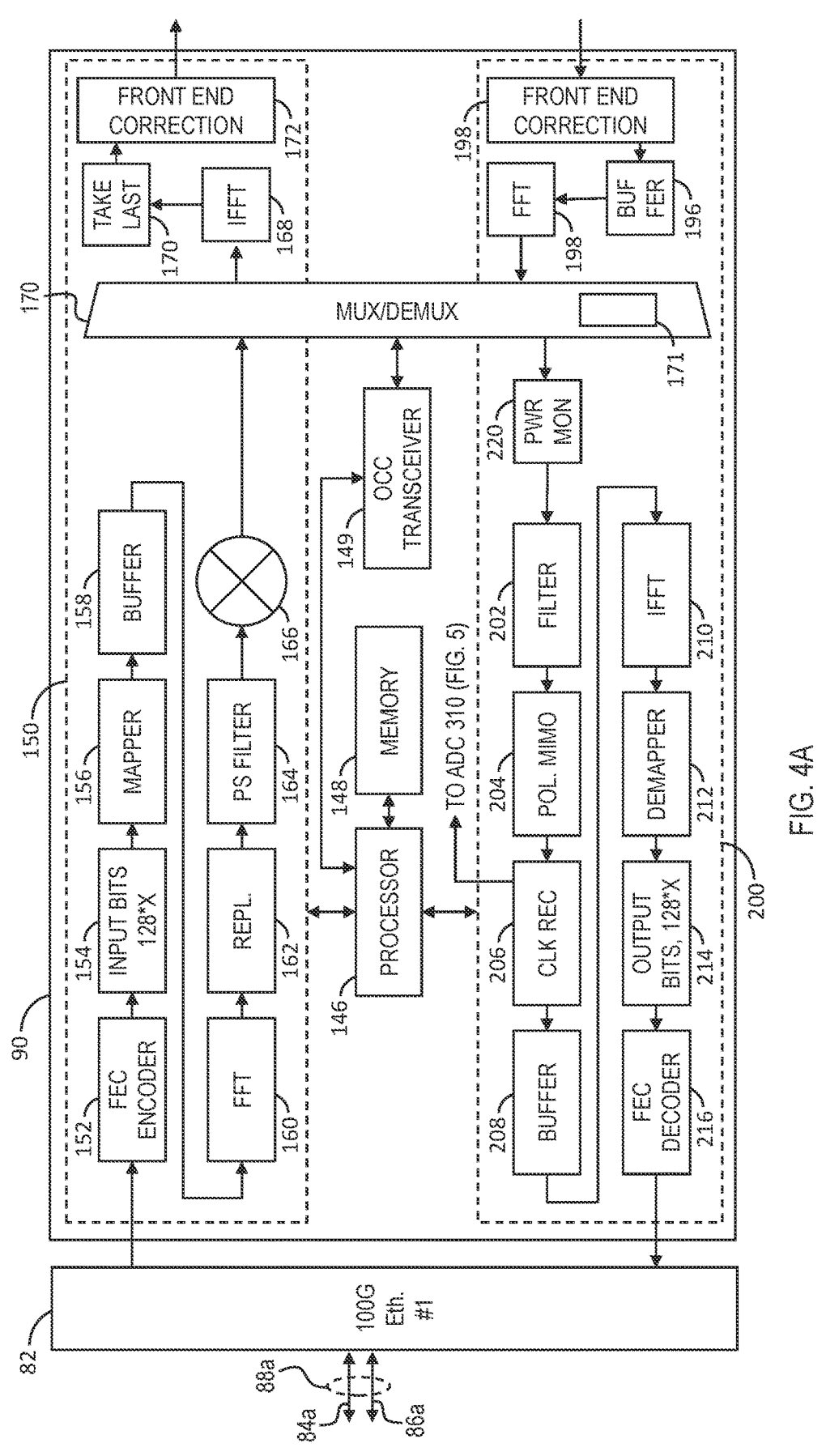
FIG. 4A is a block diagram of an example of components of a digital signal processor shown in FIG. 3.

Referring now to FIG. 4A, shown therein is an exemplary DSP 90 having a processor 146, a memory 148, a control channel transceiver 149, a transmitter portion 150, and a receiver portion 200. The DSP 90 processes data streams received from electrical registers 84 and 86 of electrical port 82. While one data stream will be shown and described herein for the purposes of illustration, it should be noted that more than one data stream may be received and processed by the muxponder 80. In the case where more than one data stream is received and processed by the muxponder 80, the DSP 90 may have components that process each data stream individually. That is, there may be a transmitter portion 150 and a receiver portion 200 for each data stream to be processed. The data streams may be referred to herein generally as client data streams 110 and individually as client data stream 110. A multiplexer/demultiplexer 170 may be provided with an optional digital cross-connect 171 as part of the multiplexer/demultiplexer 170 which may be programmed to encode and decode digital subcarriers and digital subcarrier groups containing the data of the traffic streams.

The control channel transmitter 149 may be used to transmit information between nodes (network elements 14) of the network in a wavelength that is outside the wavelengths used to transmit the subcarriers. For example, the control channel transmitter 149 may transmit the information at 1310 nanometers. Once combined at the multiplexer/demultiplexer 170, the information may become part of the combined optical signal sent by the transceiver 92.

The transmission portion 150 of the DSP 90 may include an FEC encoder 152, input bits component 154, a mapper 156 (which may be referred to as a bits-to-symbol component 156), a buffer 158 (which may be an overlap-and-save buffer), fast Fourier transform function (FFT) 256 component 160, a replicator component 162, a pulse shape filter 164 (which may be a finite impulse response (FIR) filter, for instance), a gain component 166 (which may be a digital multiplier, for example), an IFFT component 168, a take last component 170, and front end correction circuitry 172. Optionally, the transmission portion 150 of the DSP 90 may further comprise one or more zero-bit-insertion-block circuitry components (not shown).

Each of the FEC encoders 152 may receive a particular one of the plurality of independent input data streams of bits (illustrated as exemplary Client Data Stream 110) from a respective one of a plurality of data sources and perform error correction coding on a corresponding one of the input Client Data Streams 110, such as through the addition of parity bits. The FEC encoder 152 may be designed to generate timing skew between the subcarriers to correct for skew induced by link(s) between the node 14a which may be referred to as a transmitter module and the node 14b which may be referred to as a receiver module in the optical network 10.

Input bits component 154 may process, for example, 128*X bits at a time, where X is an integer. For dual-polarization Quadrature Phase Shift Keying (QPSK), X is four. For higher modulation formats, X may be more than four. For example, for an 8-quadrature amplitude modulation (QAM) format, X may be eight and for a 16 QAM modulation format, X may be sixteen. Accordingly, for such 8 QAM modulation, eight FEC encoders 152 may be provided, each of which may encode a respective one of eight independent input data streams (e.g., eight of the Client Data Streams 110) for a corresponding one of eight digital subcarriers corresponding to eight optical subcarriers. Likewise, for 16 QAM modulation, sixteen FEC encoders 152 may be provided, each of which may encode a respective one of sixteen independent input data streams (e.g., sixteen of the Client Data Streams 110) for a corresponding one of sixteen subcarriers corresponding to sixteen optical subcarriers.

The bits-to-symbol component 156 may map the bits to symbols on the complex plane. For example, the bits-to-symbol components 156 may map four bits or other numbers of bits to a symbol in the dual-polarization QPSK constellation or other modulation format constellation. Accordingly, each of the components or circuits 156 may define or determine the modulation format for a corresponding subcarrier. In addition, components or circuits 152, 154, and 156 may define or determine the baud rate and or data rate for each subcarrier. Therefore, the modulation format, baud rate and data rate may be selected for each subcarrier by these circuits. For example, control inputs may be provided to these circuits so that the desired modulation format, baud rate and data rate may be selected.

The buffer 158 may buffer 256 symbols, in one example. The buffer 158 may receive 128 symbols at a time from the bits-to-symbol component 156. Thus, the buffer 158 may combine 128 new symbols, from the bits-to-symbol component 156, with the previous 128 symbols received from the bits-to-symbol component 156.

The FFT component 160 may receive 256 symbols from the buffer 158 and convert the symbols to the frequency domain using, for example, a fast Fourier transform (FFT). The FFT component 160 may form 256 frequency bins, for example, as a result of performing the FFT. Components 158 and 160 may carry out the FFT for each subcarrier based on one sample per symbol (per baud) to thereby convert time domain or data symbols received by FFT component 160 into frequency domain data for further spectral shaping (requiring more than one sample/baud or symbol) by filters 164.

The replicator component 162 may replicate the 256 frequency bins, in this example, or registers to form 512 frequency bins (e.g., for T/2 based filtering of the subcarrier). This replication may increase the sample rate.

The pulse shape filter 164 may apply a pulse shaping filter to the data stored in the 512 frequency bins to thereby provide the digital subcarriers with desired spectral shapes and such filtered subcarriers are multiplexed in the multiplexer/demultiplexer 170. The pulse shape filter 164 may calculate the transitions between the symbols and the desired spectrum so that the subcarriers can be packed together on the channel. The pulse shape filter 164 may also be used to introduce timing skew between the subcarriers to correct for timing skew induced by links between nodes 14 in the optical network 10. The pulse shape filters 164 may be raised cosine filters.

The pulse shape filter 164 may have a variable bandwidth. The pulse shape filter 164 may be configured to shape frequency bandwidths of the digital subcarriers to provide the digital subcarriers with desired spectral shapes. The pulse shape filter 164 may be configurable, adjustable, and/or programmable such that the frequency bandwidths are configurable. One or more filter control signals may be used to adjust, configure, and/or program the pulse shape filter 164. In some implementations, the bandwidth of the subcarriers may be determined by a width of the pulse shape filter 164. In addition, as generally understood, the pulse shape filter 164 may have an associated "roll-off" factor (a). Consistent with the present disclosure, however, such "roll-off" may be adjustable or changed in response to different control inputs to the pulse shape filter 164. Such variable roll-off results in the pulse shape filter 164 having a variable or tunable bandwidth, such that each subcarrier may have a different spectral width. In a further example, one of the subcarriers may have an associated spectral width that is wider than the remaining subcarriers. It is understood that the control inputs may be any appropriate signal, information, or data that is supplied to the pulse shape filter 164, such that the "roll-off" is changed in response to such signal, information, or data.

In accordance with one aspect of the present disclosure, optical power of one or more optical subcarrier may be controlled individually. As such, the optical power of one or more optical subcarrier may differ from the optical power of one or more other optical subcarrier. For example, the transmitter portion 150 of the digital signal processor 90 may include power adjusting circuitry such as, but not limited to, one or more digital multipliers 166 corresponding to the plurality of independent data streams 110, the digital multipliers 166 configured to control power gain of the digital subcarriers, which results in control of the optical power of the optical subcarriers. The power adjusting circuitry, such as the digital multipliers 166 may be configurable so as to control and/or change power gains for specific ones of the plurality of digital subcarriers. One or more gain control signals may be generated by the processor 146 and/or the node processor 98 and may be used to configure the power adjusting circuitry, such as the digital multipliers 166.

In one aspect of the present disclosure, the digital multipliers 166 may be located within the digital signal processor 90 between the FFT component 160 and the IFFT component 172.

In some implementations, the IFFT component 168 may receive the 2048 element vector and return the signal back to the time domain, which may now be at 64 GSample/s. The IFFT component 168 may convert the signal to the time domain using, for example, an inverse fast Fourier transform (IFFT).

The take last 1024 component 170 may select the last 1024 samples, for example, from IFFT component 168 and output the 1024 samples to the DAC 254 of the transceiver 92 (such as at 64 GSample/s, for example).

While FIG. 4A shows the transmission portion 150 of the DSP 90 as including a particular quantity and arrangement of functional components, in some implementations, the transmission portion 150 of the DSP 90 may include additional functional components, fewer functional components, different functional components, or differently arranged functional components.

The receive portion 200 of the DSP 90 may be provided with, front end correction circuitry 195, a buffer 196 (which may be an overlap and save buffer, for instance), an FFT component 198, one or more filter 202, polarization component 204, a clock recovery circuit 206, a buffer 208, one of more IFFT component 210 (referred to generally as IFFT components 210 and individually as IFFT component 210), a de-mapper 212 (which may be one or more symbols to bit components 212 referred to generally as symbols to bits components 212 and individually as symbols to bits component 212), one or more output bits components 214 (referred to generally as output bits components 214 and individually as output bits component 214), and one or more FEC decoders 216 (referred to generally as FEC decoders 216 and individually as FEC decoder 216). Optionally, the DSP 90 may be provided with a power monitor 220.

In some implementations, the overlap and save buffer 196 that may receive samples from the ADC 310. In one implementation, the ADC 310 may operate to output samples at 64 GSample/s. The overlap and save buffer 196 may receive 1024 samples and combine the current 1024 samples with a previous 1024 samples, received from the ADC 310, to form a vector of 2048 elements. The FFT component 198 may receive the 2048 vector elements, for example, from the overlap and save buffer 196 and convert the vector elements to a frequency domain using, for example, a fast Fourier transform (FFT). The FFT component 198 may convert the 2048 vector elements to 2048 frequency bins as a result of performing the FFT.

A de-mux component of the multiplexer/demultiplexer 170 may receive the 2048 frequency bins or outputs, such as from the FFT component 198. The multiplexer/demultiplexer 170 may demultiplex the 2048 frequency bins to element vectors for each of the subcarriers, for example, 512 vectors, which may have, in one example, an associated baud rate of 8 Gbaud.

In some implementations, power monitor 220 may be connected or coupled between the multiplexer/demultiplexer 170 and the filter 202 to measure a power output of each subcarrier output from the multiplexer/demultiplexer 170.

Filter 202 may apply a filtering operation for, for example, dispersion compensation or other relatively slow varying impairment of the transmitted optical signals and subcarriers. The filter 202 may also compensate for skew across subcarriers introduced in the link 2, or skew introduced intentionally in the sending muxponder 80.

The polarization component 204 may apply polarization mode dispersion (PMD) equalization to compensate for PMD and polarization rotations. The polarization component 204 may also receive and operate based upon feedback signals from other components of the DSP 90.

The clock and/or phase recovery circuitry 206 may be connected or coupled between the polarization component 204 and the buffer 208. In cases where one of the subcarriers has a wider bandwidth, due to a corresponding roll-off in the associated transmitter filter 164 discussed above, than the other subcarriers, the wider subcarrier may be selected from the output of the multiplexer/demultiplexer 170 for clock recovery and the recovered or detected clock or phase related signal may be provided to the ADC 310 in the transceiver 92 (see FIG. 5). The clock may be used to set and/or adjust the timing of sampling of the ADC 310 for the plurality of the subcarriers.

The clock may be recovered using information from all subcarriers, or from fewer than all the subcarriers, or just from one subcarrier. In some implementations, clock recovery with the clock recovery circuit 206 in the receiver portion 200 of the DSP 90 is based on the subcarrier with a widest bandwidth and associated filter 164 having a corresponding roll-off. The subcarrier with the widest bandwidth may be used to recover the clock signal and such clock signal may be used by the ADC 310 to set and/or adjust the timing of sampling of the ADC 310 for the plurality of the subcarriers.

The IFFT component 210 may covert the 512 element vector, in this example, (after processing by the filter component 202 and the PMD component 204) back to the time domain as 512 samples. The IFFT component 210 may convert the 512 element vector to the time domain using, for example, an inverse fast Fourier transform (IFFT).

The de-mapper 212 may receive the symbols output from the IFFT component 210 and map the symbols back to bits. For example, the de-mapper 212 may map one symbol, in the QPSK constellation, to X bits, where X is an integer. For dual-polarization QPSK, X is four. In some implementations, the bits could be decoded for error correction using, for example, FEC decoder 216. The output bits component

214 may output 128*X bits at a time, for example. For dual-polarization QPSK, the output bits component 214 may output 512 bits at a time, for example.

The FEC decoder 216 may process the output of the output bits component 214 to remove errors using forward error correction. In some implementations, a switch, blocking, or terminating circuit (not shown) may be provided to terminate one or more client data streams 110 that are not intended for output from DSP 90.

While FIG. 4A shows the receive portion 200 of the DSP 90 as including a particular quantity and arrangement of functional components, in some implementations, the receive portion 200 of the DSP 90 may include additional functional components, fewer functional components, different functional components, or differently arranged functional components.

Figure 4B:
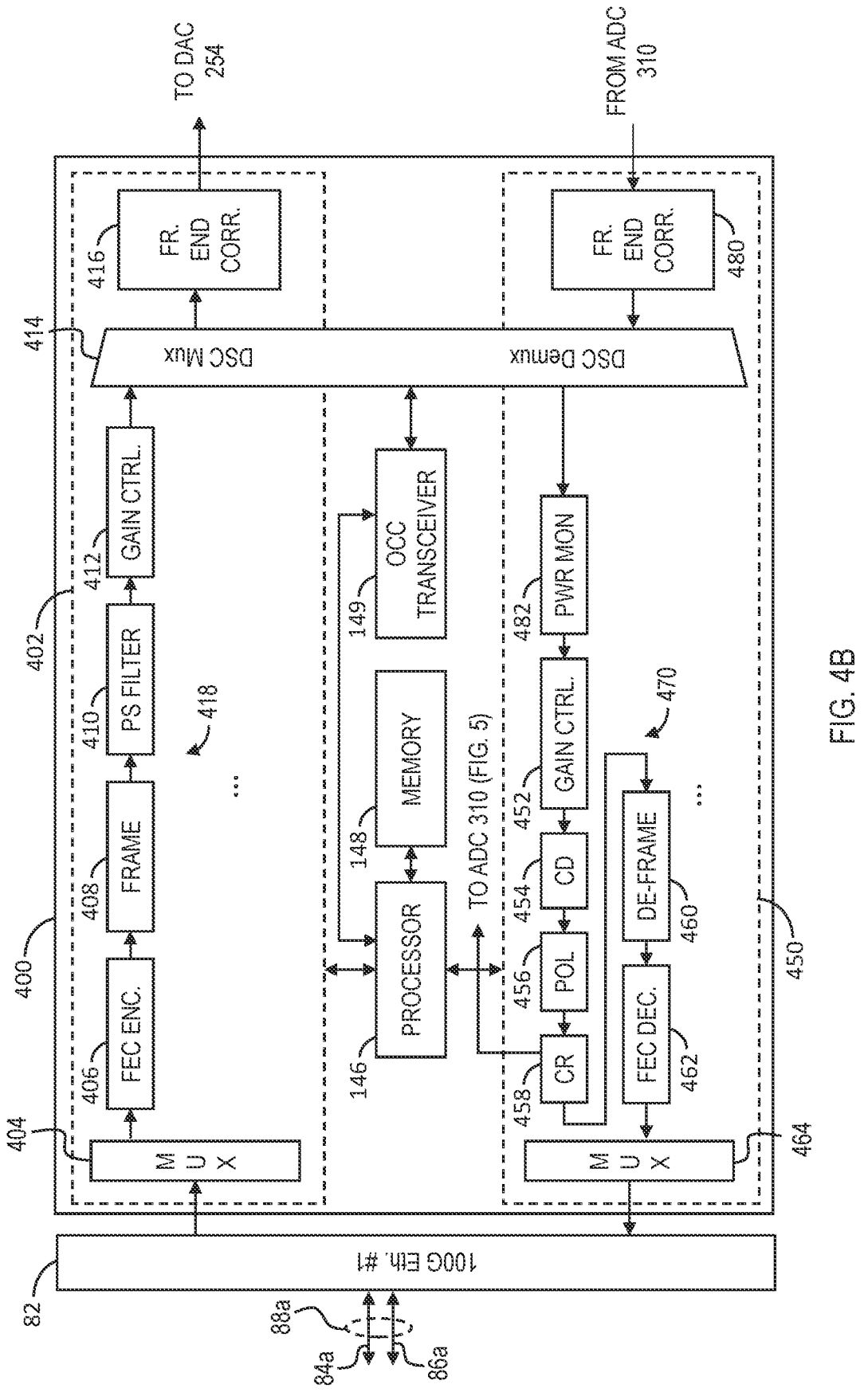
FIG. 4B is a block diagram of an example of components of another digital signal processor constructed in accordance with the present disclosure.

Referring now to FIG. 4B, shown therein is another implementation of a DSP 400 that may perform send and receive functions as well as signal quality determination as described herein. The DSP 400 may include a transmit portion 402 configured to receive client data and encode the client data into one or more subcarriers and/or subcarrier groups and a receive portion 450 configured to receive a digital signal after conversion from an optical signal by the ADC 310.

The transmit portion 402 of the DSP 400 may include a multiplexer 404, an FEC encoder 406, a framer 408, a pulse shaping filter 410, a gain controller 412 (which may be referred to herein as "transmit gain controller 412" to differentiate it from a receive gain controller 452), a digital subcarrier multiplexer that may be part of a multiplexer/demultiplexer 414, and front end correction circuitry 416.

The FEC encoder 406 may receive a particular one of the plurality of independent input data streams of bits (illustrated as exemplary Client Data Stream 110) from a respective one of a plurality of data sources and applies error correction coding such as through the addition of parity bits.

After FEC encoding, the client data stream undergoes framing by the framer 408. For instance, the framer 408 may convert Ethernet (100 GbE) signals input from a client side network into optical transport network (OTN) frame formats (optical-channel transport unit (OTU) 2/3/4 signals, for instance).

Pulse shaping by the pulse shaping filter 410 (which may be a root-raised-cosine (RRC) or a finite impulse response (FIR) filter, for instance) may then be applied. The pulse shape filter 410 may have a variable bandwidth. The pulse shape filter 410 may be configured to shape frequency bandwidths of the digital subcarriers to provide the digital subcarriers with desired spectral shapes. The pulse shape filter 410 may be configurable, adjustable, and/or programmable such that the frequency bandwidths are configurable. One or more filter control signals may be used to adjust, configure, and/or program the pulse shape filter 410. In some implementations, the bandwidth of the subcarriers may be determined by a width of the pulse shape filter 410. In some implementations, the pulse shaping filter 410 may also perform pre-compensation of analog bandwidth restrictions and timing skews, for instance.

The transmit gain controller 412 may include power adjusting circuitry such as, but not limited to, a digital multiplier configured to control power gain of the digital subcarriers. The transmit gain controller 412 may be configurable so as to control and/or change power gains to control a relative digital subcarrier power to counteract link losses, for example. One or more gain control signals may be generated by the processor 396 and/or the node processor

98 and may be used to configure the transmit gain controller 412. Since the transmit gain controller 412 mechanism is implemented in the digital domain, a dynamic range of the transmit gain controller 412 is limited by the quantization inside the DSP 400 and a full-scale range of the DAC 254. Besides optimization of the digital drive into the DAC 254 for different numbers of subcarriers, the transmit gain controller 412 mechanism can also be used to equalize a receive side SNR between subcarriers experiencing different noise loading.

Once power gains have been applied, the multiplexer/demultiplexer 414 digitally modulates (muxes) the individual baseband sub-streams onto intermediate digital subcarriers (referred to as "digital subcarrier multiplexing" or "DSC Mux"). The output of the multiplexer/demultiplexer 414 is converted to an analog signal by DAC 254 which may be a four-channel ADC, for example.

The multiplexer 404, FEC encoder 406, framer 408, pulse shaping filter 410, gain controller 412, digital subcarrier multiplexer that may be part of a multiplexer/demultiplexer 414, and front end correction circuitry 416 may form a digital subcarrier (DSC) transmit circuit 418. While the transmit portion 402 of the DSP 400 is illustrated as having only one DSC transmit circuit 418, the transmit portion 402 may be provided with n number of transmit circuits where n is an integer equal to a number of subcarriers that may be transmitted by a network element using the DSP 400. For instance, the network element 14 of FIG. 3 is configured to transmit four subcarrier groups each having four subcarriers for a total of sixteen subcarriers. In such an exemplary network element, the DSP 400 would include sixteen DSC transmit circuits 418. As another example, leaf nodes 750, 760, 770, 780 (see, for example, FIGS. 6A, 6B, and 8) may each be configured to transmit one subcarrier group comprising four subcarriers. In such an implementation, the DSP 400 would include four DSC transmit circuits 418, one for each subcarrier.

The receive portion 450 of the DSP 400 may include a digital subcarrier demultiplexer (which may be referred to as a "DSC demux") which may be part of the multiplexer/demultiplexer 414, a gain controller 452 (referred to herein as "receive gain controller 452" to differentiate it from the transmit gain controller 412), a chromatic dispersion (CD) component 454, a polarization demuxer (PD) 456, a recovery component (CR) 458 (which may be referred to as a "carrier and frequency recovery component 458" or "CR 458"), a frame recovery component (FRAME) 460, an FEC decoder 462, and a multiplexer 464. Optionally, the receive portion 450 of the DSP 400 may be provided with a front end correction component 480 and/or a power monitor 482.

The DSC demux portion of the multiplexer/demultiplexer 414, the receive gain controller 452, the CD component 454, the PD 456, the recovery component 458, the frame recovery component 460, the FEC decoder 462, and the multiplexer 464 may form a digital subcarrier (DSC) receive circuit 470. While the receive portion 450 of the DSP 400 is illustrated as having only one DSC receive circuit 470, the receive portion 450 may be provided with n number of receive circuits where n is an integer equal to a number of subcarriers that may be received by the DSP 400. For instance, the network element 14 of FIG. 3 is configured to receive four subcarrier groups each having four subcarriers for a total of sixteen subcarriers. In such an exemplary network element, the DSP 400 would include sixteen DSC receive circuits 470. As another example, the leaf nodes 750, 760, 770, 780 (see, for example, FIGS. 6A, 6B, and 8) are each configured to receive one subcarrier group comprising four subcarriers. In such an implementation, the DSP 400 would include four DSC receive circuits 470, one for each subcarrier.

After sampling by the ADC 310, a digital signal is provided to the receive portion 450 of the DSP 400 where the digital signal is de-multiplexed into individual digital subcarrier streams that are near baseband (DSC Demux) by the multiplexer/demultiplexer 414. For the purposes of illustration and description, the DSP 400 will be described handling four subcarriers and the digital signal will be described as being demultiplexed into a first digital signal, a second digital signal, a third digital signal, and a fourth digital signal with the first digital signal handled by the illustrated DSC receive circuit 470.

As on the transmit portion 402 of the DSP 400 side, receive gain control block 452 may help to counteract gain imbalances between subcarriers. The receive gain control block 452 cannot improve the link SNR nor the SNR contribution from the receive side front-end (i.e., transceiver 92). The receive gain control block 452 may be used to optimize a quantization noise contribution inside the receive portion 450 of the DSP 400. The receive gain control block 452 may also reduce the dynamic range requirements of the adaptive digital filter—also under transient conditions.

The CD component 454 may be, for instance, a chromatic dispersion filter configured to counteract link chromatic dispersion or other methods known in the art.

The PD 456 may be configured to perform polarization de-muxing using methods known in the art.

The recovery component 458 may perform carrier and frequency recovery using methods known in the art. For instance, the recovery component 458 may include a digital clock recovery component that may be used to correct inaccuracies in reference timing oscillators from each leaf node 750, 760, 770, 780 that result in slight differences between digital subcarriers which are all sampled by the common ADC 310. Due to low tuning bandwidths of the reference oscillators, and the latency in calculation at the DSP 400, digital clock recovery is used to extract robust timing phase information after removing channel distortion (e.g., using the channel distortion component 454). Digital interpolation can then be applied to avoid long feedback paths to the reference oscillator such that the loop bandwidth can be kept high.

After carrier and frequency recovery, constellation diagrams/transmitted symbols may be recovered and used to determine one or more signal quality metrics such as one or more of a signal to noise ratio (SNR), a bit error rate (BER), a quality factor (Q-factor), mutual information, error vector magnitude (EVM), and/or combinations thereof in the DSP 400 and or the node controller 96.

The de-framer component 460 converts the OTN frame format signals into Ethernet signals and outputs them to the FEC decoder 462. The FEC decoder 462 may process the output of the de-framer component 460 to remove errors using forward error correction.

The multiplexer 464 may multiplex the output of the FEC decoder 462 and supply the multiplexed signal to the electrical port 82.

Figure 5:
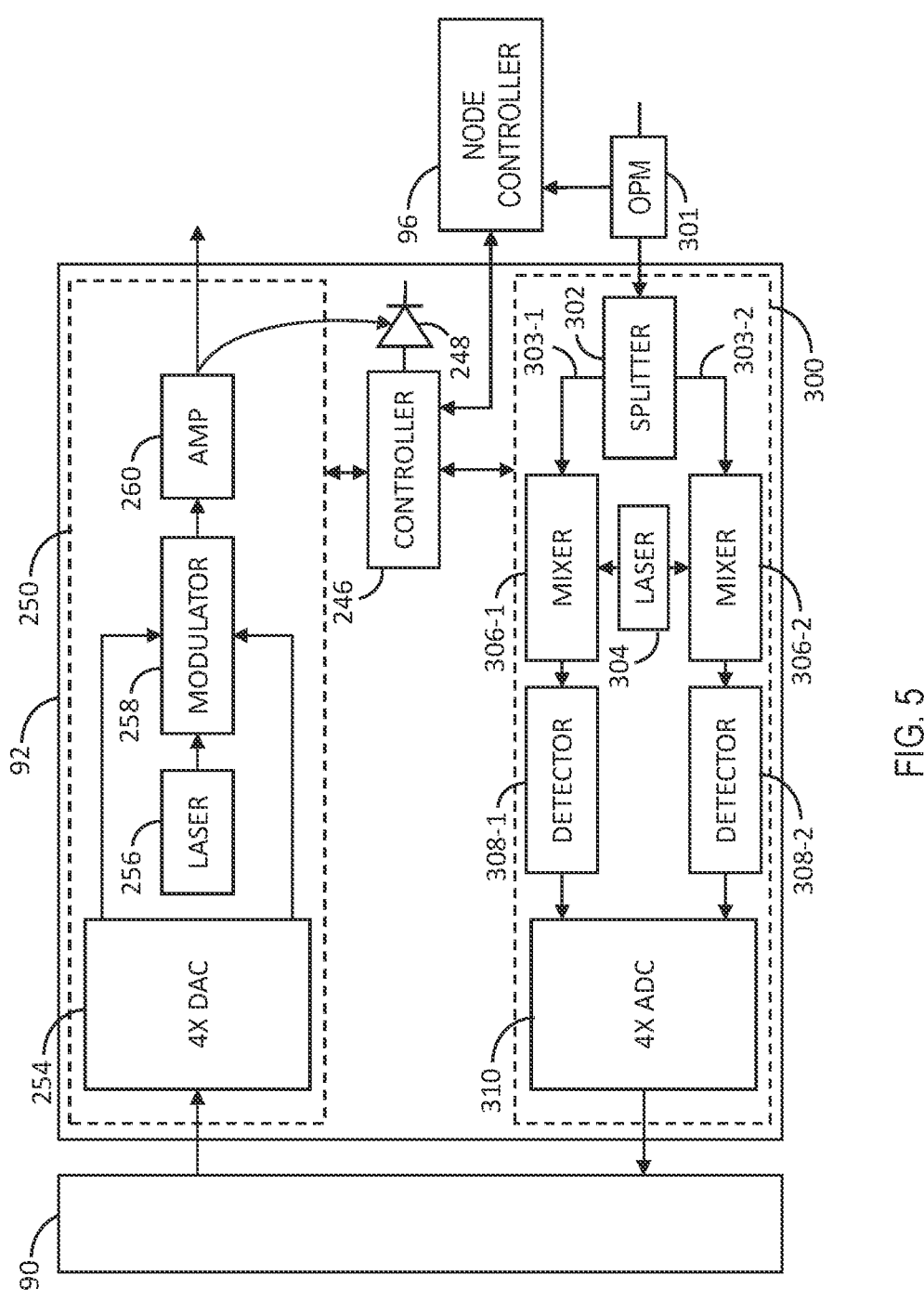
FIG. 5 is a block diagram illustrating an example of components of an optical transceiver shown in FIG. 3.

FIG. 5 is a diagram illustrating an example of components of the optical transceiver 92 in greater detail. The optical transceiver 92 may include an optical transmitter portion 250 and an optical receiver portion 300. The optical transmitter portion 250 may include a front-end correction circuitry 252, a digital-to-analog converter (DAC) 254 (which may be a 4×DAC), a laser 256, modulators 258, and an amplifier 260.

Optionally, the optical transceiver 92 may include an optical power monitor 301 positioned and configured to obtain an optical power reading of an optical signal coming into the transceiver 92 over optical fiber, such as the link 22 and provide the optical power reading to the node controller 96.

In some implementations, the transmission portion 150 of the DSP 90 and the DAC 254 may be implemented using an application specific integrated circuit (ASIC) and/or may be implemented on a single integrated circuit, such as a single PIC. In some implementations, the laser 256 and the modulator 258 may be implemented on a single integrated circuit, such as a single photonic integrated circuit (PIC). In some other implementations, the transmission portion 150 of the DSP 90, the DAC 254, the laser 256, and/or the modulator 258 may be implemented on one or more integrated circuits, such as one or more PICs. For example, in some example implementations, components of multiple optical transceivers 92 may be implemented on a single integrated circuit, such as a single PIC, to form a super-channel transmitter.

The DSP 90 may receive input data from multiple data sources, each of which supplying a respective one of the plurality of Client Data Streams 110. In general, "N" number of Client Data Streams 110 can be used. For explanatory purposes, four Client Data Streams 110 (N=4) are described. The DSP 90 may determine the signal to apply to the modulator 258 to generate multiple optical subcarriers. Digital subcarriers may comprise electronic signals generated in the DSP 90 that correspond to respective optical subcarriers.

In some implementations, the DSP 90 may receive streams of data (such as one or more of the Client Data Streams 110), map the streams of data into each of the digital subcarriers, independently apply spectral shaping to each of the digital subcarriers, and obtain, based on the spectral shaping of each of the digital subcarriers, a sequence of values to supply to the DAC 254. In some implementations, the DSP 90 may generate the digital subcarriers using time domain filtering and frequency shifting by multiplication in the time domain.

The DAC 254 may comprise a digital-to-analog converter. The DAC 254 may receive the sequence of values and, based on the sequence of values, generate the analog or voltage signals to apply to the modulator 258.

The laser 256 of the transmission portion 150 may include a semiconductor laser, such as a distributed feedback (DFB) laser, or some other type of laser. The laser 256 of the transmission portion 150 may provide an output optical light beam to the modulator 258.

The modulator 258 may include a Mach-Zehnder modulator (MZM), such as a nested MZM, or another type of modulator. The modulator 258 may receive the optical light beam from the laser 256 and the voltage signals from the DAC 254, and may modulate the optical light beam, based on the voltage signals, to generate a multiple subcarrier output signal(s). The modulator 258 may be used to modulate signals including a first polarization and a second polarization.

In some implementations, one or more subcarrier may be modulated by the modulator 258 to carry data at different rates. For example, a first subcarrier SC1 may carry data at a first rate and a second subcarrier SC2 may carry data at a different rate that is higher or lower than the first rate. In addition, one or more subcarrier may be modulated by the modulator 258 to carry data with different baud rates. For example, the first subcarrier SC1 may carry data at or have an associated a first baud rate and the second subcarrier SC2 may carry data at or have an associated second baud rate that is higher or lower (different) than the first baud rate.

In some implementations, a first one of a plurality of subcarriers SC1 may be modulated in accordance with a first modulation format and a second one of the plurality of subcarriers SC2 may be modulated in accordance with a second modulation format different than the first modulation format. In one implementation, the first modulation format may be one of BPSK, QPSK, and m-QAM, where m is an integer, and the second modulation format may be another one of BPSK, QPSK, and m-QAM. In one implementation, the first modulation format may be one of BPSK, QPSK, and m-QAM, where m is an integer, and the second modulation format may be an intensity modulation format.

In some implementations, a plurality of the subcarriers may have a variety of combinations of modulation and data rates configured by the DSP 90 and the transceiver 92 and/or by a plurality of DSPs 90 and the transceivers 92. The particular combination of modulation and data rates of the subcarriers may be configured based on a desired distance of transmission, desired error rate, desired data rate, and/or other requirements and/or restrictions for the optical network 10 and/or the end client.

In some implementations, one or more DACs 254 may be associated with each polarization. In these implementations, the DACs 254 may supply voltage signals to the modulator 258, and two DACs 254 may supply voltage signals to the modulator 258. In some implementations, the outputs of the modulators 258 may be combined back together using combiners (e.g., optical multiplexer) and polarization multiplexing.

The amplifier 260 is configured to allow a power of an optical signal received from the modulator 258 to be adjusted. In some implementations, the amplifier 260 may include a variable optical attenuator (VOA) and/or a semiconductor optical amplifier (SOA), for instance, that are controlled by the controller 246 such that the optical signal power may be adjusted.

While FIG. 5 shows the optical transmitter portion 250 as including a particular quantity and arrangement of components, in some implementations, the optical transmitter portion 250 may include additional components, fewer components, different components, or differently arranged components. The quantity of DACs 254, lasers 256, modulators 258, and/or amplifiers 260 may be selected to implement an optical transmitter portion 250 that is capable of generating polarization diverse signals for transmission on an optical fiber, such as the link 22. In some instances, one of the components illustrated in FIG. 5 may perform a function described herein as being performed by another one of the components illustrated in FIG. 5.

The optical receiver portion 300 of the optical transceiver 92 may include a polarization beam splitter 302 (having a first output 303-1 and a second output 303-2), a local oscillator laser 304, a first and second ninety-degree optical hybrids or mixers 306-1 and 306-2 (referred to generally as hybrid mixers 306 and individually as hybrid mixer 306), a first and second detector 308-1 and 308-2 (referred to generally as detectors 308 and individually as detector 308, each including either a single photodiode or balanced photodiode), an analog-to-digital converters (ADC) 310 (which may be a 4×ADC), and front-end correction circuitry 312.

The polarization beam splitter (PBS) 302 may include a polarization splitter that splits an input optical signal, having optical subcarriers, as noted above, into two orthogonal polarizations, such as the first polarization and the second polarization. The hybrid mixers 306 may combine the polarization signals with light from the local oscillator laser 304. For example, the hybrid mixer 306-1 may combine a first polarization signal (e.g., the component of the incoming optical signal having a first or TE polarization output from the first output 306-1) with the optical signal from the local oscillator laser 304, and the hybrid mixer 306-2 may combine a second polarization signal (e.g., the component of the incoming optical signal having a second or TM polarization output from the second output 306-2) with the optical signal from the local oscillator laser 304. In one example, a polarization rotator may be provided at the second output 306-2 to rotate the second polarization to be the first polarization.

The detectors 308 may detect mixing products output from the optical hybrid mixers 306, to form corresponding voltage signals. The ADC 310 may convert the voltage signals to digital samples. For example, the first detector 308-1 (or photodiodes) may detect the first polarization signals to form the corresponding voltage signals, and the ADC 310 may convert the voltage signals to digital samples for the first polarization signals after amplification, gain control and AC coupling. Similarly, the second detector 308-2 may detect the second polarization signals to form the corresponding voltage signals, and the ADC 310 may convert the voltage signals to digital samples for the second polarization signals after amplification, gain control, and AC coupling.

The DSP 90 may process the digital samples for the first and second polarization signals to generate resultant data, which may be outputted as output data, such as Client Data Streams 110.

While FIG. 5 shows the optical receiver portion 300 of the optical transceiver 92 as including a particular quantity and arrangement of components, in some implementations, the optical receiver portion 300 may include additional components, fewer components, different components, or differently arranged components. The quantity of detectors 308 and/or ADC 310 may be selected to implement an optical transceiver 92 that is capable of receiving a polarization diverse signal. In some instances, one of the components illustrated in FIG. 5 may perform a function described herein as being performed by another one of the components illustrated in FIG. 5.

Consistent with the present disclosure, in order to select one or more optical subcarriers at a remote network element 14, the local oscillator laser 304 may be tuned to output light having a wavelength relatively close to the selected optical subcarrier(s) wavelength(s) to thereby cause a beating between the local oscillator light and the selected optical subcarrier(s). Such beating will either not occur or will be significantly attenuated for the other non-selected optical subcarriers so that data from the Client Data Stream(s) 110 carried by the selected optical subcarrier is detected and processed by the DSP 90.

In the example shown in FIG. 5, appropriate tuning of the wavelength of the local oscillator laser 304 enables selection of one of the optical subcarriers, e.g., optical subcarrier SC1, carrying signals or data indicative of Client Data Stream 110. Accordingly, optical subcarriers may be effectively routed through the optical network 10 to a desired transceiver 92 in a particular node 14 of the optical network 10.

Accordingly, at each receiver portion 300, the local oscillator laser 304 may be tuned to have a wavelength close to that of one of the optical subcarriers carrying signals and data indicative of the desired client data from the Client Data Stream 110 to be output from the receiver portion 200 of the DSP 90. Such tuning may be achieved by adjusting a temperature or current flowing through local oscillator laser 304, which may include a semiconductor laser, such as a distributed feedback (DFB) laser or distributed Bragg reflector (DBR) laser (not shown). Thus, different optical components in each receiver are not required to select optical signals carrying a desired data stream. Rather, as noted above, the same or substantially the same circuitry may be provided in the transceiver 92 of each node 14, in the optical network 10, and signal or data selection may be achieved by tuning the local oscillator laser 304 to the desired beating wavelength.

The DSP 90 may output data and, based on such output, the temperature of, or the current supplied to, local oscillator laser 304 may be controlled. In the case of temperature control, a thin film heater may be provided adjacent local oscillator laser 304, and an appropriate current may be supplied to such heater, based on output data, to heat laser 304 to the desired temperature. Control circuitry in the DSP 90 may generate output or control the output signal 652. Additionally, or alternatively, such circuitry may be provided outside the DSP 90.

The hardware making up exemplary DSPs 90 and 400 and the transceiver 92 shown in FIGS. 4A, 4B, and 5 have been provided for the purposes of illustration only and should not be considered limiting. Other network systems comprising digital subcarrier based coherent network elements may be specially programmed and/or configured to perform the functions described herein. For example, exemplary network elements that may perform the functions described herein are described in U.S. Pat. No. 11,368,228 titled "Apparatuses and methods for digital subcarrier parameter modifications for optical communication networks", the entire contents of which are incorporated herein by reference.

Figure 6A:
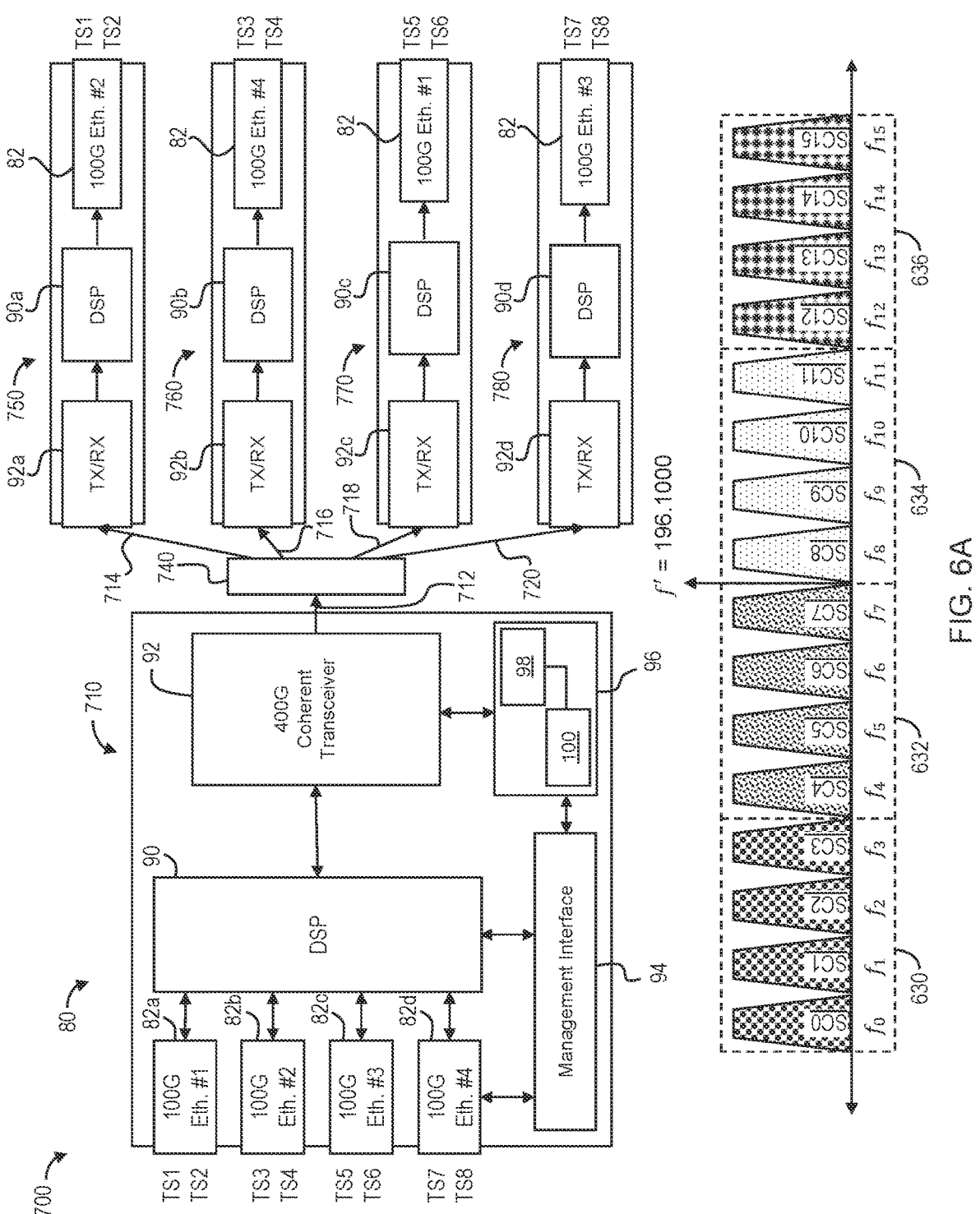
FIGS. 6A and 6B illustrate an exemplary point to multi-point transport network having a hub node and multiple leaf nodes, a transmitting node of the hub node and multiple leaf nodes configured to adjust power of a signal transmitted to a receiving node of the hub node and multiple leaf nodes based a signal quality determined by the receiving node constructed in accordance with the present disclosure.
Figure 6B:
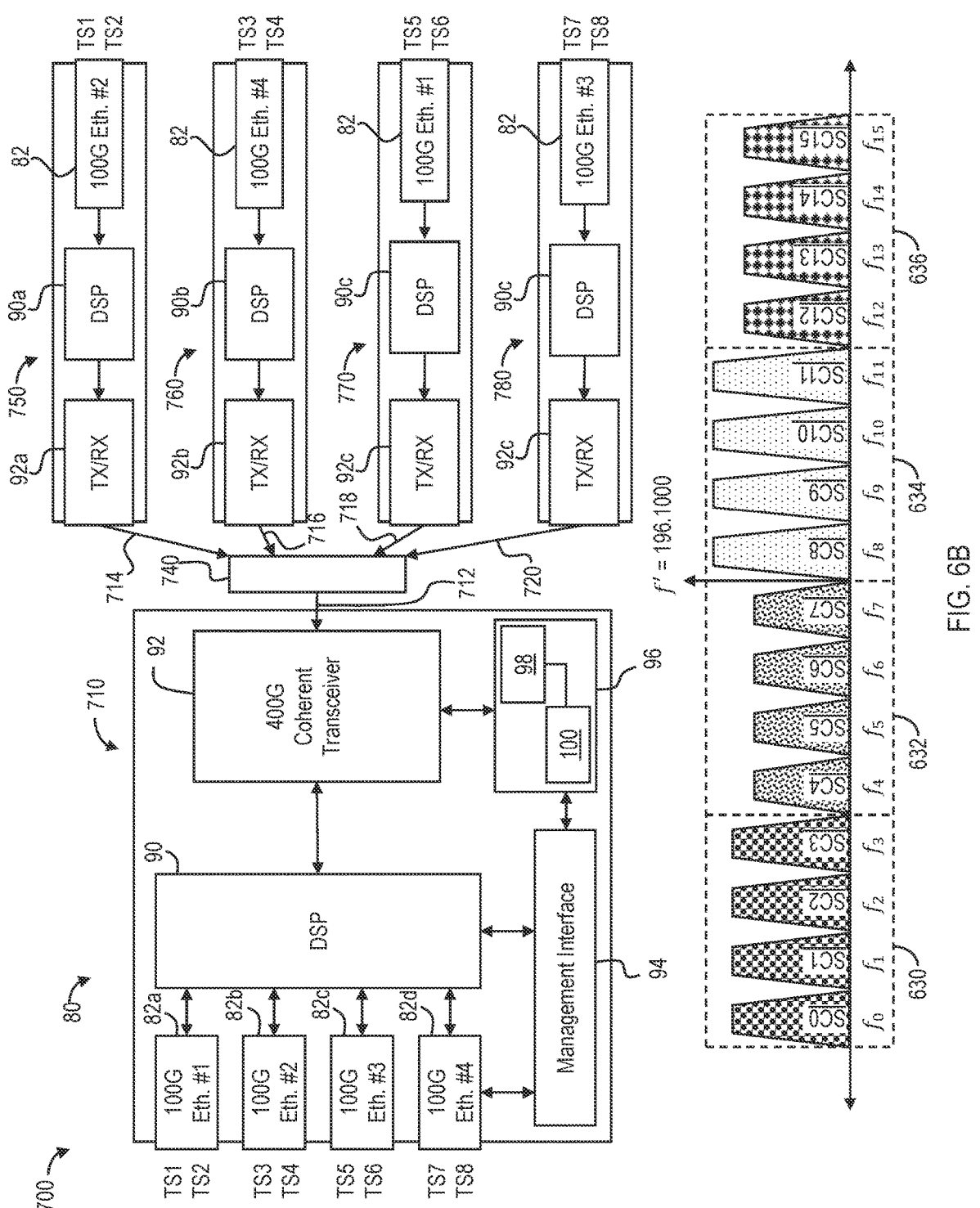

Referring now to FIGS. 6A and 6B, shown therein is an exemplary implementation of a transport network 700. The transport network 700 represents an implementation of a network carrying a point-to-multi-point application with signal optimization. The transport network 700 may be provided with a hub node 710, an optical coupler 740 that splits optical transmissions traveling from the hub node 710 to a first leaf node 750, a second leaf node 760, a third leaf node 770, and a fourth leaf node 780, and combines optical signals traveling from the first leaf node 750, the second leaf node 760, the third leaf node 770, and the fourth leaf node 780 to the hub node 710.

It will be understood that four leaf nodes 750, 760, 770, 780 are shown for exemplary purposes, but that the transport network 700 may have more or fewer leaf nodes. The hub node 710 and the leaf nodes 750-780 are similar to network element 14 described above. Therefore, for the sake of brevity, like elements will be numbered the same and only the differences will be described in further detail. The first leaf node 750, second leaf node 760, the third leaf node 770, and the fourth leaf node 780 are simplified in FIGS. 6A and 6B for ease of illustration but may be similar in construction and/or function to muxponder 80. Further, for the sake of illustration the lines representing the host lanes have been omitted and are represented as text (TS1-TS8).

To determine where to send traffic and/or receive traffic from, the leaf nodes 750-780 identify the client interface (i.e., the hub-client-ID) on the hub node 710 associated with the electrical port 82 that is connected to a desired host/client. For the purposes of illustration, a configuration process establishing a connection between the first leaf node 750 and the hub node 710 will be described. However, it should be noted that the same configuration process may be followed by the remaining leaf nodes 760, 770, 780 or any leaf nodes that may be connected in the future. Further, while a connection of the first leaf node 750 is used for the purposes of illustration, it should be noted that leaf nodes may be turned up/down in any order.

When the first leaf node 750 is connected to the transport network 700, the first leaf node 750 and the hub node 710 communicate over an optical control channel to establish end-to-end (E2E) traffic flows. The hub node 710 may manage admission of the leaf nodes, digital subcarrier SC0-SC15 allocation, and client mapping (e.g., which digital subcarriers are assigned to carry traffic from which electrical ports), and assignment of client interface numbers to electrical ports.

In one implementation, the hub node 710 and the first leaf node 750 may be coherent modules configured to continuously transmit optical signals. For the sake of illustration, the transport network 700 will be described as having a first optical signal travelling in a "downstream" direction from the hub node 710 (transmitting node) to the first leaf node 750 (receiving node) and a second optical signal travelling in an "upstream" direction between the first leaf node 750 (transmitting node) and the hub node 710 (receiving node). The hub node 710 will be described as a 400G hub node configured to send and receive a sixteen (16) digital subcarrier spectrum comprising four subcarrier groups (first subcarrier 630, second subcarrier group 632, third subcarrier group 634, and fourth subcarrier group 636) of four subcarriers each (SC0-SC3, SC4-SC7, SC8-SC11, and SC12-SC15). Each leaf node 750-780 will be described as a 100G leaf node configured to send one subcarrier group (e.g., the first subcarrier group 630 for the first leaf node 750) made up of four digital subcarriers (e.g., SC0-SC3 for the first leaf node 750). In this example, the hub node 710 broadcasts sixteen (16) digital subcarriers (SC0-SC15) towards all the leaf nodes 750-780 in the downstream direction. Each leaf node 750-780 uses coherent channel selection capability to receive an assigned subset of four (4) digital subcarriers (out of the 16) and performs demodulation and decoding.

As the first leaf node 750 and the hub node 710 are establishing a connection, the hub node 710 and the first leaf node 750 may perform a signal optimization cycle wherein at first predetermined intervals, the first leaf node 750 may determine a signal quality of each subcarrier (SC0-SC3) or a signal quality of the first subcarrier group 630 transmitted in the first optical signal received from the hub node 710 and report the signal quality to the hub node 710. The hub node 710 may compare the reported signal quality to a target signal quality margin and determine a power adjustment necessary to optimize the first optical signal from the hub node 710 to the first leaf node 750 (or get the first optical signal within the target signal quality margin) and adjust a transmission power of the first optical signal based on the power adjustment. For the second optical signal received at the hub node 710, the hub node 710 may determine signal quality of the second optical signal at the first predetermined interval, compare the determined signal quality to a target signal quality margin, determine a power adjustment necessary to optimize the second optical signal (or get the second optical signal within the target signal quality margin), and send a power adjustment signal to the first leaf node 750 configured to cause the first leaf node 750 to adjust a power at which the second optical signal is being transmitted from the first leaf node 750 to the hub node 710.

Once the connection between the hub node 710 and the first leaf node 750 has been established, the hub node 710 and the first leaf node 750 may continuously perform the signal optimization cycle (which may be referred to as an optimized signal maintenance cycle) at a second predetermined time interval (that may be longer than the first predetermine time interval) to adjust the power at which the first and second optical signals are being transmitted when it is determined that the signal quality is outside the target signal quality margin.

The signal optimization cycle and/or the optimized signal maintenance cycle may be repeated until the determined signal quality of the first optical signal and the second optical signal are within the target signal quality margin, are within a predetermined margin, or in a case where there are a plurality of subcarrier groups that make up the first optical signal and/or the second optical signal, when a difference in signal quality between the plurality of subcarrier groups is reduced while keeping the signal quality of each of the subcarrier groups within a predetermined range as will described in further detail herein.

In some implementations, the first predetermined interval is a time period measured in seconds between 0.1 seconds and 0.5 seconds. In some implementations, the second predetermined interval is longer than the first predetermined interval. In some implementations, the second predetermined interval is 1 second. In some implementations, the second predetermined interval is a time period measured in seconds between 0.5 seconds and 5 seconds. However, it will be understood that the first predetermined interval and the second predetermined interval may be other time intervals.

An illustrative established traffic flow example will now be described travelling in the "downstream" direction between the hub node 710 and the first leaf node 750. In the illustrated implementation, traffic streams 1 (TS1) and 2 (TS2) coming in on host lanes 1 and 2 are received at the first electrical port 82*a*, traffic streams 3 (TS3) and 4 (TS4) coming in on host lanes 3 and 4 are received at the second electrical port 82*b*, traffic streams 5 (TS5) and 6 (TS6) coming in on host lanes 5 and 6 are received at the third electrical port 82*c*, and traffic streams 7 (TS7) and 8 (TS8) coming in on host lanes 7 and 8 are received at the fourth electrical port 82*d*. In the DSP 90, traffic from traffic streams 1 and 2 are encoded into the first subcarrier group 630, traffic from traffic streams 3 and 4 are encoded into the second subcarrier group 632, traffic streams 5 and 6 are encoded into the third subcarrier group 634, and traffic streams 7 and 8 are encoded into the fourth subcarrier group 636 before being combined in the multiplexer/demultiplexer 170, converted to a combined optical signal in the optical transceiver 92, and being transmitted on the first media lane 712.

The combined optical signal (which may be referred to as a downstream combined optical signal) is split by the optical coupler 740 into a split optical signal and the split optical signal is transmitted on each of a second media lane 714 to the first leaf node 750, a third media lane 716 to the second leaf node 760, a fourth media lane 718 to the third leaf node 770, and a fifth media lane 720 to the fourth leaf node 780. It should be noted that the split optical signal received by each of the first leaf node 750, second leaf node 760, third leaf node 770, and fourth leaf node 780 comprises all of the traffic streams 1-8 of the combined optical signal (i.e., the first digital subcarrier group 630, the second digital subcarrier group 632, the third digital subcarrier group 634, and the fourth digital subcarrier group 636).

The transceiver 92*a* of the first leaf node 750 converts the combined optical signal into a combined digital signal and provides the combined digital signal to the DSP 90*a* of the first leaf node 750. The combined digital signal, still containing the data of all the traffic streams 1-8 (TS1-TS8), may be directed to the multiplexer/demultiplexer 170 of the DSP 90*a* of the first leaf node 750. In some implementations, the multiplexer/demultiplexer 170 may be programmed to demultiplex the combined digital signal into a first digital signal comprising subcarrier SC0 of the first subcarrier group 630, a second digital signal comprising subcarrier SC1 of the first subcarrier group 630, a third digital signal comprising subcarrier SC2 of the first subcarrier group 630, and a fourth digital signal comprising subcarrier SC3 of the first subcarrier group 630 and pass the first digital signal, the second digital signal, the third digital signal, and the fourth digital signal, containing the data of traffic streams 1 and 2, through the DSP 90 and on to electrical connection 82 of the first leaf node 750 as the client data streams 110 as described above.

The remaining traffic streams 3-8 (made up of subcarrier groups 632, 634, and 636) are not used by the first leaf node 750 and may be discarded or ignored by the first leaf node 750. Similar processes are carried out in each of the second leaf node 760 to process the subcarriers of the second subcarrier group 632, the third leaf node 770 to process the subcarriers of the third subcarrier group 634, and the fourth leaf node 780 to process the subcarriers of the fourth subcarrier group 636.

An illustrative traffic flow example will now be described travelling in an "upstream" direction between the first leaf node 750 and the hub node 710. In the illustrated implementation, traffic streams 1 and 2 (TS1, TS2) coming in on host lanes 1 and 2 are received at the electrical port 82 of the first leaf node 750. Traffic streams 1 and 2 are combined in the DSP 90*a* of the first leaf node 750 and converted to an optical signal in the optical transceiver 92*a* of the first leaf node 750 before being transmitted on the second media lane 714. When traffic streams 1 and 2 (TS1, TS2) are combined in the DSP 90*a*, they are encoded into the first subcarrier group 630. Because no other traffic streams are present at the DSP 90*a* of the first leaf node 750, there is nothing encoded in the second subcarrier group 632, the third subcarrier group 634, and the fourth subcarrier group 636 of the second combined optical signal. The second combined optical signal is received at the optical coupler 740 and combined with traffic streams from the second leaf node 760 (encoded into the second subcarrier group 632), the third leaf node 770 (encoded into the third subcarrier group 634), and the fourth leaf node 780 (encoded into the fourth subcarrier group 636) into a second combined optical signal, the second combined optical signal now having data encoded in the entire sixteen (16) subcarrier spectrum (i.e., all of the first subcarrier group 630, the second subcarrier group 632, the third subcarrier group 634, and the fourth subcarrier group 636).

The second combined optical signal (which may be referred to as an upstream combined optical signal) is received by the optical transceiver 92 of the hub node 710, which may operate as described above to provide a digital signal or samples to the DSP 90 of the hub node 710. The combined digital signal, still containing the data of all the traffic streams 1-8, may be directed to the multiplexer/demultiplexer 170 of the DSP 90 of the hub node 710. In some implementations, the multiplexer/demultiplexer 170 of the DSP 90 of the hub node 710 may be programmed to demultiplex the combined digital signal into a first digital signal through a sixteenth digital signal, each comprising one subcarrier (SC0-SC15), and pass the first digital signal through the sixteenth digital signal through the DSP 90 and on to electrical connections 82*a*-82*d* of the hub node 710 as the client data streams 110, as described above.

Different characteristics of transmission paths between nodes 14 such as characteristics of a first transmission path comprising the first optical coupler 740, the first media lane 712, and the second media lane 714 connecting the hub node 710 and the first leaf node 750 and a second transmission path comprising the optical coupler 740, the first media lane 712, and the third media lane 716 connecting the hub node 710 and the second leaf node 760 may result in optical powers of subcarriers 1-4 (SC0-SC3) received at/transmitted from the first leaf node 750 and optical powers of subcarriers 5-8 (SC4-SC7) received at/transmitted from the second leaf node 760 being different. For example, a length of the second transmission path may be longer than a length of the first transmission path or there may be more optical components such as amplifiers in the second transmission path than the first transmission path resulting in the optical signal quality and/or optical powers of subcarriers 5-8 (SC4-SC7) received at the second leaf node 760 being less than the optical signal quality and/or optical powers of subcarriers 1-4 (SC0-SC3) received at the first leaf node 750. The same problem exists for subcarriers transmitted from the leaf nodes 750-780 and received at the hub node 710.

To counteract this degradation of signal quality due to different link losses, the receiving node 14 (hub node 710 or leaf nodes 750-780) may determine (or may receive) a signal quality metric of one or more elements of a received signal. For example, the hub node 710 may determine a signal quality metric of one or more elements of a received signal; and/or the leaf node(s) 750-780 may determine the signal quality metric of one or more elements of a received signal at the leaf node 750-780 and the hub node 710 may receive the signal quality metric from the leaf node(s) 750-780. The signal quality may be used by the hub node 710 to determine a power adjustment that may be used by the transmitting node to optimize output power by increasing or decreasing the output power on a per subcarrier basis and/or a subcarrier group basis. The power adjustment is applied at the transmitter side to ensure that the transmitter itself can make sure that maximum and minimum output power values are not exceeded and can flag corresponding warnings if desired. It should be noted that when the receiving node is a leaf node, in some implementations, determining a signal quality may happen at the receiving node while in other implementations, the receiving node may be programmed to provide data indicative of signal quality to the hub node and the hub node may be programmed to determine the signal quality using the data indicative of signal quality. For instance, the data indicative of signal quality may be one or more of power readings or symbol constellations or other signal quality metrics as described herein.

As a combined optical signal is being processed by a receiving node (the first leaf node 750 will be designated as the receiving node for this illustration, though it will be understood that some or all of these steps may take place within the hub node 710), signal quality correction circuitry may be used to determine one or more signal quality metrics at one or more different points in the first leaf node 750 to be used in the signal optimization cycle and/or the optimized signal maintenance cycle. For instance, in one implementation, the signal quality correction circuitry may include an optical power monitor 301 (FIG. 5) configured to determine an overall level of optical power of the combined optical signal. The overall level of optical power of the combined optical signal may be determined just as, or just before, the combined optical signal enters the transceiver 92a of the first leaf node 750. In one such implementation, the optical power monitor 301 may include an optical tap (not shown)

which may split a portion of a light of the combined optical signal to be processed by the node controller 96. To process the combined optical signal, the optical power monitor 301 may further comprise circuitry such as a tunable filter (not shown) that may scan the light spectrum of the optical subcarriers and transmit the scanned light to and a photodiode (not shown), which may convert the light into electrical signals. The electrical signals may be detected by controller 96, which may track the amount of current and corresponding optical power of the optical subcarriers (that is, the amount of light detected) to determine a first signal quality. The controller 96 of the first leaf node 750 may send the first signal quality to the hub node 710 (acting as the transmitting node in this illustration) via the control channel.

The hub node 710 may determine if adjustments of the signal quality need to be made, the adjustments to the signal quality implemented by utilizing power adjustments to one or more portions of the combined optical signal, such as an adjustment of the overall power of the combined optical signal using the amplifier 260, or an adjustment of one or more power levels of the optical subcarriers of the subcarrier groups 630, 632, 634, and 636 by sending output signals to adjust gains of the digital subcarriers in the DSP 90, such as through controlling the digital multiplier 166 of the hub node 710. The power adjustments may be made by the hub node 710 at the hub node 710, and/or the hub node 710 may signal the leaf node 750 to make the power adjustments at the leaf node 750.

In some implementations, the signal quality correction circuitry may further include the electrical signal power monitor 220 (FIG. 4A) of the DSP 90a of the leaf node 750. In such an implementation, after the combined optical signal has been converted into the combined digital signal in the transceiver 92a of the leaf node 750 and demultiplexed into the first digital signal, the second digital signal, the third digital signal, and the fourth digital signal by the multiplexer/demultiplexer 170 of the DSP 90a of the leaf node 750, the electrical signal power monitor 220 of the DSP 90a may be configured to measure a first level of power of the first digital subcarrier SC0, a second level of power of the second digital subcarrier SC1, a third level of power of the third digital subcarrier SC2, and a fourth level of power of the fourth digital subcarrier SC3 and determine a first signal quality of the first digital subcarrier SC0 by comparing the overall level of optical power of the combined optical signal (determined using the optical signal power monitor 301 as described above) and the first level of power of the first digital subcarrier SC0, a second signal quality of the second digital subcarrier SC1 by comparing the overall level of optical power of the combined optical signal and the second level of power of the second digital subcarrier SC1, a third signal quality of the third digital subcarrier SC2 by comparing the overall level of optical power of the combined optical signal and the third level of power of the third digital subcarrier SC2, and a fourth signal quality of the fourth digital subcarrier SC3 by comparing the overall level of optical power of the combined optical signal and the fourth level of power of the fourth digital subcarrier, and send the first signal quality, the second signal quality, the third signal quality, and the fourth signal quality to the hub node processor 98 of the hub node 710.

The processor 98 of the hub node controller 96 of the hub node 710 may compare the first signal quality to a first target signal quality margin, the second signal quality to a second target signal quality margin, the third signal quality to a third target signal quality margin, and the fourth signal quality to a fourth target signal quality margin. The processor 98 of the hub node controller 96 may determine that one or more of the first, second, third, and/or fourth signal quality is outside the first, second, third, and/or fourth target signal quality. In order to adjust one or more of the first, second, third, and/or fourth signal quality, the processor 98 of the hub node controller 96 may output signals to adjust gains of the digital subcarriers in the DSP 90 of the hub node 710 (the transmitting node in this illustration), such as through controlling the digital multipliers 166, for example, thereby adjusting the optical power of the optical subcarriers, when one or more of the first signal quality is outside the first target signal quality margin, the second signal quality is outside the second target signal quality margin, the third signal quality is outside the third target signal quality margin, and/or the fourth signal quality is outside the fourth target signal quality margin. In some implementations, the first, second, third, and/or fourth target signal quality margins may be a predetermined number and/or a predetermined range of numbers.

In some implementations, the signal quality correction circuitry may further include the electrical signal power monitor 220 of the DSP 90 of the hub node 710 (the receiving node in this example). In such an implementation, after the combined optical signal has been converted into the combined digital signal in the transceiver 92 and demultiplexed into the first digital subcarrier signal, the second digital subcarrier signal, the third digital subcarrier signal, and the fourth digital subcarrier signal by the multiplexer/demultiplexer 170, the electrical signal power monitor 220 of the DSP 90 may be configured to measure a first level of power of the first digital subcarrier group 630 by determining a level of power of each of the first digital subcarrier signal, the second digital subcarrier signal, the third digital subcarrier signal, and the fourth digital subcarrier signal and combining them. The DSP 90 may then use the first level of power of the first digital subcarrier group to determine a first signal quality by comparing the overall level of optical power of the combined optical signal (determined using the optical signal power monitor 301 as described above) and the first level of power of the first digital subcarrier group 630 to determine a first signal quality. The processor 98 of the hub node controller 96 may compare the first signal quality to a first target signal quality margin (which may be a predetermined number or a range of numbers). The processor 98 of the hub node controller 96 may determine that the first signal quality is different than the first target signal quality margin and may adjust the first signal quality by outputting a first power adjustment that may be send to the first leaf node 750. The first power adjustment may be configured to cause the first leaf node 750 to adjust the output power the first optical subcarrier group 630 using the modulator 258 or the combined optical signal using the amplifier 260, for example.

In some implementations, the first leaf node 750 and/or the hub node 710 may be configured to determine signal quality of a received signal based on one or more of: a signal to noise ratio (SNR), a bit error rate (BER), a quality factor (Q-factor), mutual information, error vector magnitude (EVM), and/or combinations thereof.

For instance, in some implementations, the DSP 90*a* of the first leaf node 750 may be configured and/or programmed to determine a signal to noise ratio for each subcarrier processed by the DSP 90*a* (SC0-SC3 for the first leaf node 750). In such an implementation, after the combined optical signal has been converted into the combined digital signal in the transceiver 92*a* of the first leaf node 750 and demultiplexed into the first digital signal, the second digital signal, the third digital signal, and the fourth digital signal by the multiplexer/demultiplexer 170, the bits-to-symbol component 212 may be configured to receive the first digital signal, the second digital signal, the third digital signal, and the fourth digital signal and map each bit in the digital signal to a symbol in a constellation for each of the first digital signal, the second digital signal, the third digital signal, and the fourth digital signal and send the symbols in the constellations to the processor 146 (FIGS. 4A-4B) of the DSP 90*a* of the first leaf node 750. The processor 146 may be programmed to determine a SNR of each one of the first digital signal, the second digital signal, the third digital signal, and the fourth digital signal using the symbols in the constellations as is known in the art. In some implementations, the SNR of the first digital signal is used as a first signal quality, the SNR of the second digital signal is used as a second signal quality, the SNR of the third digital signal is used as a third signal quality, and/or the SNR of the fourth digital signal is used as a fourth signal quality. It should be noted here that in some implementations, the first leaf node 750 may send the mapped symbols in the constellations to the hub node 710 for processing to determine the signal quality (SNR) of each of the first digital signal, the second digital signal, the third digital signal, and the fourth digital signal.

Once the first leaf node 750 has determined the first signal quality, the second signal quality, the third signal quality, and the fourth signal quality, the first leaf node 750 may send a signal comprising the first signal quality, the second signal quality, the third signal quality, and the fourth signal quality to the hub node controller 96 of the hub node 710 via the control channel, for instance. The processor 98 of the hub node controller 96 may compare the first signal quality to a first target signal quality, the second signal quality to a second target signal quality, the third signal quality to a third target signal quality, and the fourth signal quality to a fourth target signal quality. The processor 98 of the hub node controller 96 may determine that one or more of: the first signal quality is different than the first target signal quality, the second signal quality is different than the second target signal quality, the third signal quality is different than the third target signal quality, and the fourth signal quality is different than the fourth target signal quality. The processor 98 of the hub node controller 96 may send a signal to the leaf node 750 configured to cause the leaf node 750 to adjust one or more of the first, second, third and fourth signal quality to be within the target signal quality margin and/or be within a predetermined range of target signal quality numbers by outputting signals to adjust gains of the digital subcarriers in the DSP 90, such as through controlling the digital multipliers 166, for example, thereby adjusting the optical power of the optical subcarriers.

The SNR can be derived from the received symbols by, for example, the following:

Calculate error between known sequence (e.g., from a frame header) and received symbols, such as with the following formula:

$$SNR = \frac{\langle \text{reference}^2 \rangle}{\langle (\text{reference} - \text{received})^2 \rangle}$$

Decide received symbols and calculate error between decided and received symbols, such as with the following formula:

$$SNR = \frac{\langle \text{decided}^2 \rangle}{\langle (\text{decided} - \text{received})^2 \rangle}$$

Calculate BER based on known sequence (e.g., from a frame header). Convert BER to SNR based on inverse complementary error function, such as with the following formula:

$$SNR = \text{erfc}^{-1}(2 \cdot BER) \cdot \sqrt{2} \text{ (here for } QPSK)$$

The determined SNR may contain noise contributions from all components in a transmission path, such as, for instance, the link 22, as well as the implementation SNRs from the transmitter (hub node 710) and receiver (first leaf node 750) in the above example. Link noise contributions from all of the components in a transmission path may be considered to optimize signal quality on the link.

Bit error rate (BER), quality factor (Q-factor), mutual information, error vector magnitude (EVM), and/or combinations thereof may similarly be determined using the DSP 90 as is known in the art and used as signal quality metrics that may be used to adjust the optical power of the optical subcarriers and/or subcarrier groups as explained above.

It should be noted that the target signal quality margin may be a desired SNR plus a margin, where the desired SNR is an optimal SNR which may be calculated based on the components of the transmission path and the margin may be a number determined by a client or user of the network. It should be noted that each leaf node 750-780 is assumed to have a certain transmit SNR, which changes with its output power (less output power means worse transmit SNR) and therefore the transmit SNR changes during the optimization. This can lead to situations in which leaf nodes 750-780 that are physically closer to the hub node suffer more SNR degradation than leaf nodes 750-780 that are physically further away from the hub node.

The target signal quality margin may include a window range (which may also be referred to as a dead zone) in which the signal quality is considered to be sufficiently near to the desired value such that further optimization is unnecessary or within measurement accuracy. In some implementations, target signal quality margin may be determined based on reducing a difference in signal quality between the subcarrier groups while keeping the signal quality within a predetermined range, the predetermined range having a minimum required value (that may be referred to as an acceptable target) and a maximum required value (that may be referred to as a desired target). Each of the acceptable target and the desired target may have a window range.

Figure 7A:
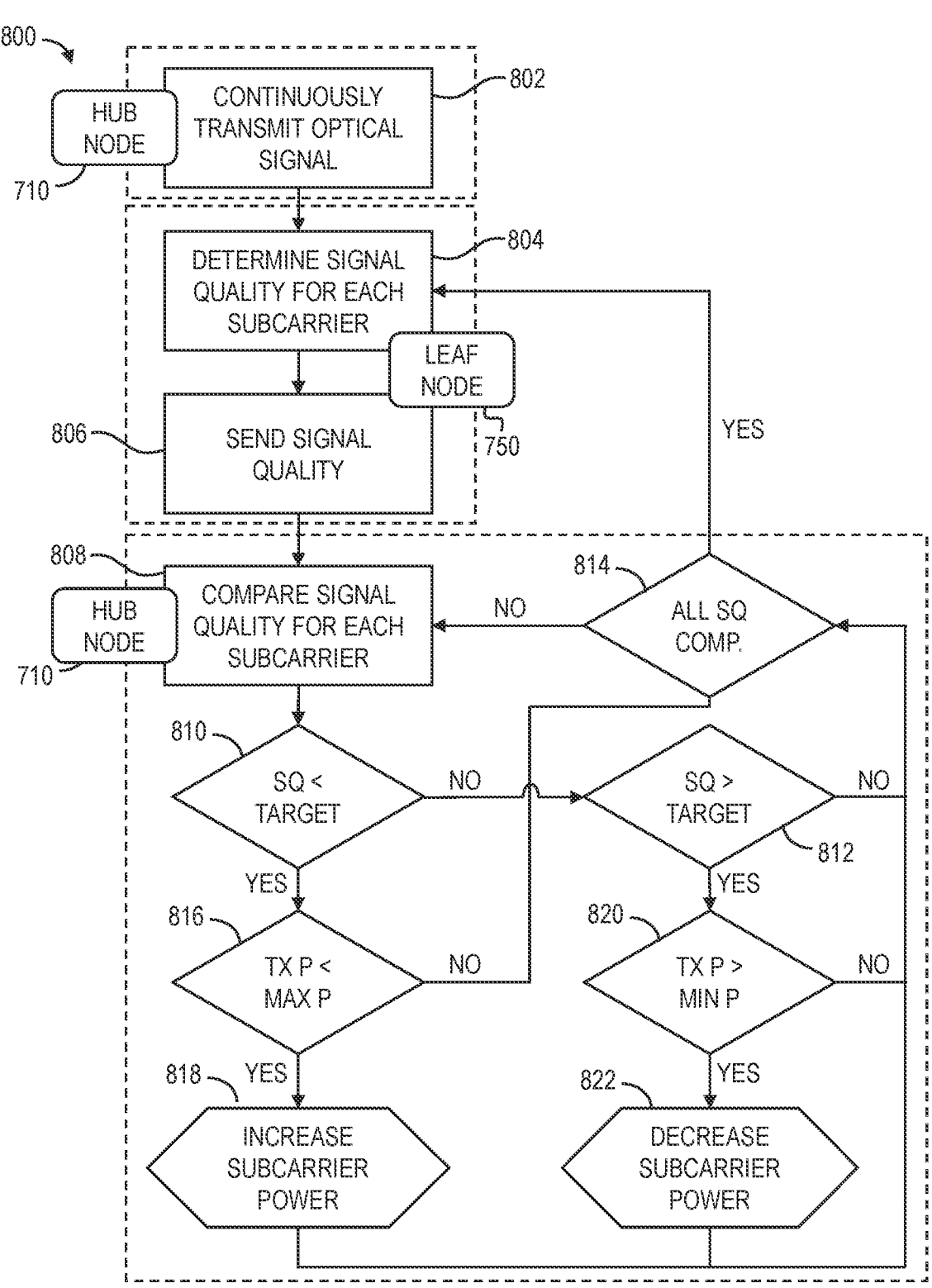
FIG. 7A is a process flow diagram of an exemplary method of adjusting a transmission power of an optical signal transmitted from a hub node to a leaf node in accordance with the present disclosure.
Figure 7B:
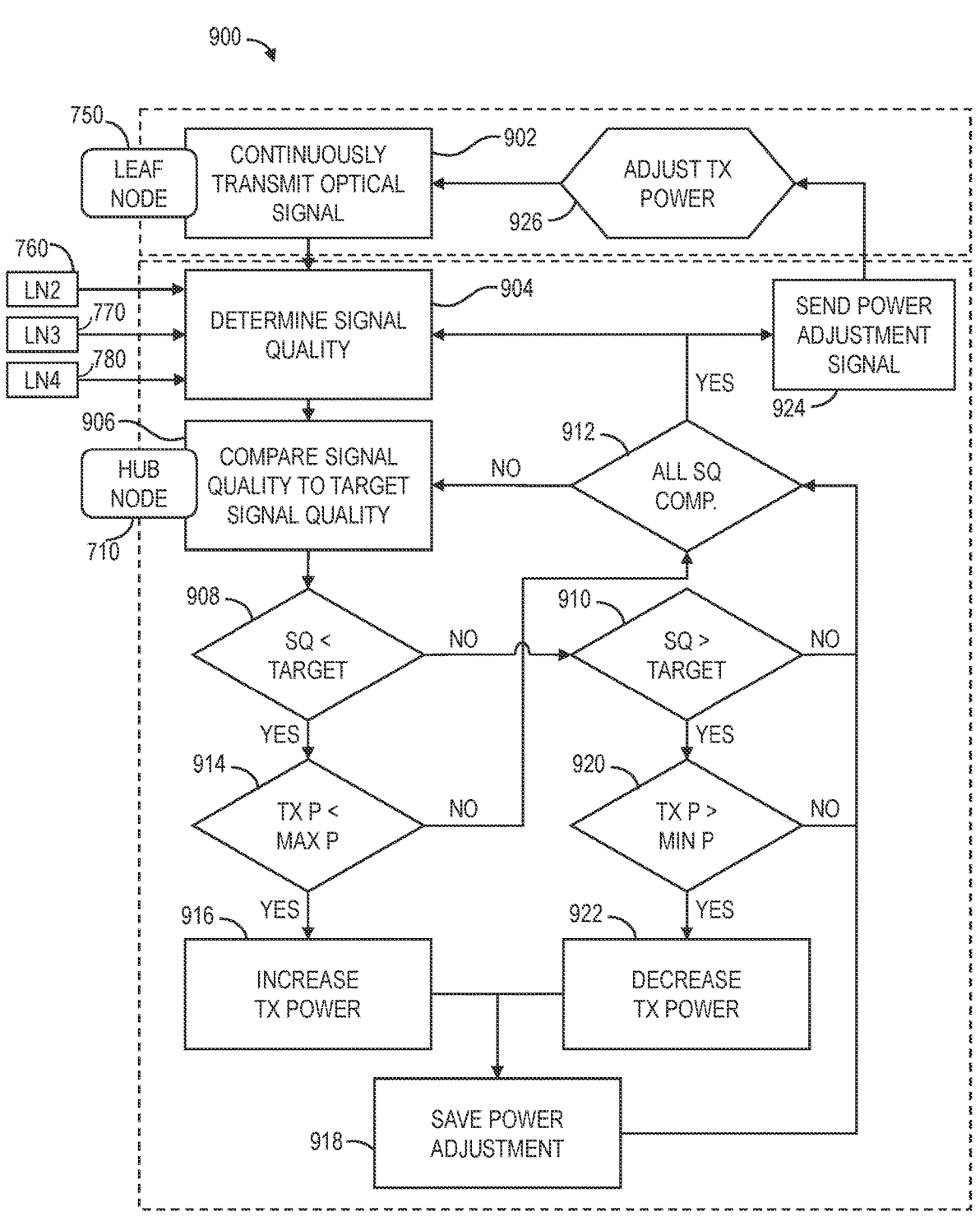
FIG. 7B is a process flow diagram of an exemplary method of adjusting a transmission power of an optical signal transmitted from a leaf node to a hub node in accordance with the present disclosure.

Referring now to FIGS. 7A and 7B, shown therein are methods for optimizing signal quality in a signal transmitted from the hub node 710 to the first leaf node 750 (FIG. 7A) and a signal transmitted from the first leaf node 750 to the hub node 710 (FIG. 7B). For ease of illustration, the elements of the network 700 described above will be used when describing the methods in FIGS. 7A and 7B. The processes or methods described with respect to FIGS. 7A and 7B can be executed following a round robin approach, iterating through individual subcarriers (such as SC0-SC3)

or subcarrier groups (such as first subcarrier group 630). When iterating through individual subcarriers, the individual signal quality measurements (such as SNR measurements) of each subcarrier can be used. When iterating through subcarrier groups, the signal quality measurements (such as SNRs) of the individual subcarriers within a subcarrier group can be averaged to drive the decision.

Referring now to FIG. 7A in particular, shown therein is an exemplary optimization process 800 between a transmitting node (hub node 710) and a receiving node (first leaf node 750). In step 802, the hub node 710 begins continuously transmitting an optical signal. The optical signal is transmitted at an overall signal power and comprises the first subcarrier group 630 made up of the first subcarrier SC0 transmitted at a first output power, the second subcarrier SC1 transmitted at a second output power, the third subcarrier SC2 transmitted at a third output power, and the fourth subcarrier SC3 transmitted at a fourth output power. It should be noted that the first optical signal may further comprise the second subcarrier group 632, the third subcarrier group 634, and the fourth subcarrier group 636 as described above. However, only the first subcarrier group 630 is intended for the first leaf node 750. As a result, the first leaf node 750 may discard the second subcarrier group 632, the third subcarrier group 634, and the fourth subcarrier group 636, so they will not be discussed further with respect to the optimization process 800 in this example.

The optical transceiver 92a of the first leaf node 750 is configured to receive the optical signal over the link 22 connecting the leaf node 750 and the hub node 710. The leaf node 750 further comprises signal quality correction circuitry configured to determine a signal quality of each subcarrier SC0-SC3 of the optical signal in step 804 as described above. In the illustrated implementation, the signal quality correction circuitry includes the bits-to-symbol component 212 which may be configured to receive the first digital signal, the second digital signal, the third digital signal, and the fourth digital signal and map each bit in the digital signal to a symbol in a constellation for each of the first digital signal, the second digital signal, the third digital signal, and the fourth digital signal and send the symbols in the constellations to the processor 146 of the DSP 90a of the first leaf node 750. The processor 146 may be programmed to determine a signal quality, such as a SNR, of each one of the first digital signal, the second digital signal, the third digital signal, and the fourth digital signal using the symbols in the constellations as is known in the art. The SNR of the first digital signal may be a first signal quality, the SNR of the second digital signal may be a second signal quality, the SNR of the third digital signal may be a third signal quality, and/or the SNR of the fourth digital signal may be a fourth signal quality.

In step 806, the leaf node 750 may send a signal comprising the first signal quality, the second signal quality, the third signal quality, and the fourth signal quality to the hub node controller 96 of the hub node 710 via the control channel, for instance.

In step 808, the processor 98 of the hub node controller 96 of the hub node 710 iterates through comparing the first signal quality to a first target signal quality, the second signal quality to a second target signal quality, the third signal quality to a third target signal quality, and the fourth signal quality to a fourth target signal quality. For the purposes of illustration, comparison of the first signal quality to the first target signal quality will be described in detail.

The processor 98 of the hub node 710 may determine whether the first signal quality meets the first target signal quality (which may be a predetermined number or range of numbers). For example, in step 810, the processor 98 of the hub node 710 determines if the first signal quality is less that the first target signal quality. If the first signal quality is not less than the first target signal quality, in step 812 the processor 98 of the hub node 710 determines if the first signal quality is greater than the first target signal quality, though it will be understood that step 810 and step 812 may be in the opposite sequence. If the first signal quality is not greater than the first target signal quality, in step 814 the processor 98 of the hub node 710 determines if the signal quality of all subcarriers have been compared to their respective target signal quality.

If the signal quality of all subcarriers have been compared to their respective target signal quality, the optimization process 800 returns to step 804 to determine a signal quality of each subcarrier in the optical signal.

If the signal quality of all subcarriers have not been compared to their respective target signal quality, the process 800 returns to step 808 to iterate through comparing the signal quality of each subcarrier to the respective target signal quality. For instance, the second signal quality may be compared to the second target signal quality next.

Returning now to step 810, if the first signal quality is less than the first target signal quality, in step 816 the processor 98 of the hub node 710 determines if the first output power of the first subcarrier is less than a maximum output power of the hub node 710.

If the processor 98 of the hub node 710 determines that the first output power of the first subcarrier is less than the maximum output power of the hub node 710, in step 818 the processor 98 of the hub node 710 sends a signal to the digital multiplier 166, for instance, causing the digital multiplier 166 to increase the first power output of the first subcarrier in the optical signal. While the process 800 shows the process 800 returning to step 802 to transmit optical signal, it should be noted that in the illustrated example the hub node 710 is a coherent transmitter and the optical signal is continuously transmitted from the hub node 710 to the leaf node 750. Therefore, in practice, the hub node 710 would be programmed to increase the first power output of the first subcarrier while continuously transmitting the optical signal and not begin transmitting the optical signal over again.

If the processor 98 of the hub node 710 determines that the first output power of the first subcarrier is not less than the maximum output power of the hub node 710, the process 800 causes the processor 98 of the hub node 710 to perform step 814 as described above.

Returning now to step 812, if the first signal quality is greater than the first target signal quality, in step 820 the processor 98 of the hub node 710 determines if the first output power of the first subcarrier is greater than a minimum output power of the hub node 710.

If the processor 98 of the hub node 710 determines that the first output power of the first subcarrier is not greater than the minimum output power of the hub node 710, the process 800 causes the processor 98 of the hub node 710 to perform step 814 as described above.

If the processor 98 of the hub node 710 determines that the first output power of the first subcarrier is greater than the minimum output power of the hub node 710, in step 822 the processor 98 of the hub node 710 sends a signal to the digital multiplier 166, for instance, causing the digital multiplier 166 to decrease the first power output of the first subcarrier in the optical signal. While the process 800 shows the process 800 returning to step 802 to transmit optical signal, as noted above, the optical signal is continuously transmitted. Therefore, in practice, the hub node 710 would be programmed to decrease the first power output of the first subcarrier while continuously transmitting the optical signal and not begin transmitting the optical signal over again.

Referring now to FIG. 7B, shown therein is an optimization process 900 between a transmitting node (leaf node 750) and a receiving node (hub node 710). In step 902, the leaf node 750 begins continuously transmitting an optical signal. The optical signal comprises the first subcarrier group 630 made up of the first subcarrier SC0 transmitted at a first output power, the second subcarrier SC1 transmitted at a second output power, the third subcarrier SC2 transmitted at a third output power, and the fourth subcarrier SC3 transmitted at a fourth output power. The optical signal is transmitted at an overall signal power (referred to as a transmission output power) that includes the output powers of each of the subcarriers and any amplification power added by the amplifier 260.

The optical transceiver 92 of the hub node 710 is configured to receive the optical signal over the link 22 connecting the leaf node 750 and the hub node 710. The hub node 710 further comprises signal quality correction circuitry configured to determine a signal quality of the first subcarrier group 630 and/or each subcarrier SC0-SC3 of the optical signal in step 904. In an implementation where the signal quality correction circuitry of the hub node 710 is configured to determine a signal quality for each subcarrier SC0-SC3 of the optical signal, the signal quality correction circuitry includes circuitry configured to convert the optical signal to a digital signal (such as ADC 310), circuitry to demultiplex the digital signal to a first digital signal, a second digital signal, a third digital signal, and a fourth digital signal (such the multiplexer/demultiplexer 170, for instance), digital demodulator circuitry and bits-to-symbol component 212 that is part of the DSP 90a which may be configured to receive the first digital signal, the second digital signal, the third digital signal, and the fourth digital signal and map each bit in the digital signal to a symbol in a constellation for each of the first digital signal, the second digital signal, the third digital signal, and the fourth digital signal and send the symbols in the constellations to the processor 146. The processor 146 may be programmed to determine a SNR of each one of the first digital signal, the second digital signal, the third digital signal, and the fourth digital signal using the symbols in the constellations as is known in the art, the SNR of the first digital signal being a first signal quality, the SNR of the second digital signal being a second signal quality, the SNR of the third digital signal being a third signal quality, and the SNR of the fourth digital signal being a fourth signal quality.

In step 906, the processor 98 of the hub node controller 96 of the hub node 710 iterates through comparing the first signal quality to a first target signal quality, the second signal quality to a second target signal quality, the third signal quality to a third target signal quality, and the fourth signal quality to a fourth target signal quality. For the purposes of illustration, comparison of the first signal quality to the first target signal quality will be described in detail.

The processor 98 of the hub node 710 may determine whether the first signal quality meets the first target signal quality (which may be a predetermined number or range of numbers). In step 908, the processor 98 of the hub node 710 determines if the first signal quality is less that the first target signal quality. If the first signal quality is not less than the first target signal quality, in step 910 the processor 98 of the hub node 710 determines if the first signal quality is greater than the first target signal quality. However, it will be understood that step 910 and step 912 may be in the opposite sequence If the first signal quality is not greater than the first target signal quality, in step 912 the processor 98 of the hub node 710 determines if the signal quality of all subcarriers have been compared to their respective target signal quality.

If the signal quality of all subcarriers have not been compared to their respective target signal quality, the process 800 returns to step 906 to iterate through comparing the signal quality of each subcarrier to the respective target signal quality. For instance, the second signal quality may be compared to the second target signal quality next.

Returning now to step 908, if the first signal quality is less than the first target signal quality, in step 914 the processor 98 of the hub node 710 determines if the first output power of the first subcarrier is less than a maximum output power of the hub node 710.

If the processor 98 of the hub node 710 determines that the first output power of the first subcarrier is less than the maximum output power of the hub node 710, in step 916 the processor 98 of the hub node 710 determines a power adjustment to increase the first power output of the first subcarrier.

The processor 98 may cause the power adjustment to be saved in the memory 100 of the node controller 96 in step 918 while the process 900 iterates through comparing signal quality for each subcarrier. To continue the process 900, in step 918 the processor 98 causes the process 900 to perform step 912 as described above.

Returning now to step 914, if the processor 98 of the hub node 710 determines that the first output power of the first subcarrier is not less than the maximum output power of the hub node 710, the process 900 causes the processor 98 of the hub node 710 to perform step 912 as described above.

Returning now to step 910, if the first signal quality is greater than the first target signal quality, in step 920 the processor 98 of the hub node 710 determines if the first output power of the first subcarrier is greater than the minimum output power of the first leaf node 750.

If the processor 98 of the hub node 710 determines that the first output power of the first subcarrier is not greater than the minimum output power of the first leaf node 750, the process 900 causes the processor 98 of the hub node 710 to perform step 912 as described above.

If the processor 98 of the hub node 710 determines that the first output power of the first subcarrier is greater than the minimum output power of the first leaf node 750, in step 922 the processor 98 of the hub node 710 determines a power adjustment to decrease the first power output of the first subcarrier.

In some implementations, the processor 98 may cause the power adjustment to be saved in the memory 100 of the node controller 96 in step 918 while the process 900 iterates through comparing signal quality for each subcarrier. It should be noted that the "power adjustment" may include instructions to increase and/or decrease more than one output power. For example, each time a new power adjustment is determined in step 916 or 922, the new power adjustment may be appended to any existing power adjustment. Once the power adjustment is saved, the processor 98 causes the process 900 to return to step 912 as described above.

Returning now to step 912, if the processor 98 determines that the signal quality of all of the subcarriers have been compared, in step 924 the processor 98 may retrieve the power adjustment (which contains all increase and/or decrease power adjustments determined by the process 900) from the memory 100 and generates a power adjustment signal comprising the power adjustment and sends the power adjustment signal to the leaf node 750.

In step 926, the leaf node 750 receives the power adjustment signal which causes the processor 98a to adjust one or more of the output powers of the subcarriers and/or a power of the first subcarrier group 630. For instance, in an implementation where the output powers of the individual subcarriers are to be adjusted, the processor 98a of the leaf node 750 sends a signal to the digital multiplier 166, for instance, causing the digital multiplier 166 to increase or decrease the first power output of the first subcarrier in the optical signal depending on the power adjustment contained in the power adjustment signal. In an implementation where the output power of the subcarrier group transmitted by the leaf node 750 (subcarrier group 630 in this illustration) is to be adjusted, the processor 98a of the leaf node 750 may send a signal to one or more of the modulator 258 and/or the amplifier 260 configured to cause the modulator 258 and/or the amplifier 260 to adjust the transmission power at which the first subcarrier group 630 is transmitted based on the power adjustment contained in the power adjustment signal.

It should be noted that the optimization processes 800 and 900 can run at different speeds, e.g., on a fast timescale during addition of a new subcarrier(s) and/or a new network element such as a new leaf node 14, or on a slower time scale to adjust to changes on the optical link. It is important to note that a change of the transmitter output power may be done in sufficiently small steps, since changing the output power might affect the signal quality (such as the SNR) of all other subcarriers/subcarrier groups. A time interval between iterative cycles of the process 800 and/or the process 900 may be a predetermined time interval as discussed above.

Figure 8:
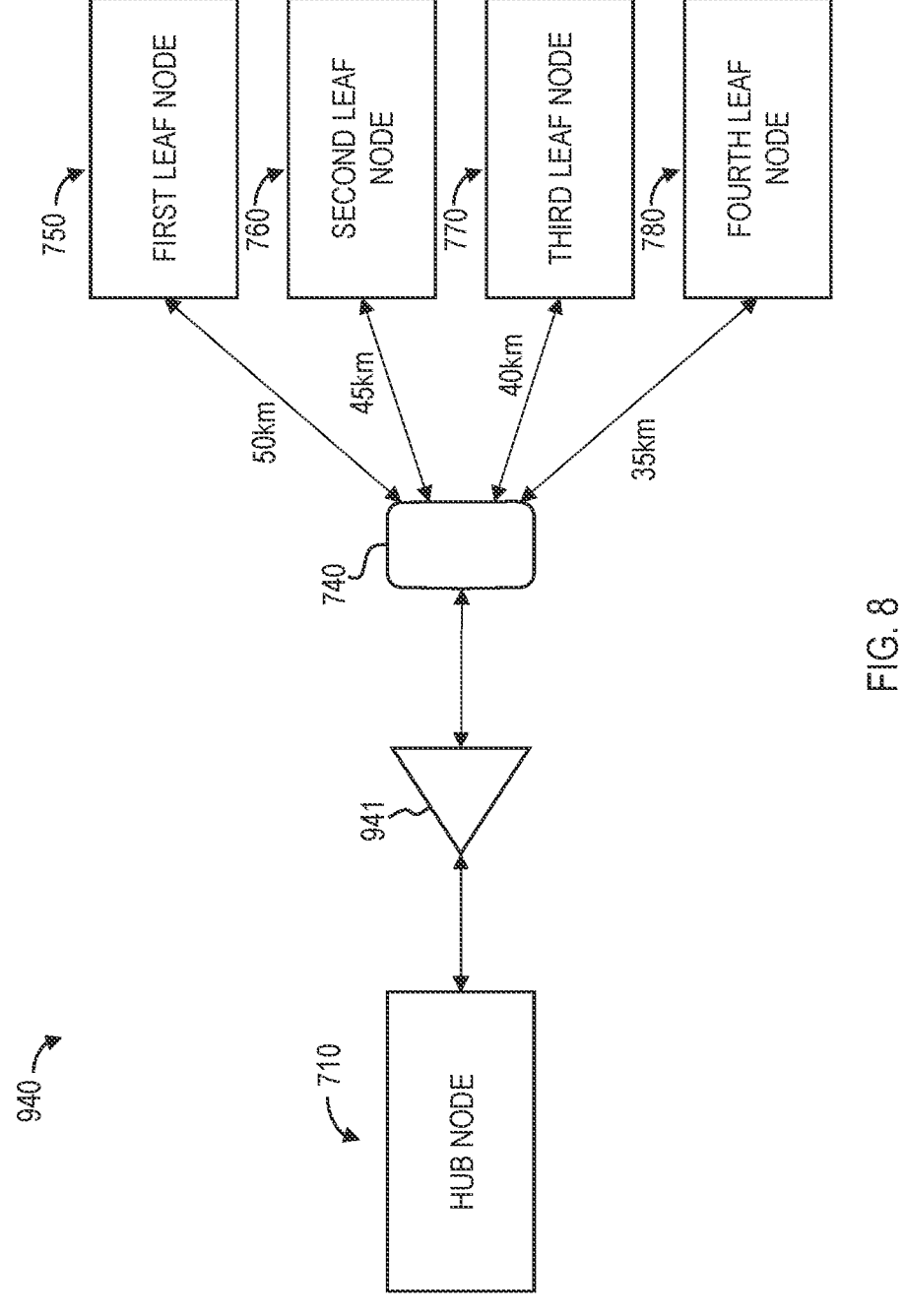
FIG. 8 illustrates an exemplary point to multi-point transport network having a hub node and multiple leaf nodes used to simulate signal optimization methods, the results of which are represented in FIGS. 9A-12.

Referring now to FIG. 8, shown therein is an exemplary network 940 that is similar to network 700 of FIGS. 6A-6B with the exception that a fixed gain EDFA 941 is place in the link 22 between the optical coupler 740 and the hub node 710. The exemplary network 940 has been assigned link lengths of the second media lane (50 km), the third media lane (45 km), the fourth media lane (40 km), and the fifth media lane (35 km) for the purposes of testing optimization of signals on the network 940. Simulation testing was performed with transmission from the leaf nodes 750-780 to the hub node 710 (i.e., the "upstream" direction).

The simulation testing focuses on SNR based optimization, where the target signal quality is 16 dB SNR on each subcarrier (13 dB for Dual Polarization-16QAM plus 3 dB margin). Results of the simulation testing of network 940 are shown in FIGS. 9A-9F. Results for a power equalization approach, in which transmissions from all leaf nodes 750-780 are received by the hub node 710 at the same power (here −12 dBm from each leaf, −18 dBm per sub-carrier) are shown for comparison.

Of note, each leaf node 750-780 may be assumed to have a certain transmit SNR, which changes with its output power (less output power means worse transmit SNR) and, therefore, the transmit SNR changes during the optimization process. This can lead to situations in which leaf nodes (e.g., the fourth leaf node 780 at 35 km) that are physically closer to the hub node 710 suffer more SNR degradation than leaf nodes that are physically further away (e.g., the first leaf node 750 at 50 km).

Figure 9A:
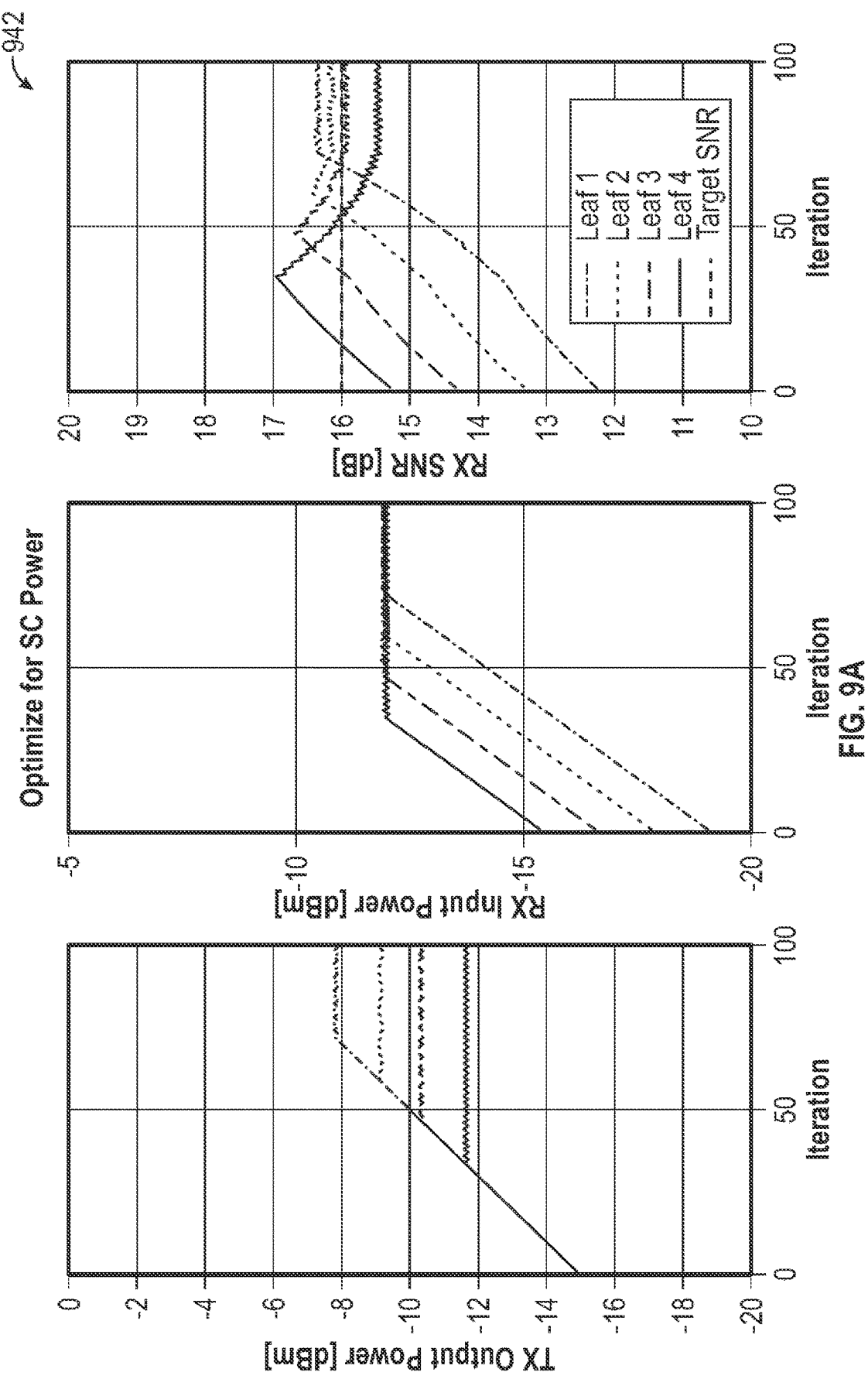
FIGS. 9A-9F are result diagrams illustrating simulated testing results of an SNR optimization method and a power optimization method in accordance with the present disclosure.
Figure 9B:
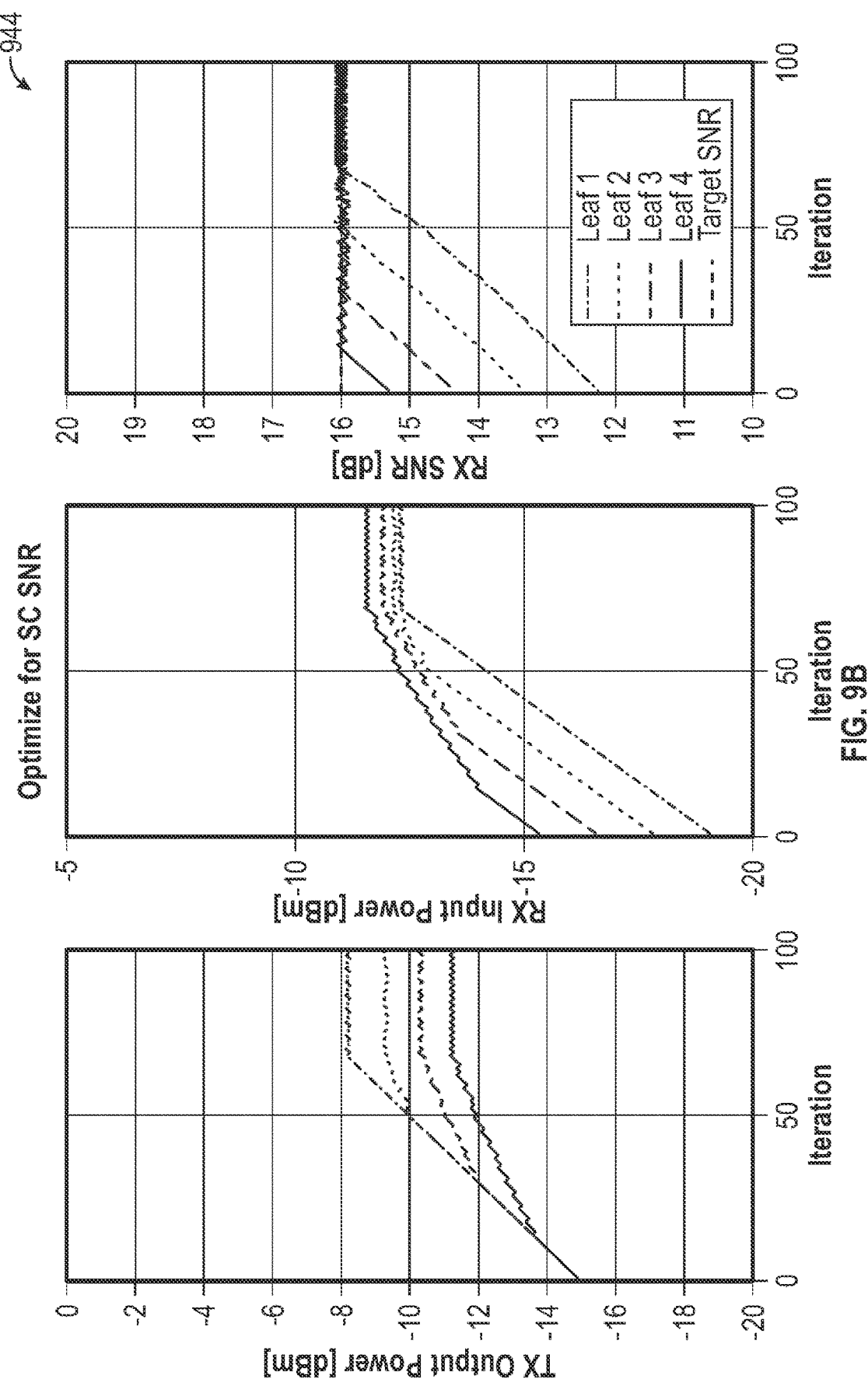

FIGS. 9A and 9B shows an example in which all leaf node transmitters start at a low optical output power (for the purposes of this simulation, −15 dBm was used). As illustrated in FIGS. 9A and 9B, in both the power optimization method (illustrated in diagram 942 of FIG. 9A) and the SNR optimization method (illustrated in diagram 944 of FIG. 9B), all leaf nodes 750-780 adapt their output power and reach an SNR above 13 dBm (or within the "window range" of the target signal quality 16 dBm), which allows for an error free operation. Important to note here is that the power optimization (diagram 942) does not reach the same SNR margin on all sub-carriers, where the SNR optimization (diagram 944) results in substantially the same performance and same margin on all sub-carriers.

Figure 9C:
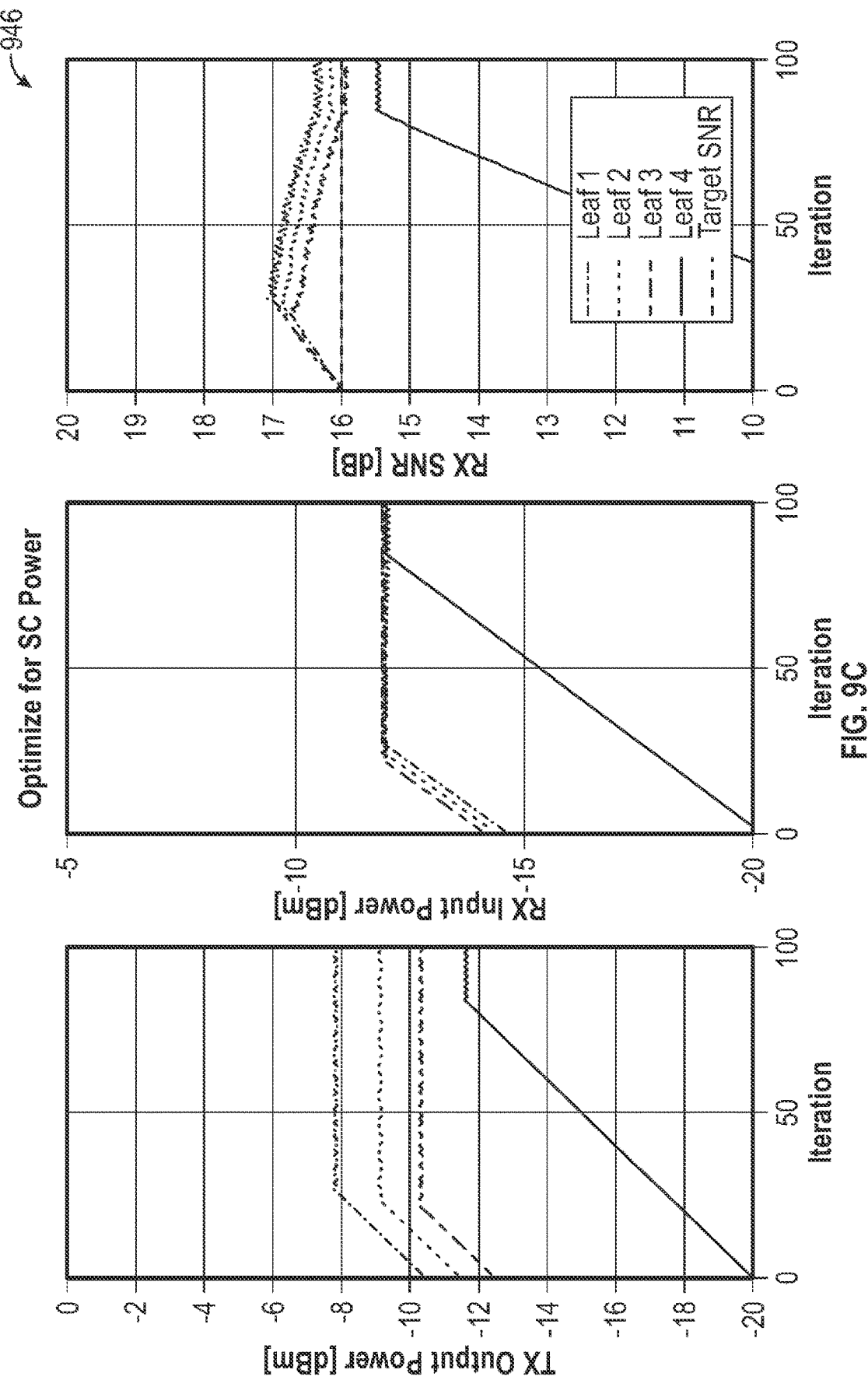
Figure 9D:
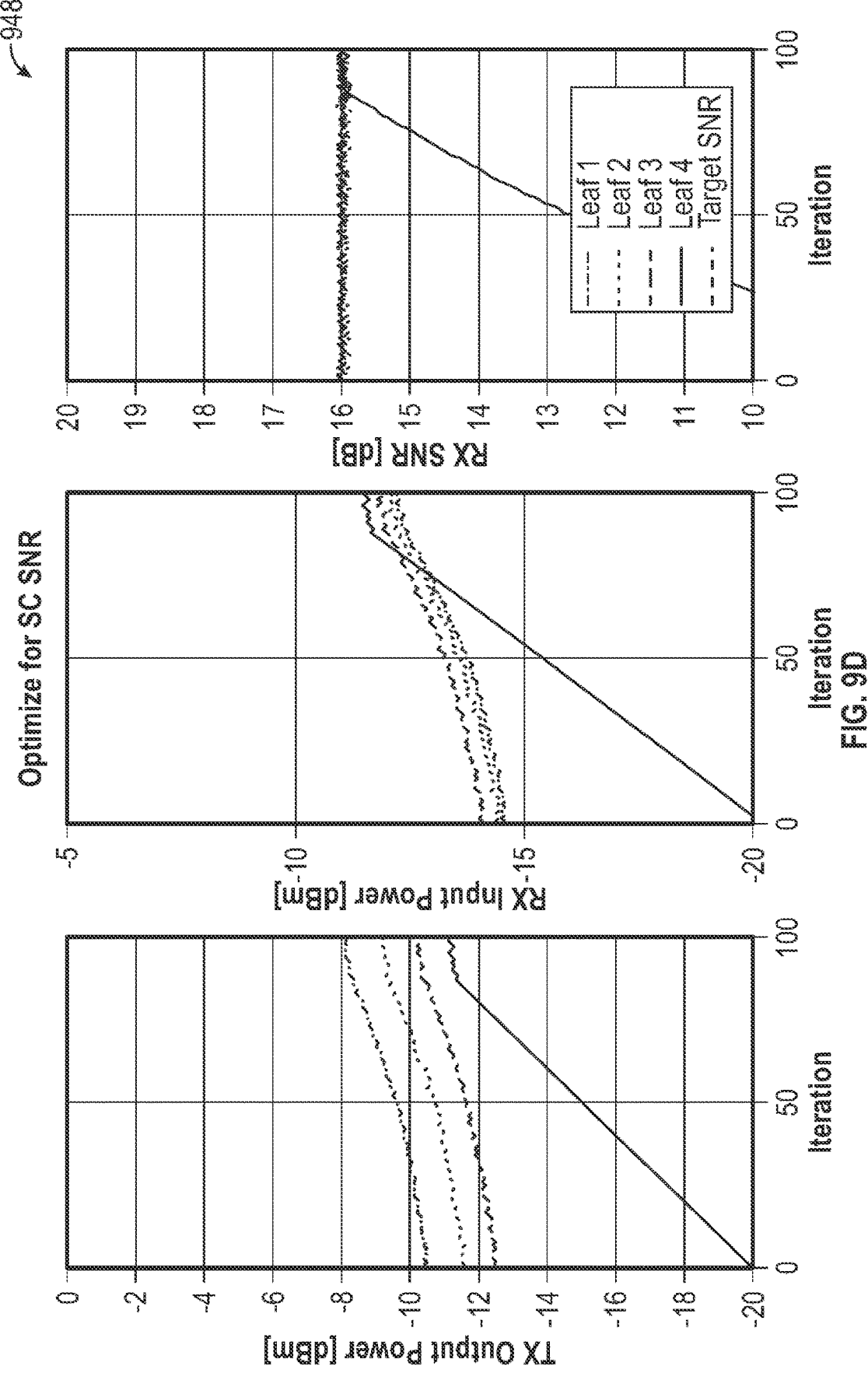

The other two examples shown in FIGS. 9C-9F lead to the same result, but the starting conditions are different. FIGS. 9C and 9D show a scenario where the first leaf node 750, the second leaf node 760, and the third leaf node 770 are already in operation and the fourth leaf node 780 is slowly added. The power optimization method is illustrated in diagram 946 of FIG. 9C and the SNR optimization method is illustrated in diagram 948 of FIG. 9D.

Figure 9E:
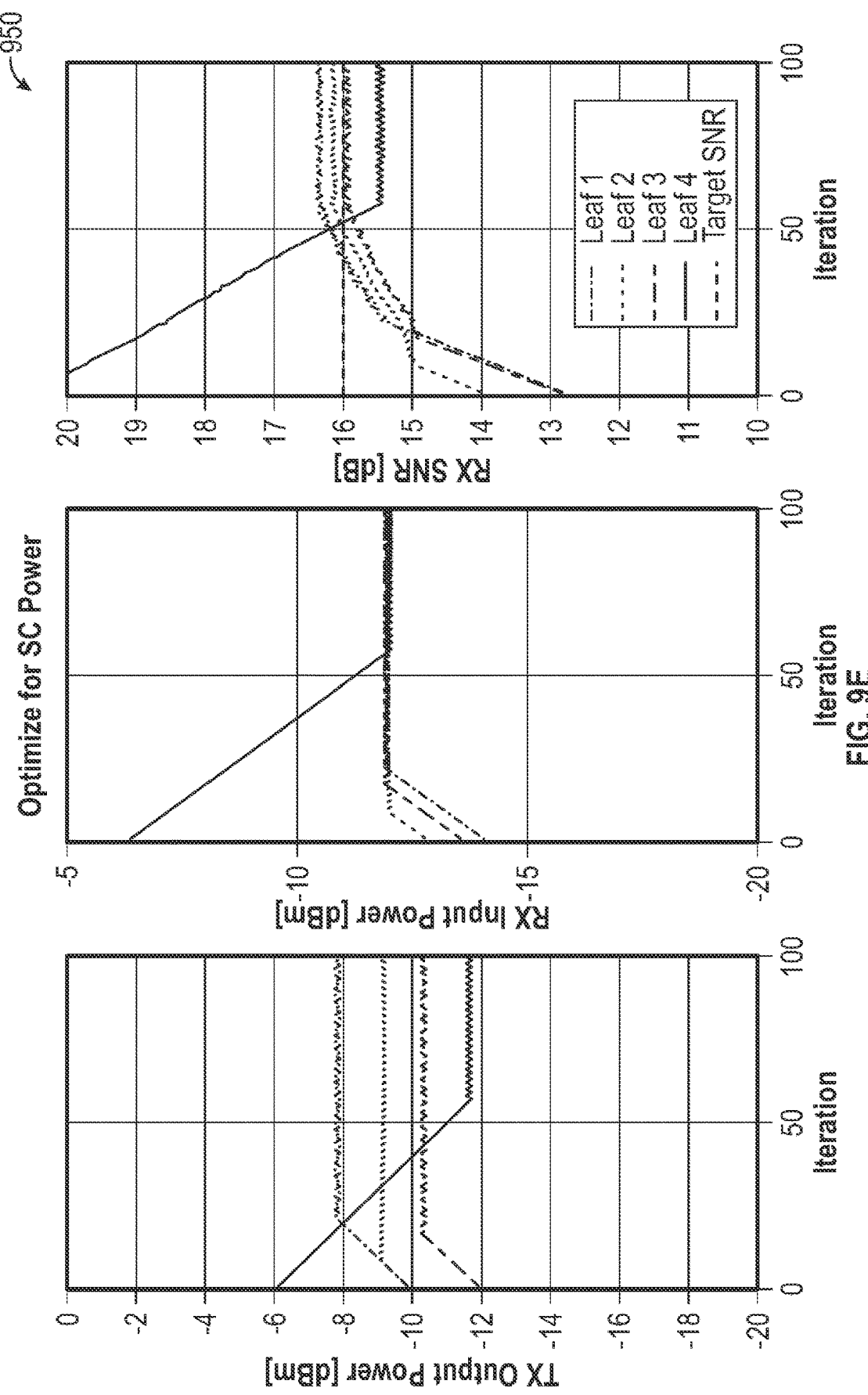
Figure 9F:
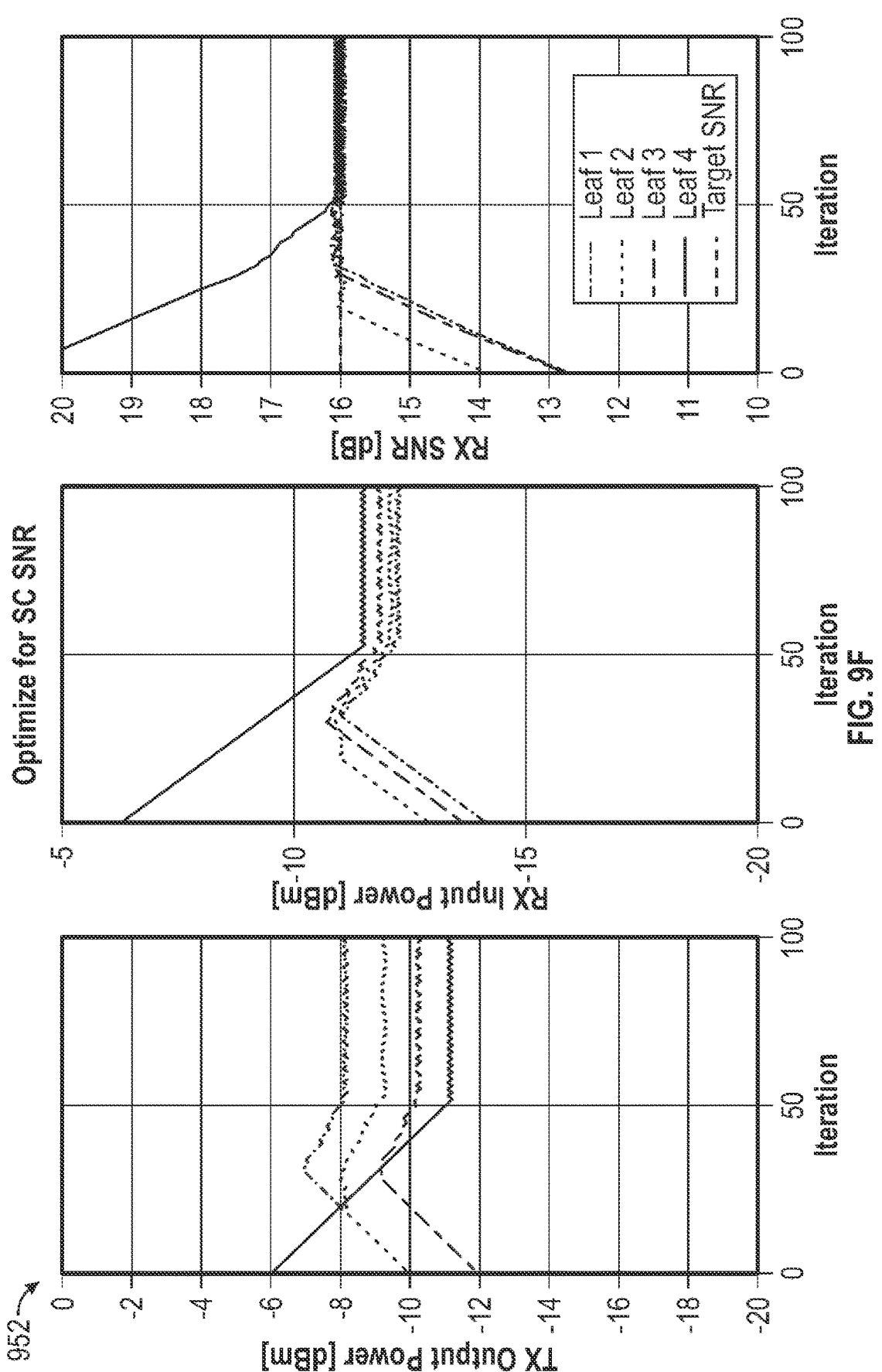

FIGS. 9E and 9F show a scenario where all leaf nodes 750-780 are operating at sub-optimal output powers at the start and are then pulled into their proper operating points by iterating through the power optimization method (illustrated in diagram 950 of FIG. 9E) and the SNR optimization method (illustrated in diagram 952 of 9F).

Figure 10A:
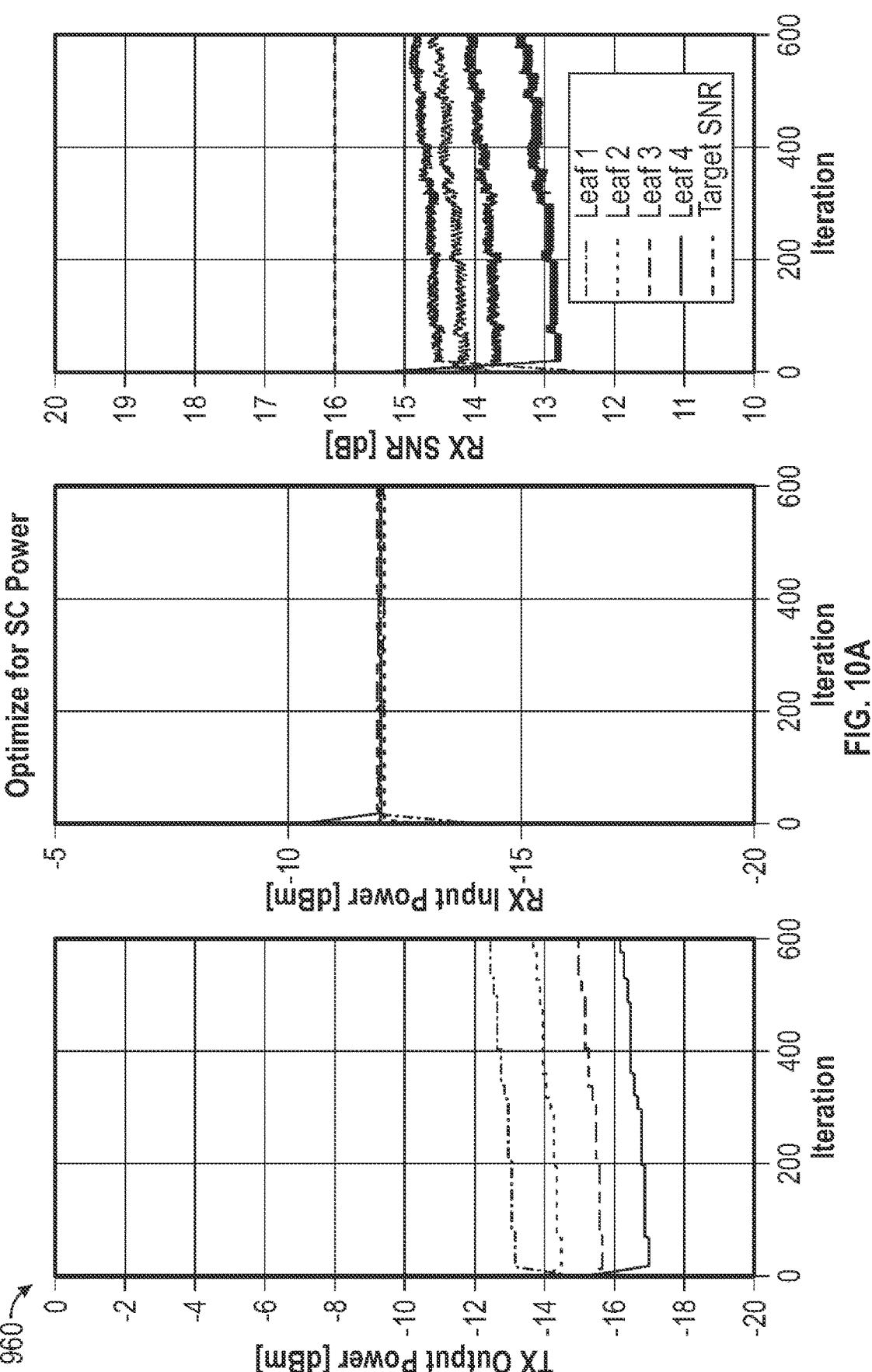
FIG. 10a is a simulation of the power optimization method performed using the network of FIG. 8.
Figure 10B:
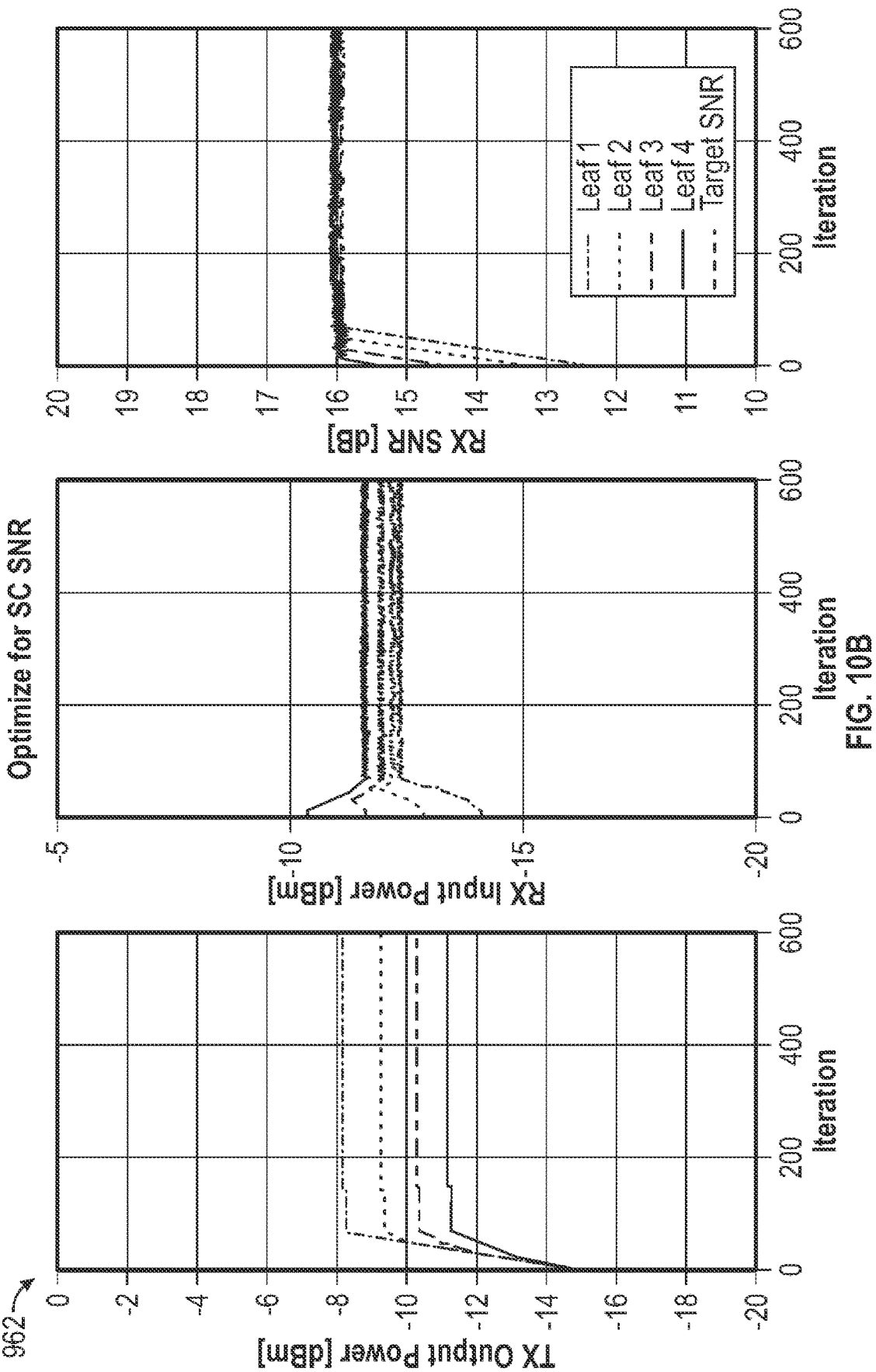
FIG. 10b is a simulation of the SNR optimization method performed using the network of FIG. 8 in accordance with the present disclosure.

Referring now to FIGS. 10A and 10B, shown therein are diagrams 960 and 962, respectively, that illustrate simulation of the network 940 of FIG. 8, but in which the EDFA 941 is switched to fixed output power mode such that a total power of an optical signal received in the hub node 710 is kept constant. In this configuration, signal quality determined using power feedback from the hub node 710 is not useful (since the power feedback is determined by the EDFA 941) and so signal optimization based on the power optimization method at the hub node 710 never reaches a high enough SNR to achieve error free operation. The SNR optimization method illustrated in diagram 962 (FIG. 10B), in contrast, is not affected by the fixed output power of the EDFA 941 and reliably finds proper output power settings on the leaf nodes 750-780 that achieve the target signal qualities.

The SNR optimization process and/or the power optimization process can run at different speeds, e.g., on a fast timescale during addition of a new nodes and/or new sub-carriers, or on a relatively slower time scale to adjust for changes on the link over time. The change of the transmitter output power may be done in small steps, since changing the output power might affect the SNR of one or more other subcarriers/subcarrier groups in the same node 14 or in another node 14 on the same network.

In some implementations, a network may not be able to reach the target signal quality (such as a target SNR) on all sub-channels (i.e., each leaf node 750-780 connected to the hub node 710). As a result, a cost function approach for optimization of such a network might be suitable. Instead of optimizing for a target SNR, the difference between the subcarrier SNRs may be minimized (or reduced) using the following algorithm:

$$\text{minimize}(SNR_a[\text{dB}] - SNR_b[\text{dB}])$$

where $SNR_a$ and $SNR_b$ are the SNR values of any two subcarriers/group of subcarriers. This strategy might lead to a better usage of the link SNR budget.

Figure 11A:
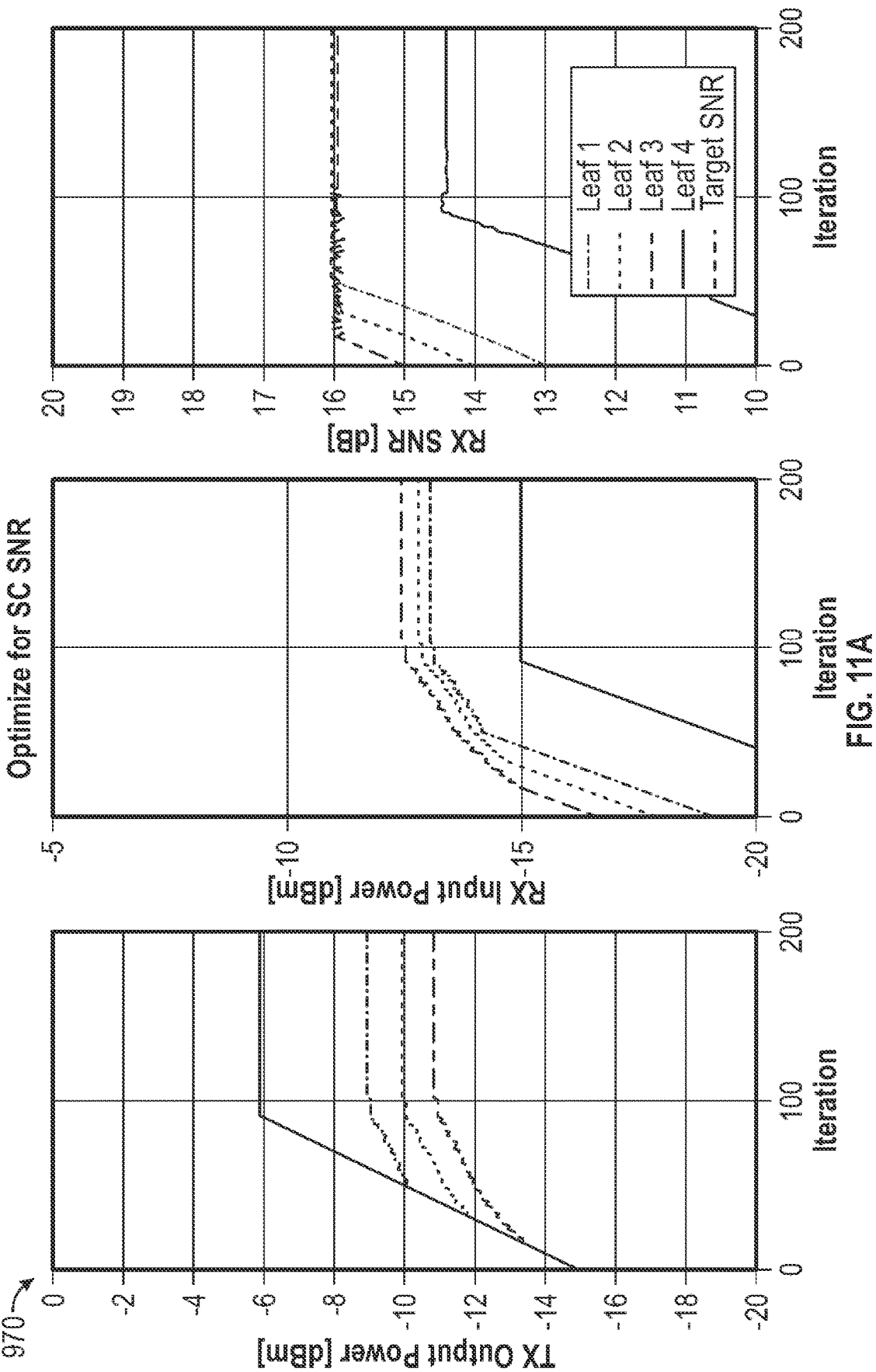
FIG. 11a is a simulation of adding a new carrier to the network of FIG. 8 using the power optimization method.
Figure 11B:
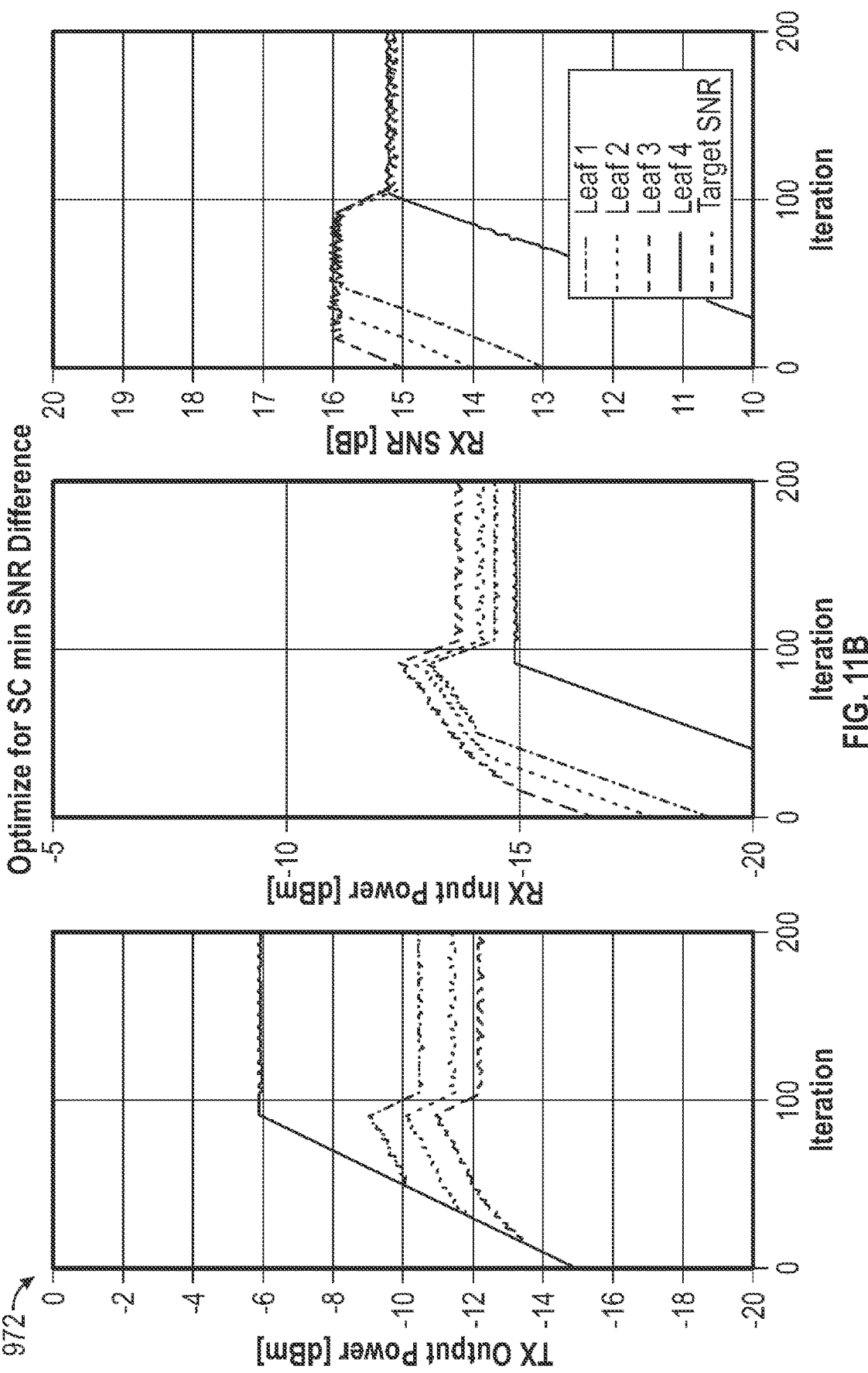
FIG. 11b is a simulation of the SNR optimization method in accordance with the present disclosure.

FIGS. 11A and 11B show an example using the network 940 from FIG. 8, but the distance between hub node 710 and the fourth leaf node 780 has been increased from 35 km to 70 km. As can be seen in diagram 970 (FIG. 11A), not all leaf nodes 750-780 reach their target SNR following the SNR optimization process. In particular, fourth leaf node 780 runs into a TX output power limit (here 6 dBm) and reaches just ~1.5 dB SNR margin to FEC threshold (here ~13 dB), where all other leaf nodes 750-770 reach the intended 3 dB margin. Optimization based on minimizing (or reducing) a difference between subcarrier SNRs improves the situation on fourth leaf node 780 by reducing the SNR margin of the other leaf nodes 750, 760, and 770. At the end of the optimization based on reducing the difference between subcarrier SNRs, all leaf nodes 750-780 are at an SNR >15 dB, which corresponds to a margin >2 dB, but not the target 3 dB. This may be described as falling within the acceptable margin but not reaching the desired margin as described above.

The methods and systems discussed above target for a certain receive SNR margin (or a target signal quality). This margin refers to the SNR the receiver sees, which is comprised of the noise coming from the link as well as the noise added by the transmitter and receiver itself (implementation SNR). In some implementations, a link optical signal to noise ratio (OSNR) margin may be used to optimize signal quality in a link.

Figure 12:
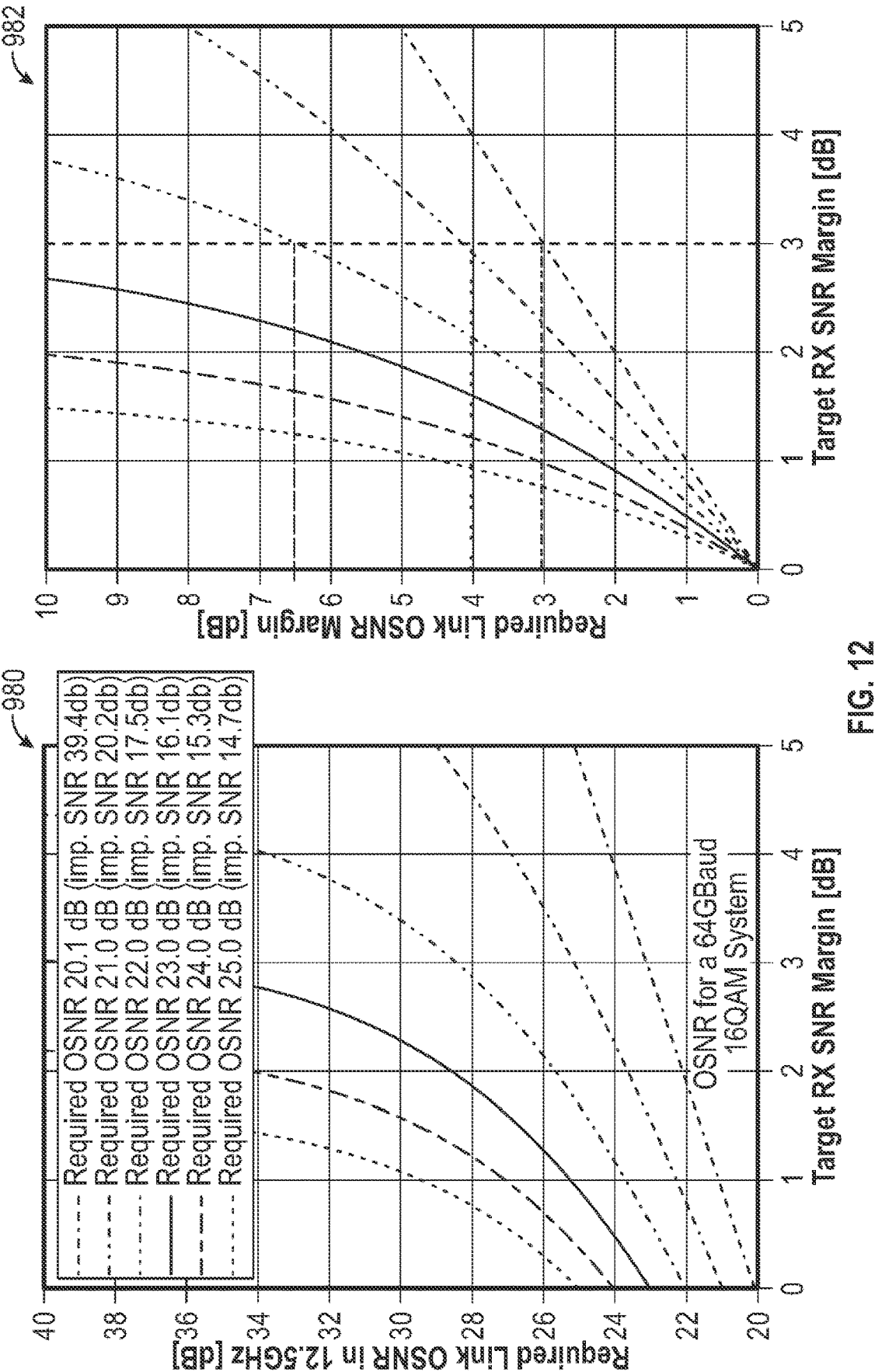
FIG. 12 illustrates a relationship between link OSNR, link OSNR margin, and RX SNR margin with an example of 3 dB target RX SNR margin in accordance with the present disclosure.

A relationship between target receive SNR margin and link OSNR margin for a 16QAM system at 64 GBaud is shown in FIG. 12. In a system with perfect implementation SNR (represented by the lowest line in diagrams 980 and 982), the link OSNR margin scales 1:1 with the target receive SNR margin. But as soon as the transmitter/receiver pair suffers from impairments (e.g., noise coming from the link as well as the noise added by the transmitter and receiver itself), the implementation SNR gets lower and the OSNR margin scales over-proportionally with the target receive SNR margin. Targeting for a certain receive SNR margin might, therefore, put too high requirements on the receive OSNR margin.

To be able to use the OSNR margin as an input for the described SNR optimization process, the implementation SNR of the transmitter/receiver combination must be known. This information may be obtained in manufacturing and can be used to quantify a certain link OSNR margin, as shown in FIG. 12.

With the knowledge of the implementation SNR, the relation between the link OSNR margin and receive SNR margin can be expressed by the following formula:

$$M_{OSNR} = \cfrac{1}{\cfrac{1}{SNR_{FEC} + M_{RX}} - \cfrac{1}{SNR_{imp}}} - \cfrac{1}{\cfrac{1}{SNR_{FEC}} - \cfrac{1}{SNR_{imp}}}$$

where $M_{OSNR}$ is the OSNR margin, $M_{RX}$ is the receive SNR margin, $SNR_{imp}$ is the implementation SNR of the transmitter/receiver pair and $SNR_{FEC}$ is the required receive SNR to get post-FEC error free.

It should be noted that since the implementation SNR is specific to each transceiver and furthermore might be different between transmitter and receiver side, the implementation SNR of the transmitter and receiver should be reported to the hub node. This would allow the optimization process running on the hub node to calculate a target receive SNR margin specific to the transmitter/receiver combination.

Figure 13:
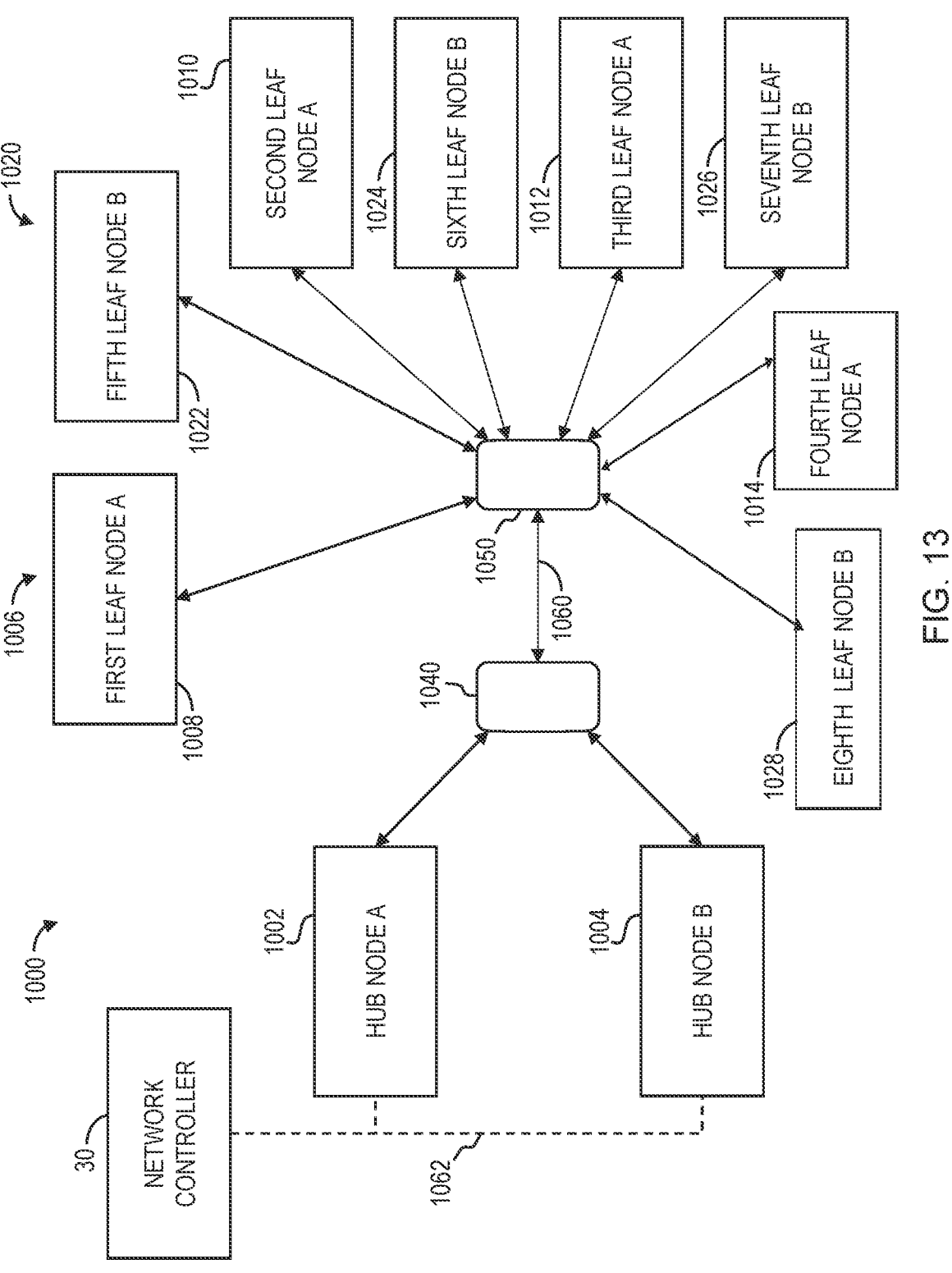
FIG. 13 illustrates a network having multiple hub nodes connected to a plurality of leaf nodes via a single optical link in accordance with the present disclosure.

Referring now to FIG. 13, shown therein is a network 1000 having multiple hub nodes connected to a plurality of leaf nodes with a network controller 30 connected to the multiple hub nodes. The network 1000 may be colorless, meaning there is no optical filtering involved and each leaf node receives a signal form each hub node and vice versa. In such a network 1000, the optimization methods described above may be applied to each hub node and leaf node group individually. However, steps must be taken to prevent a particular hub node or a particular group of leaf nodes from optimizing their performance at the cost of another hub node or another group of leaf nodes.

For purposes of illustration, the network 1000 is shown having a first hub node 1002 belonging to network group A, a second hub node 1004 belonging to network group B, a first group of leaf nodes 1006 belonging to network group A, the first group of leaf nodes 1006 comprising a first leaf node 1008, a second leaf node 1010, a third leaf node 1012, and a fourth leaf node 1014, and a second group of leaf nodes 1020 belonging to network group B, the second group of leaf nodes 1020 comprising a fifth leaf node 1022, a sixth leaf node 1024, a seventh leaf node 1026, and an eighth leaf node 1028. The network 1000 may further comprise a first optical coupler 1040, a second optical coupler 1050, and an optical link 1060 connecting the first optical coupler 1040 and the second optical coupler 1050. The network may comprise more or fewer hub nodes, leaf nodes, and/or optical couplers.

The network controller 30 may be connected to the first hub node 1002 and the second hub node 1004 via a network connection 1062 such as the internet. The network controller 30 may use the network connection 1062 to communicate with the hub nodes 1002 and 1004 to access and/or receive settings and metrics of the hub nodes 1002 and 1004 as well as settings and metrics of each of the leaf nodes 1008, 1010, 1012, 1014, 1022, 1024, 1026, 1028 in the network groups A and B. For example, the network controller 30 may access and/or be sent performance metric readings (e.g., signal quality) from the receivers of all the leaf nodes 1008, 1010, 1012, 1014, 1022, 1024, 1026, 1028 and the hub nodes 1002, 1004; optical transmitter output power (per subcarrier) of each leaf node 1008, 1010, 1012, 1014, 1022, 1024, 1026, 1028 and each hub node 1002, 1004; and optical receiver input power (per subcarrier) of each of the leaf nodes 1008, 1010, 1012, 1014, 1022, 1024, 1026, 1028 and each of the hub nodes 1002, 1004.

The network controller 30 may use the settings and metrics of the hub nodes 1002, 1004 and each of the leaf nodes 1008, 1010, 1012, 1014, 1022, 1024, 1026, 1028 to set and/or determine performance metric targets (e.g., target signal quality) for all the leaf nodes 1008, 1010, 1012, 1014, 1022, 1024, 1026, 1028 and the hub nodes 1002, 1004, and a maximum allowed transmission output power (total or per subcarrier) on all the leaf nodes 1008, 1010, 1012, 1014, 1022, 1024, 1026, 1028 and the hub nodes 1002, 1004.

In an exemplary operation of the network 1000, the first hub node 1002 continuously outputs a first optical signal comprising a first optical subcarrier group and a second optical subcarrier group, the first optical subcarrier group having a first level of optical power and the second optical subcarrier group having a second level of optical power different than the first level of optical power, over the optical link 1060 with the first optical subcarrier group directed to the first leaf node 1008 and the second optical subcarrier group directed to the second leaf node 1010.

In some implementations, the signal correction circuitry of the first leaf node 1008 may determine a first received optical power of the first optical subcarrier group and a first signal quality of the first optical subcarrier. The signal correction circuitry of the first leaf node 1008 may send a first correction signal comprising the first received optical power and the first signal quality via the control channel to the node processor 98 of the first hub node 1002.

The signal correction circuitry of the second leaf node 1010 may determine a second received optical power of the second optical subcarrier group and a second signal quality of the second optical subcarrier group and send a second correction signal comprising the second received optical power and the second signal quality via the control channel to the node processor 98 of the first hub node 1002.

The processor executable code may cause the node processor 98 of the first hub node 1002 to send a first power optimization request to the network controller 30, the first power optimization request comprising the first level of optical power of the first optical subcarrier group and the second level of optical power of the second optical subcarrier group from the optical transmitter of the first hub node 1002 and the first received optical power, the second received optical power, the first signal quality, and the second signal quality received from the first leaf node 1008 and the second leaf node 1010.

The second hub node 1004 continuously outputs a second optical signal comprising a third optical subcarrier group and a fourth optical subcarrier group, the third optical subcarrier group having a third level of optical power and the fourth optical subcarrier group having a fourth level of optical power different than the third level of optical power over the optical link 1060 with the third optical subcarrier group directed to the fifth leaf node 1020 and the fourth optical subcarrier group directed to the sixth leaf node 1022.

In some implementations, the signal correction circuitry of the fifth leaf node 1020 may determine a third received optical power of the third optical subcarrier group and a third signal quality of the third optical subcarrier group and may send a third correction signal comprising the third received optical power and the third signal quality via the control channel to the node processor 98 of the second hub node 1004.

The signal correction circuitry of the sixth leaf node 1022 may determine a fourth received optical power of the fourth optical subcarrier group and a fourth signal quality of the fourth optical subcarrier group and may send a fourth correction signal comprising the fourth received optical power and the fourth signal quality via the control channel to the node processor 98 of the second hub node 1004.

When the third correction signal and the fourth correction signal are received by the node processor 98 of the second hub node 1004, the processor executable code causes the node processor 98 of the second hub node 1004 to send a second power optimization request to the network controller 30, the second power optimization request comprising the third level of optical power of the third optical subcarrier group and the fourth level of optical power of the fourth optical subcarrier group from the optical transmitter of the second hub node 1004 and the third received optical power, the fourth received optical power, the third signal quality, and the fourth signal quality received from the fifth leaf node 1020 and the sixth leaf node 1022.

The processor 46 of the network controller 30 is configured to determine a maximum transmission power value for each of the first and second optical subcarrier groups of the first hub node 1002 and the third and fourth optical subcarrier groups of the second hub node 1004 using the first received optical power, the second received optical power, the third received optical power, and the fourth received optical power;

The processor 46 of the network controller 30 may further be configured to compare the first signal quality of the first optical signal to a first target signal quality, the second signal quality of the first optical signal to a second target signal quality, the third signal quality of the second optical signal to a third target signal quality, and the fourth signal quality of the second optical signal to a fourth target signal quality. The processor 46 of the network controller 30 may further be configured to determine a first power update for at least one of the first level of optical power of the first optical subcarrier group and the second level of optical power of the second optical subcarrier group of the first hub node 1002 when the first signal quality is different than the first target signal quality or the second signal quality is different than the second target signal quality, in order to adjust the signal qualities. The first power update may include at least one of a fifth level of optical power of the first optical subcarrier group and a sixth level of optical power of the second optical subcarrier group.

The processor 46 of the network controller 30 may further be configured to determine a second power update for at least one of the third level of optical power of the third optical subcarrier group and the fourth level of optical power of the fourth optical subcarrier group of the second hub node 1004 when the third signal quality is different than the third target signal quality or the fourth signal quality is different than the fourth target signal quality. the second power update may include at least one of a seventh level of optical power of the third optical subcarrier group and an eighth level of optical power of the fourth optical subcarrier group of the second hub node 1004.

Each of the fifth level of optical power and the sixth level of optical power may be below the maximum transmission power value for each of the first and second optical subcarrier groups of the first hub node 1002. Each of the seventh level of optical power and the eighth level of optical power may be below the maximum transmission power value for each of the third and fourth optical subcarrier groups of the second hub node 1004.

The processor 46 of the network controller 30 may further be configured to send the first power update to the first hub node 1002 and the second power update to the second hub node 1004.

Upon receiving the first power update, the first hub node 1002 may adjust at least one of the first level of optical power to the fifth level of optical power and the second level of optical power to the sixth level of optical power.

Upon receiving the second power update, the second hub node 1004 may adjust at least one of the third level of optical power to the seventh level of optical power and the fourth level of optical power to the eighth level of optical power.

While only optimization of signals from the hub nodes 1002 and 1004 to the leaf nodes 1008 and 1020 have been described, the same process may be performed for all signals from the hub nodes 1002 and 1004 to each of the leaf nodes 1008 to 1028, and for all signals from each of the leaf nodes 1008 to 1028 to the hub nodes 1002 and 1004 to allow optimization of signal quality between the elements of network group A and the elements of network group B without sacrificing signal quality of a hub node and/or one or more leaf nodes in the other network group.

In some implementations of the exemplary optimization process, the first hub node 1002 of the network 1000 continuously outputs a first optical signal comprising a first optical subcarrier and a second optical subcarrier, the first optical subcarrier having a first level of optical power and the second optical subcarrier having a second level of optical power different than the first level of optical power, over the optical link 1060 to the first leaf node 1008. The signal correction circuitry of the first leaf node 1008 determines a first signal quality of the first optical subcarrier and a second signal quality of the second optical subcarrier and sends the first signal quality and the second signal quality via the control channel to the processor 98 of the first hub node 1002.

The processor executable code causes the processor 98 of the first hub node 1002 to compare the first signal quality of the first optical subcarrier to a first target signal quality and the second signal quality of the second optical subcarrier to a second target signal quality. When the processor 98 determines that the first signal quality is different than the first target signal quality or the second signal quality is different than the second target signal quality, the node processor 98 determines at least one of a first power adjustment of the first level of optical power and a second power adjustment of the second level of optical power and sends at least one of the first power adjustment and the second power adjustment to the network controller 30.

The second hub node 1004 continuously outputs a second optical signal comprising a third optical subcarrier and a fourth optical subcarrier, the third optical subcarrier having a third level of optical power and the fourth optical subcarrier having a fourth level of optical power different than the third level of optical power over the optical link 1060 to the fifth leaf node 1020. The signal correction circuitry of the fifth leaf node 1020 determines a third signal quality of the third optical subcarrier and a fourth signal quality of the fourth optical subcarrier of the second optical signal and sends the third signal quality and the fourth signal quality via the control channel to the processor 98 of the second hub node 1004.

The processor executable code causes the processor 98 of the second hub node 1004 to compare the third signal quality of the first optical subcarrier to a third target signal quality and the fourth signal quality of the second optical subcarrier to a fourth target signal quality. When the processor 98 determines that the third signal quality is different than the third target signal quality or the fourth signal quality is different than the fourth target signal quality, the processor 98 determines at least one of a third power adjustment of the third level of optical power and a fourth power adjustment of the fourth level of optical power and sends at least one of the third power adjustment and the fourth power adjustment to the network controller 30.

The processor 46 of the network controller 30 is configured to compare the first power adjustment, the second power adjustment, the third power adjustment, and the fourth power adjustment to determine if at least one of the first power adjustment, the second power adjustment, the third power adjustment, and the fourth power adjustment would negatively affect a combined optical signal from the hub nodes 1002 and 1004 to the leaf nodes 1008 and 1020 over the optical link 1060. When the processor 46 determines that at least one of the first power adjustment, the second power adjustment, the third power adjustment, and the fourth power adjustment would negatively affect the combined optical signal, the processor 46 is programmed to updated at least one of the first target signal quality to a new first target signal quality, the second target signal quality to a new second target signal quality, the third target signal quality to a new third target signal quality, and the fourth target signal quality to a new fourth target signal quality and send the new first target signal quality and the new second target signal quality to the first hub node 1002 and causing the first hub node 1002 to execute a third optimization cycle using the new first target signal quality and the new second target signal quality, and send the new third target signal quality and the new fourth target signal quality to the second hub node 1004 and causing the second hub node 1004 to execute a fourth optimization cycle using the new third target signal quality and the new fourth target signal quality.

While only optimization of signals from the hub nodes 1002 and 1004 to the leaf nodes 1008 and 1020 have been described, the same process may be performed for all signals from the hub nodes 1002 and 1004 to each of the leaf nodes 1008 to 1028 to allow optimization of signal quality between the network elements 14 of network group A and the network elements 14 of network group B without sacrificing signal quality of a hub node and/or one or more leaf nodes in the other network group or the combined signal quality transmitted on the optical link 1060.

It should be noted that the network controller 30 does not necessarily need to take direct control over the target signal qualities. Instead, in some implementations, the optimization of the leaf node and hub node transmission output power can still be done via the hub nodes as described above. In such an implementation, the network controller 30 may refine the target signal qualities for each hub node and each leaf node, e.g., the network controller 30 may reduce target signal quality values for network groups in which not all hub nodes or leaf nodes can reach the initial target signal qualities. Thus, a direct connection to the leaf nodes is not strictly required.

In a point-to-multipoint optical communication system in which optical subcarriers are transmitted, certain optical subcarriers and/or subcarrier groups may not have a satisfactory performance metric, such as signal to noise ratio, while other optical subcarriers and/or subcarrier groups may have an acceptable performance metric or be within an acceptable performance margin. To correct these inconsistencies, a subcarrier position or frequency within a subcarrier group or a position of a subcarrier group within an optical spectrum of the optical communication system between nodes 14 may be rearranged to improve the performance metric of the subcarrier group and/or the optical spectrum of the optical communication system between nodes 14.

Not all subcarriers experience the same noise added by the receiving node. For instance, receiving node implementation SNR (and thus receiver added noise) may depend on a position (in wavelength/frequency) in which a particular subcarrier or subcarrier group is positioned when it is received. The dependency of the receiving node implementation SNR on the subcarrier position can be explained by noise coloring, which, in turn may be caused by different effects inside the receiver node processing chain. For example, colored noise from the TIA and the ADC and/or receiver impairment dependent noise, such as caused by IQ timing skews and analog bandwidth restrictions.

Referring now to FIGS. 14A-14D, shown therein is a network 1100 with the first leaf node 750, the second leaf node 760, the third leaf node 770, and the fourth leaf node 780 positioned different distances from the hub node 710. Each of the leaf nodes 750-780 transmits a signal comprising four subcarriers in the first subcarrier group 630 transmitted from first leaf node 750, second subcarrier group 632 transmitted from the second leaf node 760, third subcarrier group 634 transmitted from the third leaf node 770, and fourth subcarrier group 636 transmitted from the fourth leaf node 780, with data transmitted in the "upstream" direction from the leaf nodes 750-780 to the hub node 710. In the illustrated example, the first subcarrier group 630 transmitted from the first leaf node 750 and the fourth subcarrier group 636 transmitted from fourth leaf node 780 are positioned in outer positions on a spectrum transmitted to the hub node 710 (i.e., receiving node) and suffer more receiver implementation SNR than the second subcarrier group 632 transmitted from the second leaf node 760 and the third subcarrier group 634 transmitted from the third leaf group 770 positioned in inner positions of the transmission spectrum. To counteract the receiver implementation SNR, the first leaf node 750 needs higher power in a receive spectrum to achieve the same receive SNR (margin) as the inner two leaf nodes (second leaf node 760 and third leaf node 770). The same higher power in the receive spectrum would also be required on the fourth leaf node 780. However, since the fourth leaf node 780 is positioned a further distance from the hub node 410 (which results in more link attenuation), the fourth leaf node 780 runs into a transmission output power limit (−6 dBm in this example). As a consequence, the fourth leaf node 780 cannot reach the desired 3 dB SNR margin at the receiver (hub node 710) and falls behind the SNR margin of the other leaf nodes 750-770.

Figure 14A:
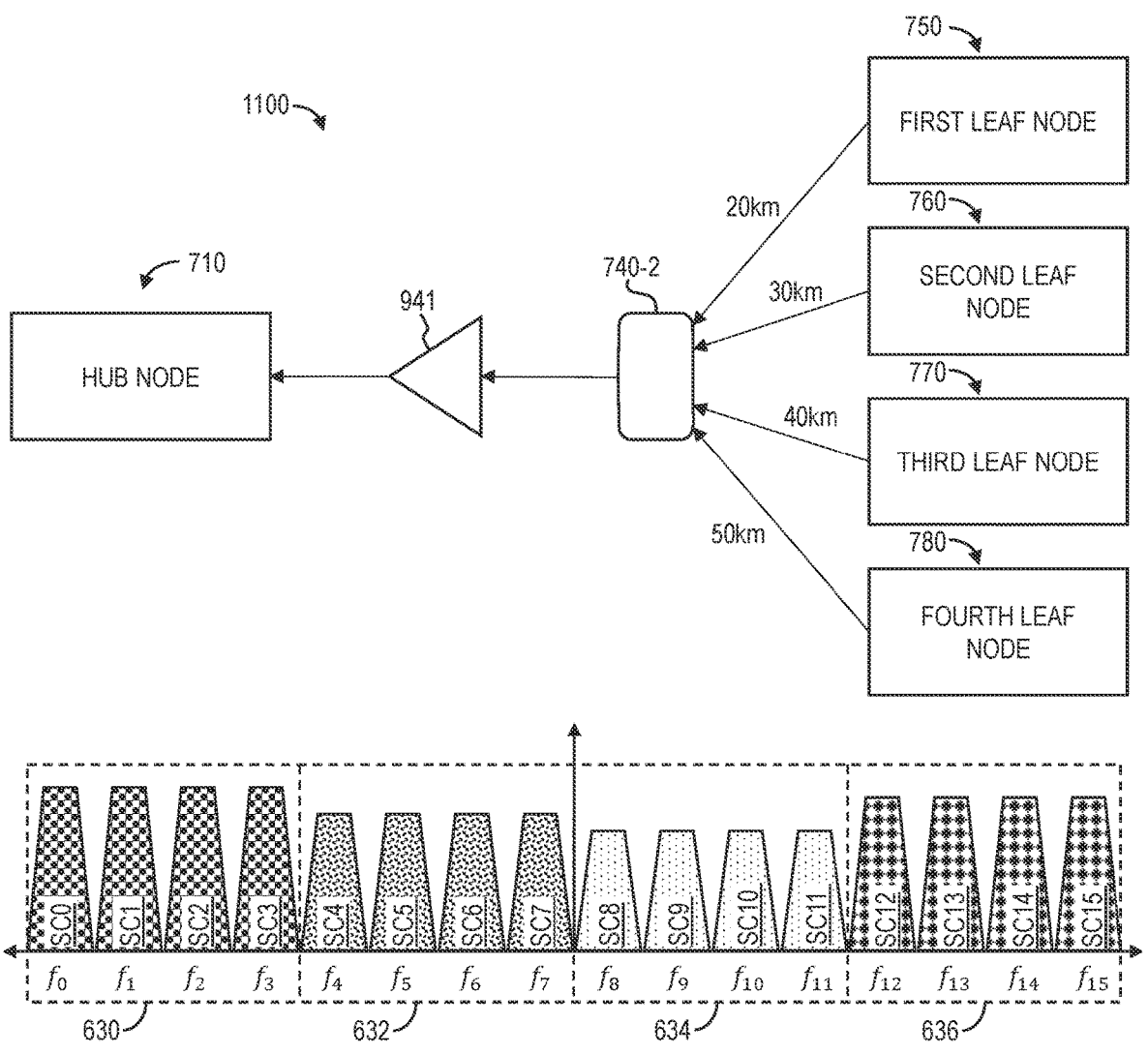
FIGS. 14A-14D illustrate an exemplary point to multi-point transport network configured to rearrange one or more subcarrier group in a transmission spectrum to improve signal quality and diagrams illustrating exemplary results of signal improvement when the one or more subcarrier groups is rearranged.
Figure 14B:
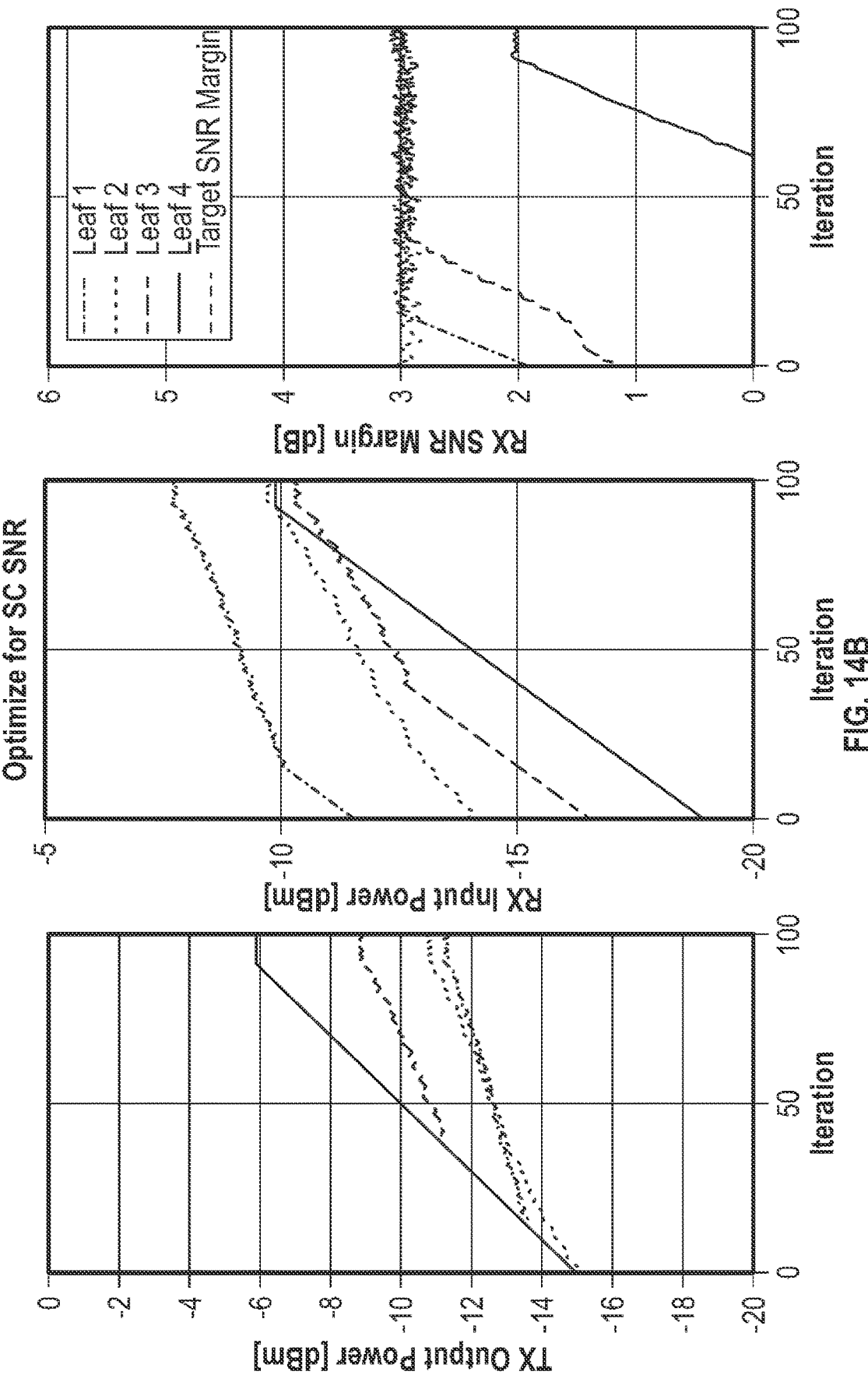
Figure 14C:
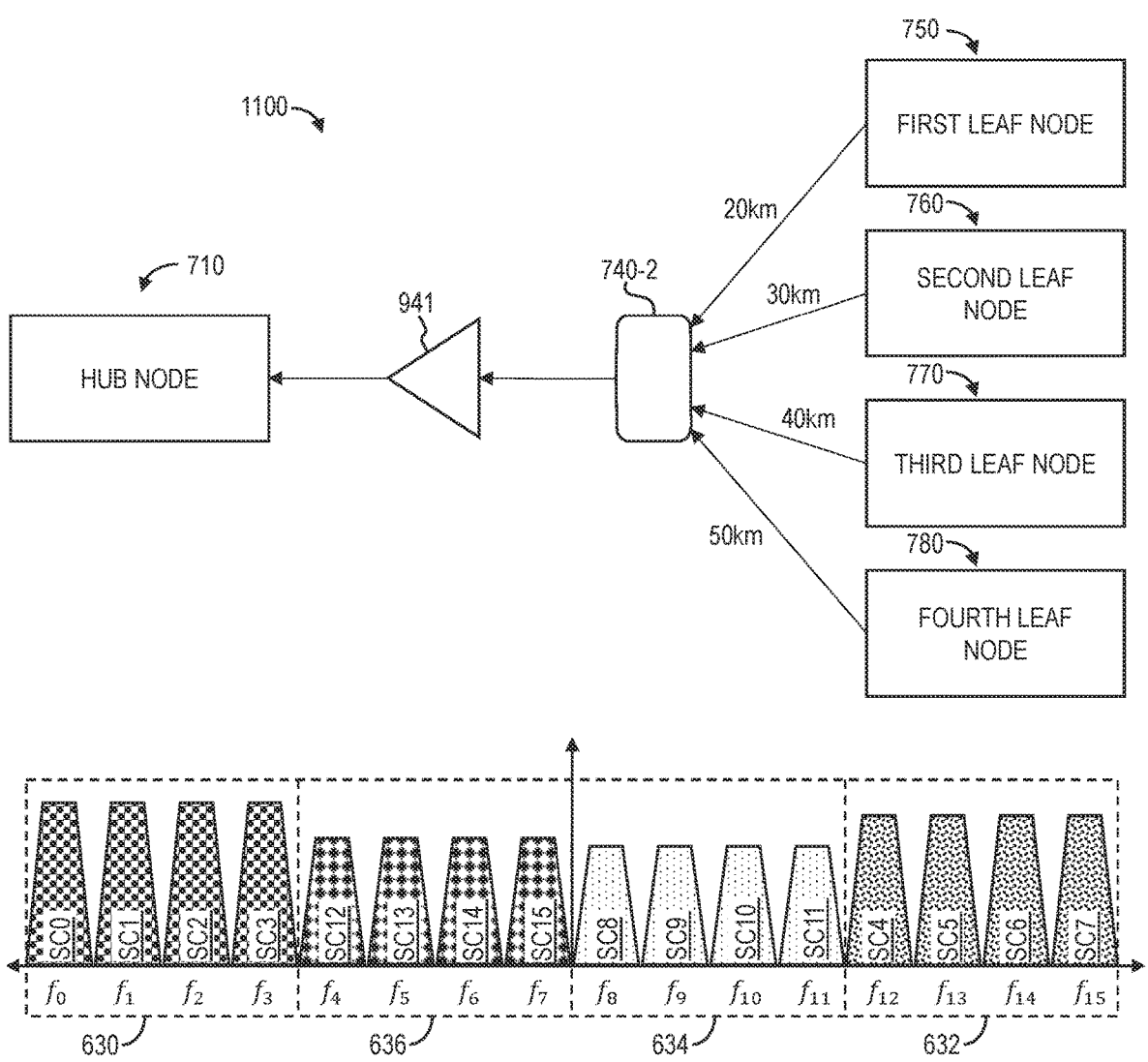
Figure 14D:
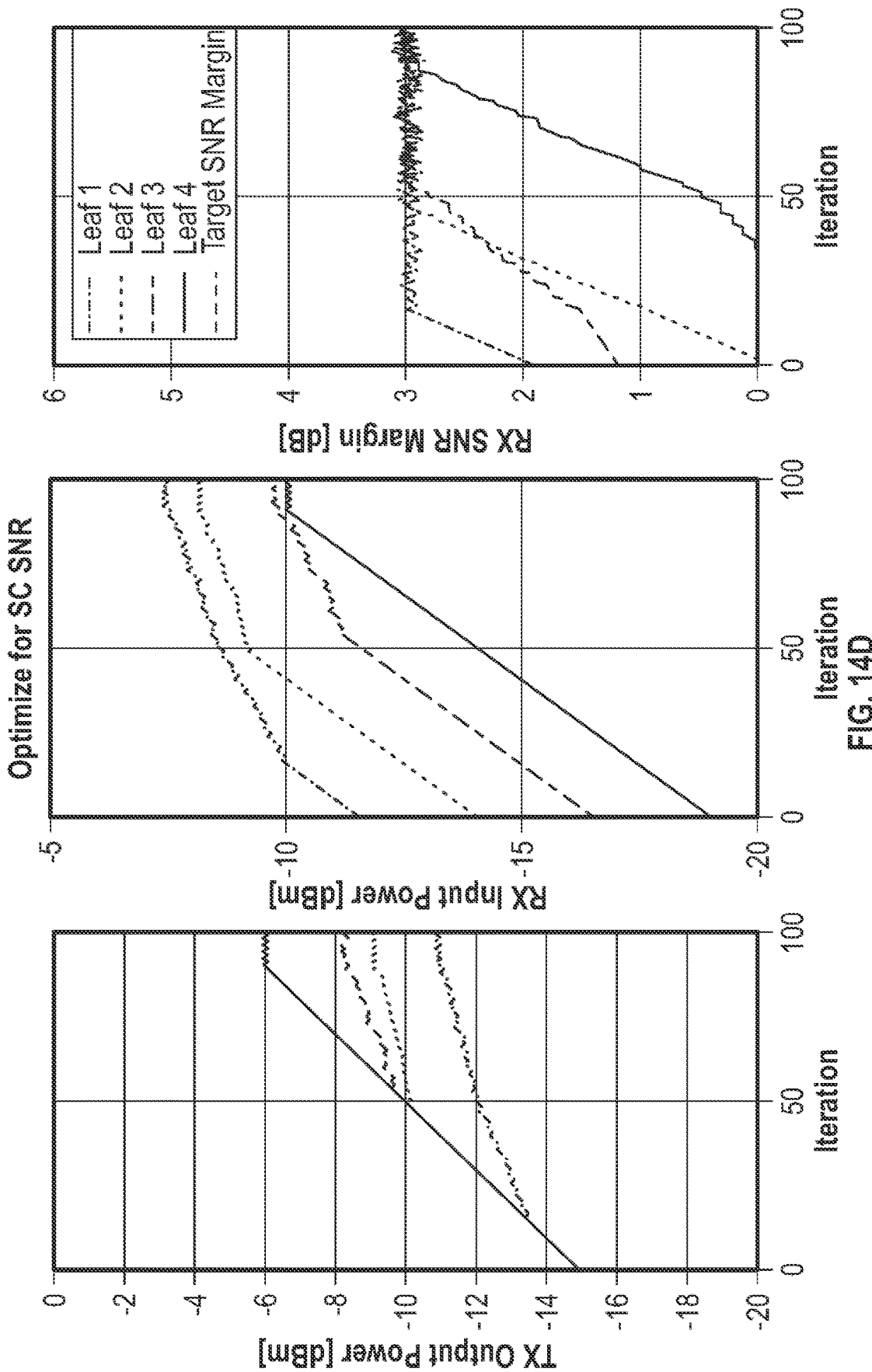

To overcome the problem, a position of the fourth subcarrier group 636 transmitted from the fourth leaf node 780 (i.e., a leaf node positioned further away from the hub node 710) may be reassigned (swapped) in wavelength/frequency of the transmission signal to a position with good receive implementation SNR and the second subcarrier group 632 transmitted from the second leaf node 760 (i.e., a leaf node closer to the hub node 710) may be reassigned (swapped) to the position with poor receive implementation SNR as illustrated in FIG. 14C-14D. Note, a reassignment of traffic of the leaf nodes 750-780 may affect the traffic of other leaf nodes.

Figure 15:
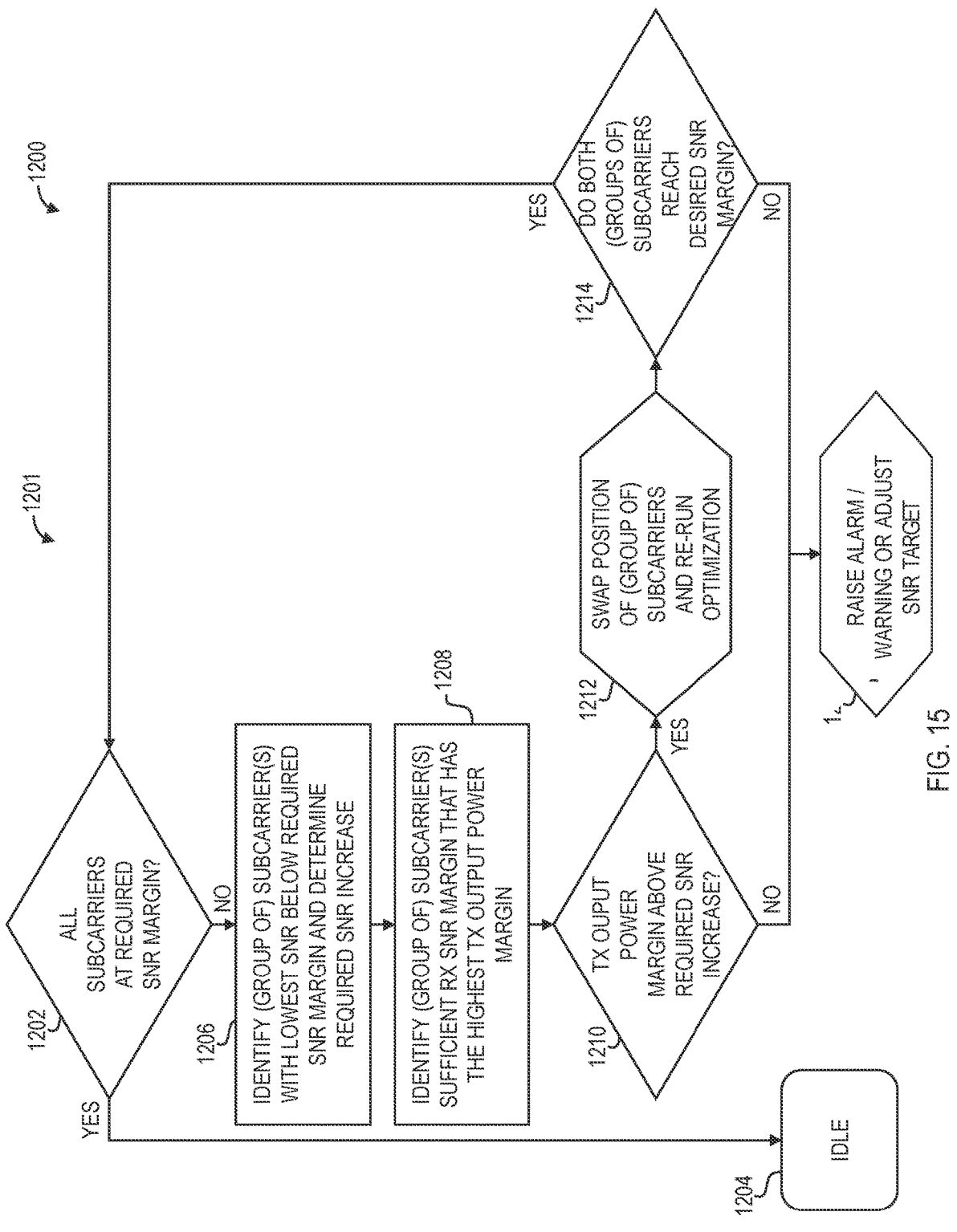
FIG. 15 is a process flow diagram of an exemplary method of determining one or more subcarriers or subcarrier groups to rearrange in a transmission spectrum to improve signal quality in accordance with the present disclosure.

Referring now to FIG. 15, shown therein is an exemplary process 1200 for reassigning subcarriers and/or subcarrier groups in a transmission spectrum of a network such as the network 1100 illustrated in FIGS. 14A-14D. The process 1200 may be embodied in the form of an application 1201 that may be stored in the memory 100 and executed by the processor 98 of the node controller 96 of a hub node 710. In step 1202, the application 1201 may cause the processor 98 to determine if all subcarriers SC0-SC15 and/or subcarrier groups 630-636 in the transmission spectrum of the hub node 710 and/or leaf nodes 750-780 are operating at a required SNR margin.

If all subcarriers SC0-SC15 and/or subcarrier groups 630-636 in the transmission spectrum of the hub node 710 and/or leaf nodes 750-780 are operating at the required SNR margin, in step 1204 the processor 98 idles the application 1201. The application 1201 may be idled for a predetermined period of time before the application 1201 returns to step 1202 to optimize signal quality by again determining if all subcarriers SC0-SC15 and/or subcarrier groups 630-636 in the transmission spectrum of the hub node 710 and/or leaf nodes 750-780 are operating at a required SNR margin.

Returning to step 1202, when the processor 98 determines that one or more of the subcarriers SC0-SC15 and/or subcarrier groups 630-636 in the transmission spectrum of the hub node 710 and/or leaf nodes 750-780 are not operating at the required SNR margin, in step 1206 of the process 1200, the processor 98 may identify the subcarriers SC0-SC15 and/or the subcarrier groups 630-636 in the transmission spectrum of the hub node 710 and/or the leaf nodes 750-780 with a lowest SNR below the required SNR margin and may determine a required SNR increase for one or more of the subcarriers SC0-SC15 and/or the subcarrier groups 630-636 in the transmission spectrum of the hub node 710 and/or the leaf nodes 750-780 with the lowest SNR below the required SNR margin. In the example illustrated above, for instance, the fourth leaf node 780 had the lowest SNR below the required SNR margin. The processor 98 determined the required SNR increase, but the fourth leaf node 780 could not perform the required increase because it ran into a transmission output power limit (−6 dBm in this example) before it could reach the desired 3 dB SNR margin. As noted above, this was due in part to the fact that the fourth leaf node 780 is positioned a further distance from the hub node 410 which results in more link attenuation.

To overcome the problem, in step 1208 the processor 98 identifies subcarriers SC0-SC15 and/or subcarrier groups 630-636 with sufficient receive implementation SNR margin that have the highest transmission output power margin.

Each leaf node's optical transceiver 92 can report its current optical output power (transmission output power) and, in some implementations, the maximum output power it can support. After the network 1100 has undergone the performance metric optimization (such as SNR optimization described above), the difference between maximum and current optical output power gives the transmission output power margin, such as shown in the following formula:

$$P_{out\_margin}[dBm] = P_{out\_max}[dBm] - P_{out\_current}[dBm]$$

The transmission output power margin can also be used to estimate the receive implementation SNR margin, where the unused receive implementation SNR margin equals the output power margin. This may be referred to as a first order approximation of the receive implementation SNR margin, since, for example, link OSNR budget and non-linear fiber propagation are not considered.

Continuing the example from above, the second subcarrier group 632 and the third subcarrier group 634 both had about the same receive input power of around −10 dBm, but the third subcarrier group 634 had a much higher transmission output power of around −9 dBm compared to −11 dBm for the second subcarrier group 632. For the purposes of this illustration, the max transmission output power for both the second leaf node 760 and the third leaf node 770 is assumed to be −6 dBm. As a result, the processor 98 determined that the second subcarrier group 632 had sufficient receive implementation SNR margin and the highest transmission output power margin.

In step 1210, the processor 98 determines if a transmission output power margin of the subcarriers SC0-SC15 and/or subcarrier groups 630-636 identified in step 1208 (the second subcarrier group 632 in this example) is above the required SNR increase. In the exemplary case, to operate at the desired 3 dBm margin, the processor 98 determined that the transmission output power of the second leaf node 760 would need to increase to about −9 dBm which was below the power limit of −6 dBm. Therefore, the second leaf node 760 has enough transmission output power margin to perform the required SNR increase and the processor 98 causes the positions of the second subcarrier group 632 and the fourth subcarrier group 636 to be swapped in the wavelength/frequency of the transmission signal in step 1212 and an optimization cycle to be run for the second subcarrier group 632 and the fourth subcarrier group 636 as described above.

Once the signals of the second subcarrier group 632 and the fourth subcarrier group 636 have been optimized, in step

1214 the processor 98 determines if both the swapped subcarrier groups (second subcarrier group 632 and fourth subcarrier group 636) have reached the desired SNR margin (3 dBm in this example). If both the swapped subcarrier groups have reached the desired SNR margin, the processor 98 causes the process 1200 to return to step 1202 and determine if all subcarriers SC0-SC15 and/or subcarrier groups 630-636 are at the required SNR.

If both the swapped subcarrier groups have not reached the desired SNR margin, in step 1216 the processor 98 may cause the hub node 710 to send an alarm or warning to a network operator, for instance, alerting them of the sub-optimal operation. Alternatively, in step 1216 the application 1201 may be configured to cause the processor 98 to adjust the SNR target of one or more of the subcarriers SC0-SC15 and/or subcarrier groups 630-636. For instance, the processor 98 may determine that the desired SNR margin cannot be met, but an acceptable SNR margin could be (where the acceptable SNR margin would result in a lower signal quality, but would still allow data to be reliably transmitted). In such a case, the processor 98 may adjust the SNR targets for the subcarriers SC0-SC15 and/or subcarrier groups 630-636 and cause the signal optimization cycles described above to be run with the new SNR targets before causing the hub node 710 to re-run the process 1200 for each of the subcarriers SC0-SC15 and/or subcarrier groups 630-636.

Returning now to step 1210, If the processor 98 determined that the second leaf node 760 did not have enough transmission output power margin to perform the required SNR increase the processor 98 may cause the hub node to perform step 1216 and described above.

For networks with multiple hub nodes and multiple leaf node groups that share an optical link and a network controller 30, such as the network 1000 described above with respect to FIG. 13, the reassignment may also happen between different hub nodes, such that e.g., a leaf node transmitting to and from hub node A (1002) gets transferred to hub node B (1004) and vice versa. The network controller 30 would need to initiate the reassignment based on transmission output power margins and receive SNR margins collected as described above from hub nodes 1002 and 1004 and leaf nodes 1008-1028.

As described above, the transmission output power margin can also be used to estimate the receive implementation SNR margin, where the unused receive implementation SNR margin equals the output power margin. In some implementations, the receive implementation SNR margin may be an actual measurement (tested) when, for example, a new subcarrier or subcarrier group transition in.

Two exemplary implementations will be described operating on a network 1250 shown in FIG. 16. The network 1250 is similar to the networks 940 and 1000 described above. For the sake of brevity, only the differences will be described in detail herein. The network 1250 is provided with first leaf node 750, second leaf node 760, third leaf node 770, and fourth leaf node 780 connected to hub node 710. Each of the leaf node 750-780 transmits data to and receives data from the hub node 710 in a subcarrier group comprising four subcarriers. As noted in FIG. 16, the leaf nodes 750-780 are positioned different distances from the hub node 710 and therefore need to adjust their transmission output power to different values to achieve the same SNR margin on the receive side.

Figure 16:
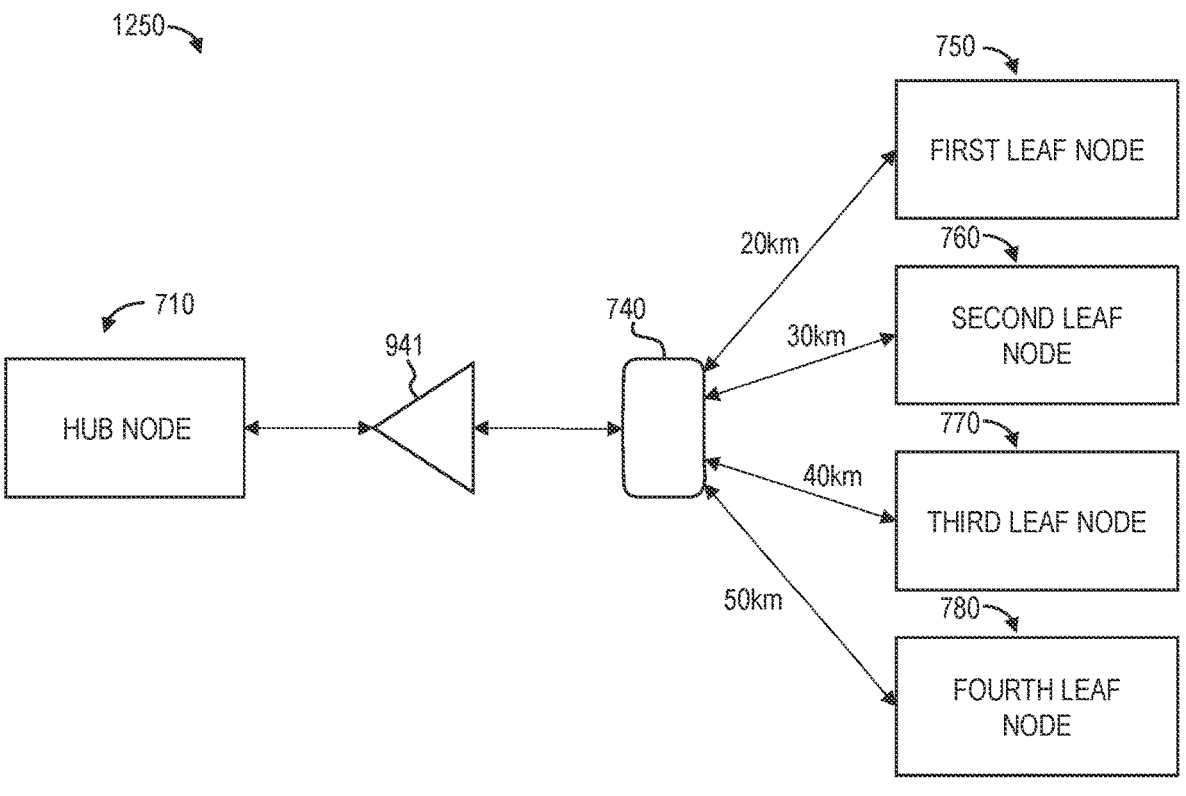
FIG. 16 illustrates an exemplary point to multi-point transport network having a hub node and multiple leaf nodes used to simulate maximum SNR margin determination methods, the results of which are represented in FIGS. 17 and 18.
Figure 17:
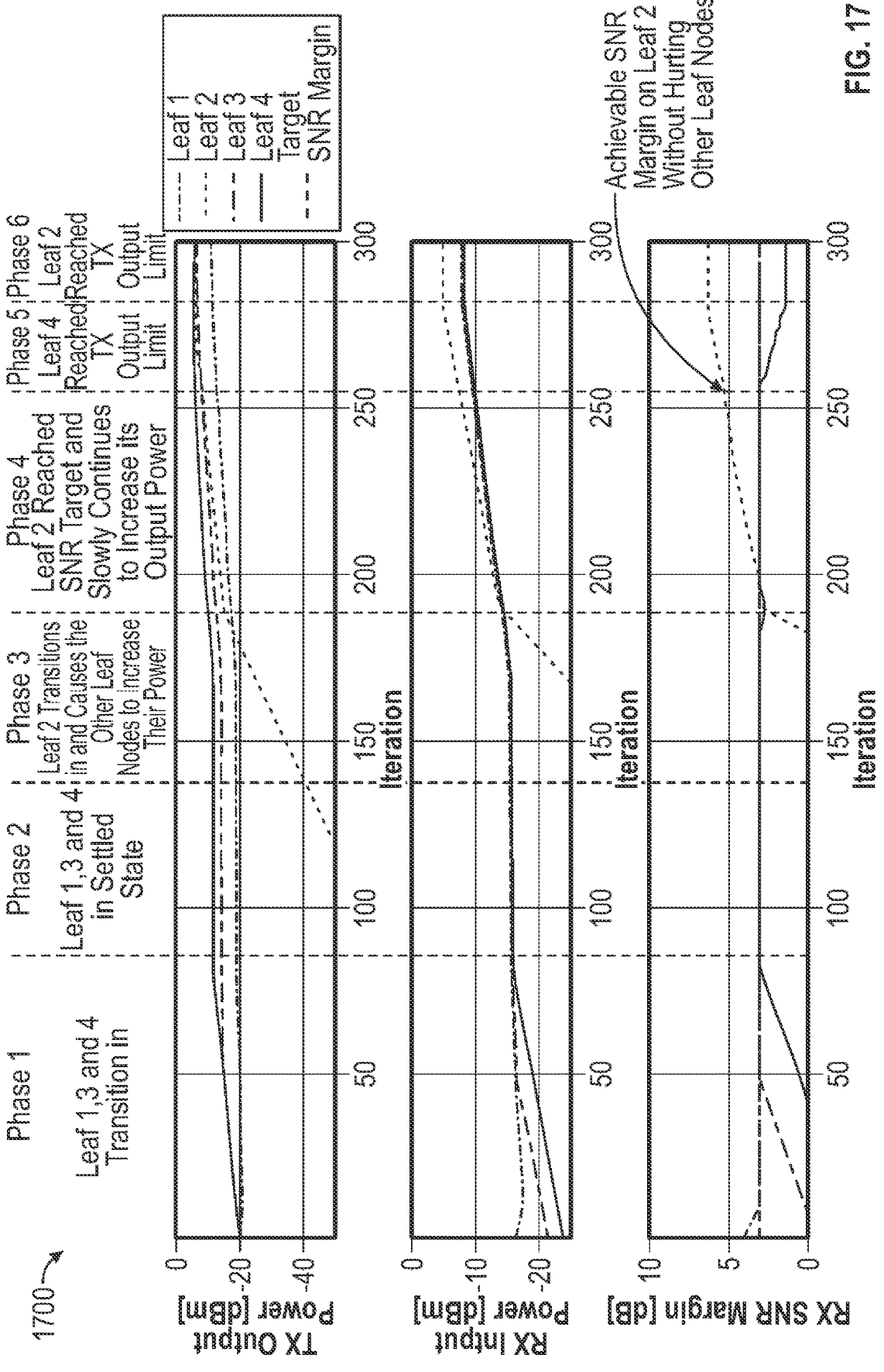
FIG. 17 is a diagram illustrating a maximum SNR margin determination method when adding a new subcarrier or subcarrier group to an existing network.

Referring now to FIG. 16 and FIG. 17, shown therein is a diagram 1700 illustrating determination of a maximum tolerable receive SNR margin and a maximum tolerable transmission output power for a new leaf node added to an existing network 1250. Maximum tolerable receive SNR value, as used herein, refers to a highest SNR margin of a subcarrier group transmitted between the new leaf node and the hub node that may be reached without degrading the signal quality of one or more subcarrier groups transmitted between existing leaf nodes and the hub node in the network 1250. Maximum tolerable transmission output power, as used herein, refers to a highest transmission output power from the new leaf node that may be used before the signal quality of one or more subcarrier groups transmitted from existing leaf nodes in the network 1250 degrades. In this exemplary implementation, the first leaf node 750, third leaf node 770, and fourth leaf node 780 are turned up at the same time or substantially the same time (phase 1) and undergo SNR optimization (phase 2) as described above. When the first leaf node 750, third leaf node 770, and fourth leaf node 780 have reached a settled state (i.e., subcarrier groups received from the first leaf node 750, third leaf node 770, and fourth leaf node 780 have receive SNR margins that are within the desired target margin), in phase 3 a new leaf node (second leaf node 760) transitions in.

As the second leaf node 760 powers up, it starts to affect the behavior of the existing leaf nodes (the first leaf node 750, third leaf node 770, and fourth leaf node 780). As can be seen in the diagram 1700, the first leaf node 750, third leaf node 770, and fourth leaf node 780 increase their transmission power output as the second leaf node 760 transitions in. At the end of phase 3, the new leaf node 760 has is within its target SNR margin. To determine the maximum tolerable receive SNR margin and the maximum tolerable transmission output power, the second leaf node 760 continues to increase its transmission output power but at a slower ramp-up speed than when it was transitioning in. In consequence, the existing leaf nodes also continue to increase their output power to keep their receive SNR within the desired SNR margin by continuously running the optimization cycle described above as the new leaf node continues to increase its transmission output power at the slower ramp-up speed.

At the end of phase 4, the receive SNR margin of the fourth leaf node 780 begins to drop because the fourth leaf node 780 had reached its maximum transmission output power and cannot follow the ramp-up of the new leaf node 760 anymore. This point gives the maximum tolerable receive SNR margin (~5 dB) of the new leaf 760 under the condition that the new leaf node 760 does not degrade the performance of the other leaf nodes 750, 770, and 780.

Note that the new leaf node 760 reaches a maximum receive SNR margin (~6 dB) at the end of phase 5. However, this is not a desirable operating point because the increased transmission output power needed to achieve the maximum receive SNR margin caused degradation on other leaf nodes (e.g., the fourth leaf node 780).

Figure 18:
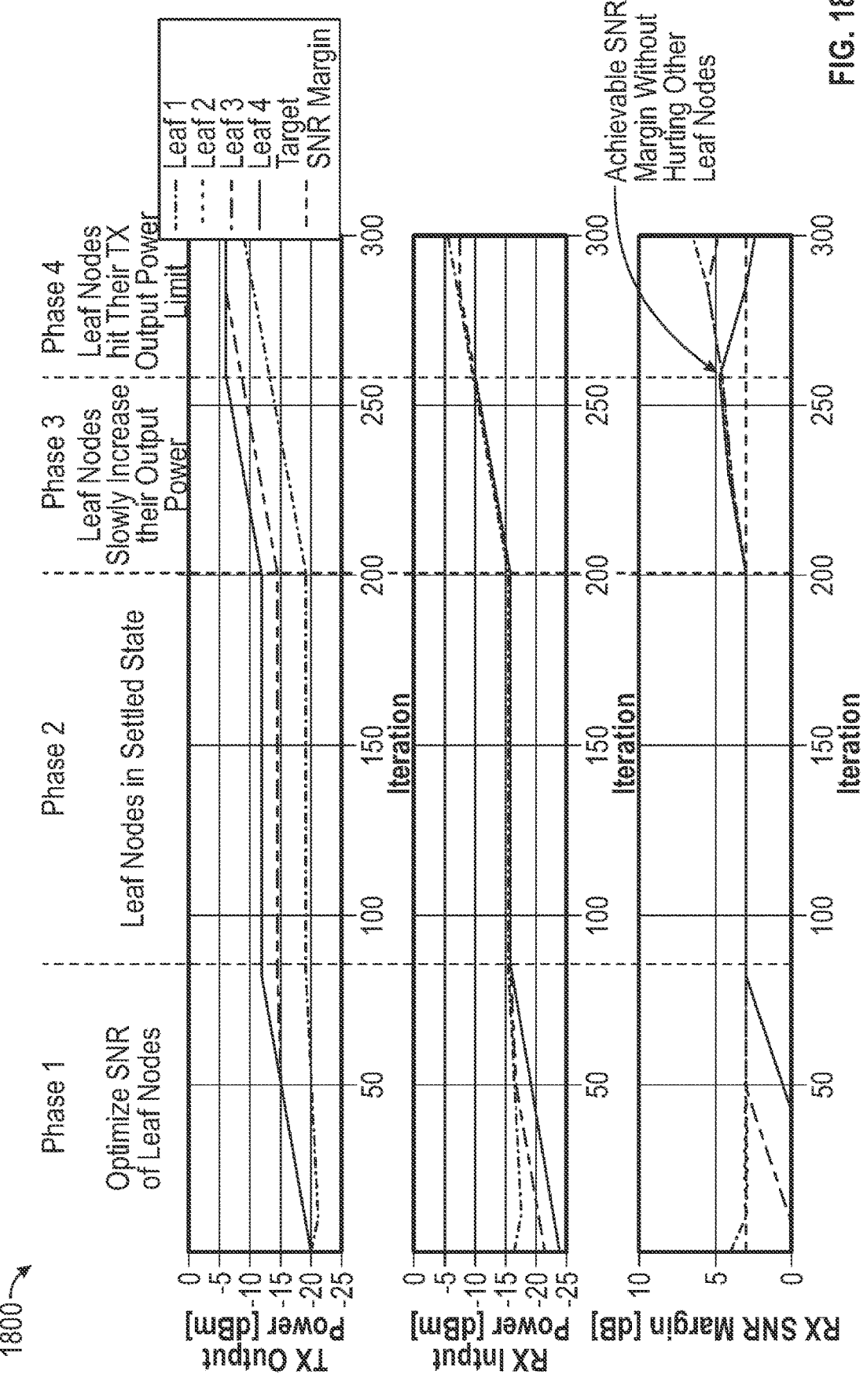
FIG. 18 is a diagram illustrating a maximum SNR margin determination method for subcarriers or subcarrier groups on an existing network.

Referring now to FIG. 16 and FIG. 18, shown therein is a diagram 1800 illustrating determination of a maximum tolerable SNR margin for all leaf nodes 750-780 at the same time. In phase 1 all leaf nodes 750-780 optimize their SNR margin following the SNR optimization procedure described above. At the end of phase 1, all leaf nodes 750-780 are within the desired SNR margin and stay in settled state during phase 2. In phase 3, all leaf nodes 750-780 start the maximum tolerable receive margin determination procedure and incrementally increase their transmission output power until one of the leaf nodes (the fourth leaf node 780 in this example) reaches its maximum transmission output power (marked by the end of phase 3 line). This point gives the maximum tolerable receive SNR margin that can be reached for all leaf nodes 750-780 without degrading performance of other leaf nodes. As can be seen in the example, further increasing the transmission power of the first leaf node 750, for instance, increased the receive SNR margin for the first leaf node 750. However, receive SNR margin for the fourth leaf node immediately began to degrade and the receive SNR margin of the second leaf node 760 and the third leaf node 770 began to degrade before the first leaf node 750 reached its maximum receive SNR margin.

Figure 19:
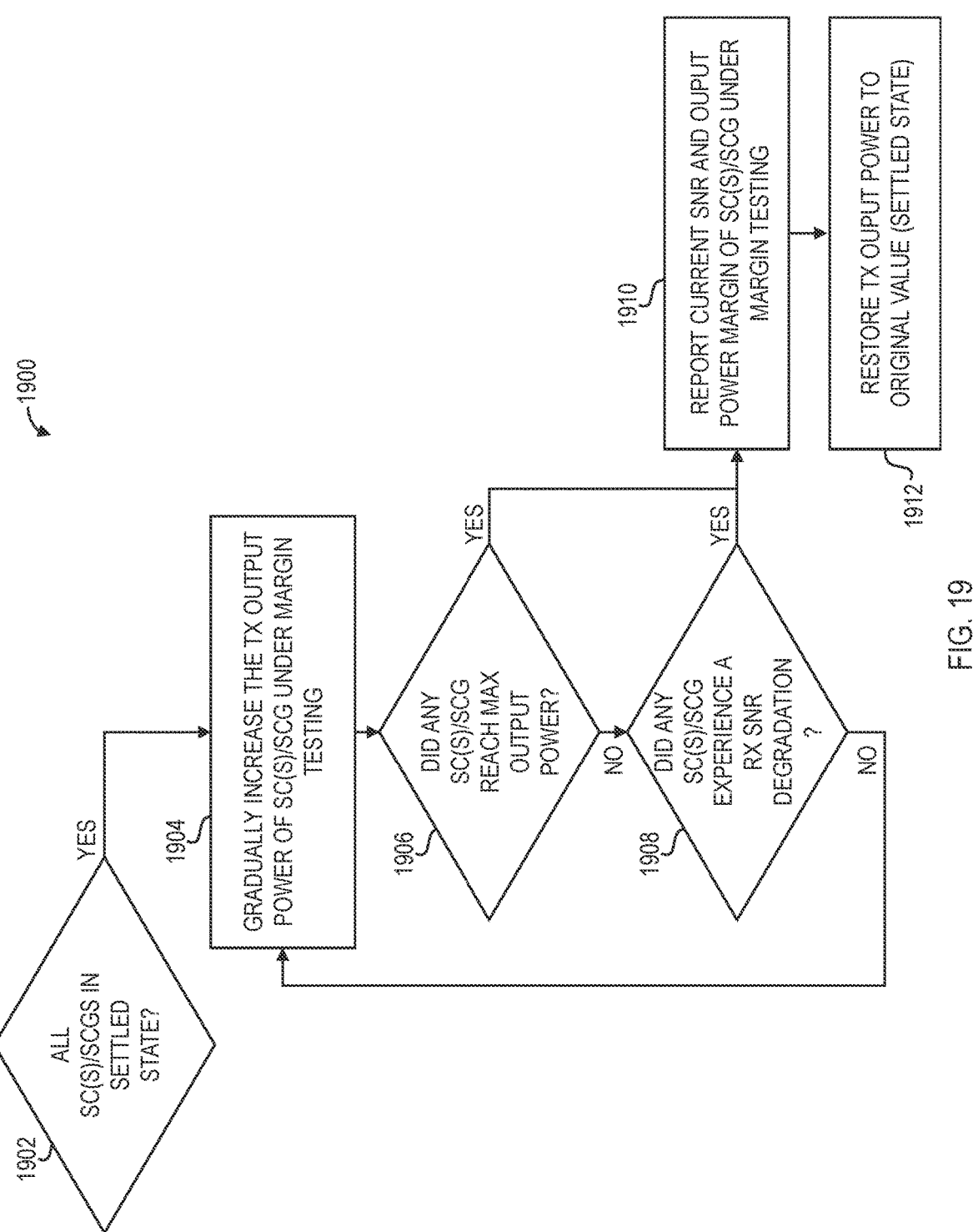
FIG. 19 is a process flow diagram of an exemplary method of determining a maximum SNR margin in accordance with the present disclosure.

Referring now to FIG. 19, shown therein is an exemplary process 1900 for margin determination. The process 1900 works for a single new subcarrier or subcarrier group that powers up or for multiple subcarriers/multiple subcarrier groups.

To begin the process 1900, all subcarriers/subcarrier groups to be tested must be in a settled state (i.e., all subcarriers/subcarrier groups within desired SNR margin) before the margin determination process 1900 starts.

Once all subcarriers/subcarrier groups to be tested are in the settled state, in step 1904 each of the transmitting nodes with subcarriers/subcarrier groups to be tested begin to gradually increase the transmission output power.

In step 1906, the receiving node determines if any of the transmitting nodes has reached its maximum power output. If the receiving node determines that none of the transmitting nodes has reached its maximum power output, in step 1908 the receiving node determines if any subcarrier/subcarrier group has experienced a receive SNR degradation.

If none of the subcarriers/subcarrier group has experienced a receive SNR degradation, the process 1900 returns to step 1904 and continues to gradually increase the transmission output power of the transmitting nodes with subcarriers/subcarrier groups under test.

Returning to step 1906, if one or more of the of the transmitting nodes has reached its maximum power output, in step 1910 the receiving node reports the current receive SNR margin for each of the subcarriers/subcarrier groups under test and the transmitting node for each subcarriers/subcarrier groups under test reports the current transmission output power. The maximum tolerable SNR margin and maximum tolerable transmission output power are saved in the node controller 96 of the hub node 710.

In step 1912, the transmission output powers for all transmission nodes are returned to their original value, which is the value in the settled state before step 1902 started.

Returning now to step 1908, if the receiving node determines that any subcarrier/subcarrier group has experienced a receive SNR degradation, the process 1900 proceeds to step 1910 and proceeds as described above.

Non-Limiting Illustrative Embodiments of the Inventive Concept(s)

Illustrative embodiment 1. A leaf node of an optical network, comprising: a coherent optical transceiver configured to receive an optical signal continuously transmitted from a hub node over a link connecting the leaf node and the hub node, the optical signal continuously transmitted at a first output power; and signal quality correction circuitry configured to determine a signal quality of the optical signal and send the signal quality to a hub node processor of the hub node, wherein the hub node processor is configured to compare the signal quality of the optical signal to a target signal quality margin, determine that the signal quality of the optical signal is outside the target signal quality margin, adjust the first output power of the optical signal to a second output power different than the first output power, thereby adjusting the signal quality, and continuously transmit the optical signal at the second output power.

Illustrative embodiment 2. The leaf node of illustrative embodiment 1, wherein the leaf node further comprises a control channel transceiver configured to send and receive signals over the link connecting the leaf node and the hub node indicative of the signal quality and output power via a control channel between the leaf node and the hub node.

Illustrative embodiment 3. The leaf node of illustrative embodiment 1, wherein the optical transceiver further comprises a coherent optical receiver and an analog to digital converter configured to convert the optical signal into a digital signal and the signal quality correction circuitry further comprises a digital signal processor, comprising: a digital demodulator and a bits-to-symbol component configured to receive the digital signal and map each bit in the digital signal to a symbol in a constellation; and a processor configured to determine the signal quality of the digital signal using the symbols in the constellation and send the signal quality to the hub node processor of the hub node.

Illustrative embodiment 4. The leaf node of illustrative embodiment 3, wherein the signal quality is quantified as one or more of: a signal to noise ratio, a bit error rate, a quality factor, mutual information, and error vector magnitude, combinations thereof.

Illustrative embodiment 5. The leaf node of illustrative embodiment 3, wherein the signal quality is quantified as a signal to noise ratio and the target signal quality margin is a target signal to noise ratio comprising a receive signal to noise ratio of the leaf node plus a margin.

Illustrative embodiment 6. The leaf node of illustrative embodiment 5, wherein the receive signal to noise ratio of the leaf node comprises noise contributions from the link connecting the leaf node and the hub node as well as signal to noise ratio contributions from physical components of the leaf node and the hub node.

Illustrative embodiment 7. The leaf node of illustrative embodiment 5, wherein the optical signal comprises at least one subcarrier group comprising a plurality of optical subcarriers, wherein a first one of the plurality of optical subcarriers has a first level of optical power and a second one of the plurality of optical subcarriers has a second level of optical power different than the first level of optical power, and the processor is further configured to determine a first signal quality of the first one of the plurality of optical subcarriers and a second signal quality of the second one of the plurality of optical subcarriers using the symbols in the constellation and send the first signal quality and the second signal quality to the hub node processor of the hub node; and wherein the hub node processor is configured to compare the first signal quality of the first one of the plurality of optical subcarriers to a first target signal quality margin and the second signal quality of the second one of the plurality of optical subcarriers to a second target signal quality margin and adjust the first output power of the optical signal to the second output power and continuously transmit the optical signal at the second output power when the hub node processor determines that the first signal quality of the first one of the plurality of optical subcarriers is outside the first target signal quality margin or the second signal quality of the second one of the plurality of optical subcarriers is outside the second target signal quality margin.

Illustrative embodiment 8. The leaf node of illustrative embodiment 1, wherein the signal quality correction circuitry comprises a photodetector configured to measure a total optical power of the first optical signal.

Illustrative embodiment 9. The leaf node of illustrative embodiment 1, wherein the signal quality correction circuitry comprises an electrical signal power monitor configured to measure a power of a signal within a bandwidth of the optical transceiver.

Illustrative embodiment 10. The leaf node of illustrative embodiment 1, wherein the optical signal comprises at least one subcarrier group comprising a plurality of optical subcarriers, wherein the optical signal has an overall level of optical power and a first one of the plurality of optical subcarriers has a first level of optical power and a second one of the plurality of optical subcarriers has a second level of optical power different than the first level of optical power, and wherein the optical transceiver further comprises: an optical signal power monitor configured to measure the overall level of optical power of the optical signal within a bandwidth of the optical transceiver; and an optical receiver and an analog to digital converter configured to convert the optical signal into a digital signal comprising a first digital subcarrier having a first level of power and a second digital subcarrier having a second level of power; wherein the leaf node further comprises a digital signal processor having a digital demultiplexer configured to split the digital signal into a first digital signal comprising the first digital subcarrier and a second digital signal comprising the second digital carrier; and wherein the signal quality correction circuitry further comprises an electrical signal power monitor configured to measure the first level of power of the first digital subcarrier and the second level of power of the second digital subcarrier and determine a first signal quality of the first digital subcarrier by comparing the overall level of optical power of the optical signal and the first level of power of the first digital subcarrier and a second signal quality of the second digital subcarrier comparing the overall level of optical power of the optical signal and the second level of power of the second digital subcarrier and send the first signal quality and the second signal quality to the hub node processor of the hub node; and wherein the hub node processor is configured to compare the first signal quality to a first target signal quality margin and the second signal quality to a second target signal quality margin and adjust the first output power of the optical signal to the second output power and continuously transmit the optical signal at the second output power when the hub node processor determines that the first signal quality is outside the first target signal quality margin or the second signal quality is outside the second target signal quality margin.

Illustrative embodiment 11. The leaf node of illustrative embodiment 1, wherein the target signal quality margin is a predetermined number based on user requirements.

Illustrative embodiment 12. The leaf node of illustrative embodiment 1, wherein the first optical signal comprises a plurality of optical subcarrier groups each comprising a plurality of optical subcarriers, and wherein the target signal quality margin is determined based on reducing a difference in signal quality between the plurality of optical subcarrier groups while keeping the signal quality within a predetermined range.

Illustrative embodiment 13. A hub node of an optical network, comprising: an optical transceiver having a coherent optical receiver and an analog to digital converter configured to convert an optical signal into a digital signal; a digital signal processor receiving the digital signal from the optical transceiver, the digital signal including at least a first digital subcarrier group, the digital signal processor configured to determine a first signal quality of the first digital subcarrier group; and a node controller having a node processor and a node memory storing processor executable code that, when executed, causes the node processor to: receive the first signal quality of the first digital subcarrier group from the digital signal processor; compare the first signal quality of the first digital subcarrier group to a first target signal quality margin; determine that the first signal quality is outside the first target signal quality margin; determine a first power adjustment for the first digital subcarrier group; and send a power adjustment signal comprising the first power adjustment to a leaf node that transmitted the first received digital subcarrier group.

Illustrative embodiment 14. The hub node of illustrative embodiment 13, wherein the first signal quality is quantified as one or more of: a signal to noise ratio, a bit error rate, a quality factor, an error vector magnitude, mutual information, and combinations thereof.

Illustrative embodiment 15. The hub node of illustrative embodiment 14, wherein the first signal quality is quantified as a signal to noise ratio and the first target signal quality margin is a target signal to noise ratio comprising a receive signal to noise ratio of the hub node plus a margin.

Illustrative embodiment 16. The hub node of illustrative embodiment 15, wherein the receive signal to noise ratio of the hub node comprises noise contributions from the link connecting the leaf node and the hub node as well as signal to noise ratio contributions from physical components of the leaf node and the hub node.

Illustrative embodiment 17. A hub node of an optical network, comprising: a digital signal processor supplying outputs based on a plurality of independent data streams, the outputs including a first digital subcarrier having a first frequency bandwidth and a second digital subcarrier having a second frequency bandwidth different than the first frequency bandwidth, the digital signal processor configured to control a first power level of the first digital subcarrier and a second power level of the second digital subcarrier; an optical transceiver having a digital to analog converter and an optical transmitter configured to convert outputs of the digital signal processor to an optical signal and transmit the optical signal to a leaf node over an optical link; and a node controller having a node processor and a node memory storing processor executable code that, when executed, causes the node processor to: determine a power adjustment of at least one of the first power level of the first digital subcarrier and the second power level of the second digital subcarrier when the node processor determines that a first signal quality, received from the leaf node that received the first digital subcarrier, is outside a first target signal quality margin or a second signal quality, received from the leaf node that received the second digital subcarrier, is outside a second target signal quality and adjust at least one of the first power level of the first digital subcarrier and the second power level of the second digital subcarrier using the power adjustment.

Illustrative embodiment 18. The hub node of illustrative embodiment 17, wherein the first signal quality and the second signal quality are quantified as one or more of: a signal to noise ratio, a bit error rate, a quality factor, an error vector magnitude, mutual information, and combinations thereof.

Illustrative embodiment 19. The hub node of illustrative embodiment 18, wherein the first signal quality and the second signal quality are quantified as a signal to noise ratio and the first target signal quality margin and the second target signal quality margin are each a target signal to noise ratio comprising a receive signal to noise ratio of the leaf node plus a margin.

Illustrative embodiment 20. The hub node of illustrative embodiment 19, wherein the receive signal to noise ratio of the leaf node comprises noise contributions from the link connecting the leaf node and the hub node as well as signal to noise ratio contributions from physical components of the leaf node and the hub node.

Illustrative embodiment 21. A method of optimizing a transmission spectrum of an optical signal, comprising: receiving, by a hub node of an optical network, an optical signal comprising a plurality of subcarrier groups, each transmitted at a transmission output power from a plurality of leaf nodes, the plurality of subcarrier groups arranged in a first order across a transmission spectrum of the optical signal, the plurality of subcarrier groups each having a signal quality and a transmission output power; determining, by the hub node, that the signal quality of one or more of the plurality of subcarrier groups is lower than a required signal quality margin; determining, by the hub node, a first subcarrier group of the plurality of subcarrier groups with a lowest signal quality below the required signal quality margin of the plurality of subcarrier groups, the first subcarrier group transmitted by a first leaf node of the plurality of leaf nodes, and a required power increase needed to increase the signal quality of the first subcarrier group to be within the required signal quality margin; determining, by the hub node, a second subcarrier group of the plurality of subcarrier groups that has a highest transmission output power of the transmission output power of the plurality of subcarrier groups, and that has a receive signal quality within a predetermined range; determining, by the hub node, that the transmission output power of the second subcarrier group is above a level needed to increase the signal quality by the required signal quality increase; and sending, by the hub node, a first signal to a first leaf node of the plurality of leaf nodes transmitting the first subcarrier group in a first position in the transmission spectrum and a second signal to a second leaf node transmitting the second subcarrier group in a second position in the transmission spectrum, the first signal configured to cause the first leaf node to transmit the first subcarrier group in the second position in the transmission spectrum and the second signal configured to cause the second leaf node to transmit the second subcarrier group in the first position in the transmission spectrum, such that subcarrier groups in the plurality of subcarrier groups are arranged in a second order across the transmission spectrum of the optical signal.

Illustrative embodiment 22. The method of illustrative embodiment 21, further comprising running, by the hub node, an optimization cycle configured to iteratively adjust the signal quality of the first subcarrier group and the second subcarrier group to be within the required signal quality margin, while staying within the transmission output power margin for the first subcarrier group and the second subcarrier group.

Illustrative embodiment 23. The method of illustrative embodiment 22, further comprising: determining, by the hub node, a first signal quality of the first subcarrier group and a second signal quality of the second subcarrier group; and determining, by the hub node, if the first subcarrier group and the second subcarrier group are within the required signal quality margin by comparing the first signal quality of the first subcarrier group and the second signal quality of the second subcarrier group to the required signal quality margin.

Illustrative embodiment 24. The method of illustrative embodiment 23, wherein if one or more of the first subcarrier group and the second subcarrier group are outside of the required signal quality margin, the hub node causes a warning to be sent indicating sub-optimal operation of the optical network.

Illustrative embodiment 25. The method of illustrative embodiment 21, wherein the transmission output power margin is a difference between a maximum transmission output power and a current transmission output power.

Illustrative embodiment 26. A method of optimizing a transmission spectrum of an optical signal, comprising: receiving, by a first hub node and a second hub node of an optical network, an optical signal comprising a plurality of subcarrier groups each transmitted at a transmission output power, the plurality of subcarrier groups arranged in a first order across the transmission spectrum of the optical signal, with a first group of the plurality of subcarrier groups processed by the first hub node and a second group of the plurality of subcarrier groups processed by the second hub node; determining, by the first hub node, a signal quality, a receive signal quality margin, and a highest transmission output power of each of the subcarrier groups of the first group of the plurality of subcarrier groups; determining, by the second hub node, a signal quality, a receive signal quality margin, and a highest transmission output power of each of the subcarrier groups of the second group of the plurality of subcarrier groups; determining, by the first hub node, that the signal quality of one or more subcarrier groups of the first group of the plurality of subcarrier groups is outside of a required signal quality margin, or, by the second hub node, that the signal quality of one or more subcarrier groups of the second group of the plurality of subcarrier groups is outside of the required signal quality margin; sending, by the first hub node, the signal quality, the receive signal quality margin, and the highest transmission output power of each of the subcarrier groups of the first group of the plurality of subcarrier groups to a network controller; sending, by the second hub node, the signal quality, the receive signal quality margin, and the highest transmission output power of each of the subcarrier groups of the second group of the plurality of subcarrier groups to the network controller; determining, by the network controller, a first subcarrier group of the plurality of subcarrier groups with a lowest signal quality below the required signal quality margin and a required signal quality increase needed to increase the signal quality of the first subcarrier group to within the required signal quality margin; determining, by the network controller, a second subcarrier group of the plurality of subcarrier groups that has a highest transmission output power of the transmission output power of the plurality of subcarrier groups, and that has a receive signal quality within a predetermined range; determining, by the network controller, if the transmission output power margin of the second subcarrier group is above a level needed to increase the signal quality by the required signal quality increase; determining, by the network controller, which one of the first hub node and the second hub node receives the first subcarrier group and which one of the first hub node and the second hub node receives the second subcarrier group; sending, by the network controller, a first signal to the one of the first hub node and the second hub node receiving the first subcarrier group, the first signal configured to cause the one of the first hub node and the second hub node receiving the first subcarrier group to send a second signal to a first leaf node transmitting the first subcarrier group in a first position in the transmission spectrum, the second signal directing the first leaf node to swap the first subcarrier group to be transmitted in a second position in the transmission spectrum, the second position in the transmission spectrum being a position in the transmission spectrum in which the second subcarrier group was transmitted in the transmission spectrum; and sending, by the network controller, a third signal to the one of the first hub node and the second hub node receiving the second subcarrier group, the third signal configured to cause the one of the first hub node and the second hub node receiving the second subcarrier group to send a fourth signal to a second leaf node transmitting the second subcarrier group in the second position in the transmission spectrum, the fourth signal directing the second leaf node to swap the second subcarrier group to be transmitted in the first position such that the plurality of subcarrier groups are arranged in a second order across the transmission spectrum of the optical signal.

Illustrative embodiment 27. The method of illustrative embodiment 26, further comprising: running, by the one of the first hub node and the second hub node receiving the first subcarrier group and the second leaf node transmitting the first subcarrier group, a first optimization cycle configured to iteratively adjust the signal quality of the first subcarrier group to be within the required signal quality margin, while staying within the transmission output power margin for the first subcarrier group; and running, by the one of the first hub node and the second hub node receiving the second subcarrier group and the first leaf node transmitting the second subcarrier group, a second optimization cycle configured to iteratively adjust the signal quality of the second subcarrier group to be within the required signal quality margin, while staying within the transmission output power margin for the second subcarrier group.

Illustrative embodiment 28. The method of illustrative embodiment 27, further comprising: determining, by the one of the first hub node and the second hub node receiving the first subcarrier group, a first signal quality of the first subcarrier group; determining, by the one of the first hub node and the second hub node receiving the first subcarrier group, if the first subcarrier group is within the required signal quality margin by comparing the first signal quality of the first subcarrier group to the required signal quality margin; determining, by the one of the first hub node and the second hub node receiving the second subcarrier group, a second signal quality of the second subcarrier group; and determining, by the one of the first hub node and the second hub node receiving the second subcarrier group, if the second subcarrier group is within the required signal quality margin by comparing the second signal quality of the second subcarrier group to the required signal quality margin.

Illustrative embodiment 29. The method of illustrative embodiment 28, wherein if one or more of the first subcarrier group and the second subcarrier group is outside of the required signal quality margin, the one of the first hub node and the second hub node receiving the first subcarrier group or the one of the first hub node and the second hub node receiving the second subcarrier group causes a warning to be sent indicating sub-optimal operation of the optical network.

Illustrative embodiment 30. The method of illustrative embodiment 26, wherein the transmission output power margin is a difference between a maximum transmission output power and a current transmission output power.

Illustrative embodiment 31. An optical network system, comprising: a plurality of leaf nodes configured to transmit an optical signal comprising a plurality of subcarrier groups, each transmitted at a transmission output power, the plurality of subcarrier groups arranged in a first order across a transmission spectrum of the optical signal, the plurality of subcarrier groups each having a signal quality and a transmission output power margin; and a hub node configured to:
receive the optical signal from the plurality of leaf nodes;
determine that the signal quality of one or more of the plurality of subcarrier groups is lower than a required signal quality margin; determine a first subcarrier group of the plurality of subcarrier groups with a lowest signal quality below the required signal quality margin of the plurality of subcarrier groups, the first subcarrier group transmitted by a first leaf node of the plurality of leaf nodes, and a required power increase needed to increase the signal quality of the first subcarrier group to be within the required signal quality margin; determine a second subcarrier group of the plurality of subcarrier groups that has a highest transmission output power of the transmission output power of the plurality of subcarrier groups, and that has a receive signal quality within a predetermined range, the second subcarrier group transmitted by a second leaf node of the plurality of leaf nodes; determine that the transmission output power of the second subcarrier group is above a level needed to increase the signal quality of the first subcarrier group by the required signal quality increase; and send a first signal to the first leaf node of the plurality of leaf nodes transmitting the first subcarrier group in a first position in the transmission spectrum and a second signal to the second leaf node transmitting the second subcarrier group in a second position in the transmission spectrum, the first signal configured to cause the first leaf node to transmit the first subcarrier group in the second position in the transmission spectrum and the second signal configured to cause the second leaf node to transmit the second subcarrier group in the first position in the transmission spectrum, such that subcarrier groups in the plurality of subcarrier groups are arranged in a second order across the transmission spectrum of the optical signal.

Illustrative embodiment 32. The optical network system of illustrative embodiment 31, wherein the hub node is configured to run an optimization cycle configured to iteratively adjust the signal quality of the first subcarrier group and the second subcarrier group to be within the required signal quality margin, while staying within the transmission output power margin for the first subcarrier group and the second subcarrier group.

Illustrative embodiment 33. The optical network system of illustrative embodiment 32, wherein the hub node is configured to: determine a first signal quality of the first subcarrier group and a second signal quality of the second subcarrier group; and determine if the first subcarrier group and the second subcarrier group are within the required signal quality margin by comparing the first signal quality of the first subcarrier group and the second signal quality of the second subcarrier group to the required signal quality margin.

Illustrative embodiment 34. The optical network system of illustrative embodiment 33, wherein if one or more of the first subcarrier group and the second subcarrier group are outside of the required signal quality margin, the hub node is configured to cause a warning to be sent indicating sub-optimal operation of the optical network.

Illustrative embodiment 35. The optical network system of illustrative embodiment 31, wherein the transmission output power margin is a difference between a maximum transmission output power and a current transmission output power.

Illustrative embodiment 36. A method of optimizing signal quality in a network system having two or more hub nodes connected to a plurality of leaf nodes, comprising: continuously outputting, by a first hub node of the two or more hub nodes, a first optical signal, the first optical signal comprising a first optical subcarrier group having a first level of optical power and a second optical subcarrier group having a second level of optical power different than the first level of optical power; continuously outputting, by a second hub node of the two or more hub nodes, a second optical signal, the second optical signal comprising a third optical subcarrier group having a third level of optical power and a fourth optical subcarrier group having a fourth level of optical power different than the third level of optical power; combining, by an optical coupler, the first optical signal and the second optical signal into a combined optical signal; receiving, by a first leaf node of the plurality of leaf nodes, the combined optical signal; determining, using signal correction circuitry of the first leaf node, a first received optical power of the first optical subcarrier group and a first signal quality of the first optical subcarrier group; sending, by the first leaf node, a first correction signal comprising the first received optical power and the first signal quality to the first hub node; receiving, by a second leaf node of the plurality of leaf nodes, the combined optical signal; determining, using signal correction circuitry of the second leaf node, a second received optical power of the second optical subcarrier group and a second signal quality of the second optical subcarrier group; sending, by the second leaf node, a second correction signal comprising the second received optical power and the second signal quality to the first hub node; receiving, by a third leaf node of the plurality of leaf nodes, the combined optical signal; determining, using signal correction circuitry of the third leaf node, a third received optical power of the third optical subcarrier group and a third signal quality of the third optical subcarrier group; sending, by the third leaf node, a third correction signal comprising the third received optical power and the third signal quality to the second hub node; receiving, by a fourth leaf node of the plurality of leaf nodes, the combined optical signal; determining, using signal correction circuitry of the fourth leaf node, a fourth received optical power of the fourth optical subcarrier group and a fourth signal quality of the fourth optical subcarrier group; sending, by the fourth leaf node, a fourth correction signal comprising the fourth received optical power and the fourth signal quality to the second hub node; sending, by the first hub node, a first power optimization request to a network controller, the first power optimization request comprising the first level of optical power of the first optical subcarrier group and the second level of optical power of the second optical subcarrier group from an optical transmitter of the first hub node and the first received optical power, the second received optical power, the first signal quality, and the second signal quality received from the first leaf node and the second leaf node; sending, by the second hub node, a second power optimization request to the network controller, the second power optimization request comprising the third level of optical power of the third optical subcarrier group and the fourth level of optical power of the fourth optical subcarrier group from the optical transmitter of the second hub node and the third received optical power, the fourth received optical power, the third signal quality, and the fourth signal quality received from the third leaf node and the fourth leaf node; determining, by a controller processor of the network controller, a maximum transmission power value for each of the first and second optical subcarrier groups of the first hub node and the third and fourth optical subcarrier groups of the second hub node using the first received optical power, the second received optical power, the third received optical power, and the fourth received optical power; comparing, by the controller processor of the network controller, the first signal quality to a first target signal quality, the second signal quality to a second target signal quality, the third signal quality to a third target signal quality, and the fourth signal quality to a fourth target signal quality; determining, by the controller processor of the network controller, a first power update for at least one of the first level of optical power of the first optical subcarrier group and the second level of optical power of the second optical subcarrier group of the first hub node when the first signal quality is different than the first target signal quality or the second signal quality is different than the second target signal quality, the first power update including at least one of a fifth level of optical power of the first optical subcarrier group and a sixth level of optical power of the second optical subcarrier group, and a second power update for at least one of the third level of optical power of the third optical subcarrier group and the fourth level of optical power of the fourth optical subcarrier group of the second hub node when the third signal quality is different than the third target signal quality or the fourth signal quality is different than the fourth target signal quality, the second power update including at least one of a seventh level of optical power of the third optical subcarrier group and an eighth level of optical power of the fourth optical subcarrier group of the second hub node, each of the fifth level of optical power and the sixth level of optical power being below the maximum transmission power value for each of the first and second optical subcarrier groups of the first hub node, and each of the seventh level of optical power and the eighth level of optical power being below the maximum transmission power value for each of the third and fourth optical subcarrier groups of the second hub node; sending, by the controller processor of the network controller, the first power update including at least one of the fifth level of optical power of the first optical subcarrier group and the sixth level of optical power of the second optical subcarrier group to the first hub node and the second power update including at least one of the seventh level of optical power of the third optical subcarrier group and the eighth level of optical power of the fourth optical subcarrier group of the second hub node to the second hub node; adjusting, by the first hub node, based on the first power update at least one of the first level of optical power to the fifth level of optical power and the second level of optical power to the sixth level of optical power; and adjusting, by the second hub node, based on the second power update at least one of the third level of optical power to the seventh level of optical power and the fourth level of optical power to the eighth level of optical power.

Illustrative embodiment 37. The method of illustrative embodiment 36, wherein each of the signal qualities is quantified as one of a signal to noise ratio, a bit error rate, a quality factor, mutual information, an error vector magnitude, and combinations thereof.

Illustrative embodiment 38. The method of illustrative embodiment 37, wherein each of the first leaf node and the second leaf node comprises a coherent optical receiver and an analog to digital converter configured to convert optical signals into digital signals and comprises signal quality correction circuitry comprising a receive digital signal processor, comprising: a digital demodulator and a bits-to-symbol component configured to receive the digital signals from the optical receiver and map each bit in the digital signals to a symbol in a constellation; and a processor configured to determine the signal quality of the digital signals using the symbols in the constellation and send the correction signals comprising the signal quality to a hub processor of the hub node.

Illustrative embodiment 39. The method of illustrative embodiment 38, wherein each of the signal quality is quantified as a signal to noise ratio and each of the target signal quality is a target signal to noise ratio comprising a transmit signal to noise ratio of the leaf node plus a margin.

Illustrative embodiment 40. The method of illustrative embodiment 36, wherein the first optical signal has a first transmission optical power and the second optical signal has a second transmission optical power different than the first transmission optical power.

Illustrative embodiment 41. A method of signal optimization in a network, comprising:

continuously outputting, by a first hub node of two or more hub nodes, a first optical signal, the first optical signal comprising a first optical subcarrier group having a first level of optical power and a second optical subcarrier group having a second level of optical power different than the first level of optical power; continuously outputting, by a second hub node of the two or more hub nodes, a second optical signal, the second optical signal comprising a third optical subcarrier group having a third level of optical power and a fourth optical subcarrier group having a fourth level of optical power different than the third level of optical power; combining, by an optical coupler, the first optical signal and the second optical signal into a combined optical signal; receiving, by a first leaf node of a plurality of leaf nodes, the combined optical signal; determining, using signal correction circuitry of the first leaf node, a first signal quality of the first optical subcarrier group and a second signal quality of the second optical subcarrier group; sending, by the first leaf node, the first signal quality and the second signal quality to the first hub node; receiving, by a second leaf node of the plurality of leaf nodes, the combined optical signal; determining, using signal correction circuitry of the second leaf node, a third signal quality of the third optical subcarrier group and a fourth signal quality of the fourth optical subcarrier group; sending, by the second leaf node, the third signal quality and the fourth signal quality to the second hub node; comparing, by the first hub node, the first signal quality to a first target signal quality and the second signal quality to a second target signal quality; determining, by the first hub node, that the first signal quality is different than the first target signal quality or the second signal quality is different than the second target signal quality; determining, by the first hub node, at least one of a first power adjustment of the first level of optical power and a second power adjustment of the second level of optical power; sending, by the first hub node, at least one of the first power adjustment and the second power adjustment to a network controller; comparing, by the second hub node, the third signal quality to a third target signal quality and the fourth signal quality to a fourth target signal quality; determining, by the second hub node, that the third signal quality is different than the third target signal quality or the fourth signal quality is different than the fourth target signal quality; determining, by the second hub node, at least one of a third power adjustment of the third level of optical power and a fourth power adjustment of the fourth level of optical power; sending, by the second hub node, at least one of the third power adjustment and the fourth power adjustment to the network controller; determining, by a controller processor of the network controller, that at least one of the first power adjustment, the second power adjustment, the third power adjustment, and the fourth power adjustment would negatively affect the combined optical signal; updating, by the controller processor of the network controller, at least one of the first target signal quality to a new first target signal quality, the second target signal quality to a new second target signal quality, the third target signal quality to a new third target signal quality, and the fourth target signal quality to a new fourth target signal quality; and sending, by the controller processor of the network controller, the new first target signal quality and the new second target signal quality to the first hub node causing the first hub node to execute a first optimization cycle using the new first target signal quality and the new second target signal quality; and sending, by the controller processor of the network controller, the new third target signal quality and the new fourth target signal quality to the second hub node causing the second hub node to execute a second optimization cycle using the new third target signal quality and the new fourth target signal quality.

Illustrative embodiment 42. The method of illustrative embodiment 41, wherein each of the signal qualities is quantified as one of a signal to noise ratio, a bit error rate, a quality factor, mutual information, an error vector magnitude, and combinations thereof.

Illustrative embodiment 43. The method of illustrative embodiment 41, wherein a coherent optical receiver of each of the first leaf node and the second leaf node comprises a coherent optical receiver and an analog to digital converter configured to convert optical signals into digital signals and the signal quality correction circuitry further comprises a receive digital signal processor, comprising: a digital demodulator and a bits-to-symbol component configured to receive the digital signals from the optical receiver and map each bit in the digital signals to a symbol in a constellation; and a processor configured to determine the signal quality of the digital signals using the symbols in the constellation and send the correction signals comprising the signal quality to a hub processor of the hub node.

Illustrative embodiment 44. The method of illustrative embodiment 43, wherein each of the signal quality is quantified as a signal to noise ratio and each of the target signal quality is a target signal to noise ratio comprising a transmit signal to noise ratio of the leaf node plus a margin.

Illustrative embodiment 45. An optical network system, comprising: two or more hub nodes, including a first hub node and a second hub node, the first hub node configured to continuously output a first optical signal, the first optical signal comprising a first optical subcarrier group having a first level of optical power and a second optical subcarrier group having a second level of optical power different than the first level of optical power, the second hub node configured to continuously output, a second optical signal, the second optical signal comprising a third optical subcarrier group having a third level of optical power and a fourth optical subcarrier group having a fourth level of optical power different than the third level of optical power; an optical coupler configured to combine the first optical signal and the second optical signal into a combined optical signal; a plurality of leaf nodes including a first leaf node, a second leaf node, a third leaf node, and a fourth leaf node, each of the plurality of leaf nodes configured to receive the combined optical signal, the first leaf node having signal correction circuitry configured to determine a first received optical power of the first optical subcarrier group and a first signal quality of the first optical subcarrier group, the first leaf node configured to send a first correction signal comprising the first received optical power and the first signal quality to the first hub node, the second leaf node having signal correction circuitry configured to determine a second received optical power of the second optical subcarrier group and a second signal quality of the second optical subcarrier group, the second leaf node configured to send a second correction signal comprising the second received optical power and the second signal quality to the first hub node, the third leaf node having signal correction circuitry configured to determine a third received optical power of the third optical subcarrier group and a third signal quality of the third optical subcarrier group, the third leaf node configured to send a third correction signal comprising the third received optical power and the third signal quality to the second hub node, the fourth leaf node having signal correction circuitry configured to determine a fourth received optical power of the fourth optical subcarrier group and a fourth signal quality of the fourth optical subcarrier group, the fourth leaf node configured to send a fourth correction signal comprising the fourth received optical power and the fourth signal quality to the second hub node; a network controller having a controller processor, the network controller configured to receive from the first hub node a first power optimization request comprising the first level of optical power of the first optical subcarrier group and the second level of optical power of the second optical subcarrier group from the optical transmitter of the first hub node and the first received optical power, the second received optical power, the first signal quality, and the second signal quality received from the first leaf node and the second leaf node, the network controller configured to receive from the second hub node a second power optimization request comprising the third level of optical power of the third optical subcarrier group and the fourth level of optical power of the fourth optical subcarrier group from the optical transmitter of the second hub node and the third received optical power, the fourth received optical power, the third signal quality, and the fourth signal quality received from the third leaf node and the fourth leaf node; wherein the controller processor of the network controller is configured to: determine a maximum transmission power value for each of the first and second optical subcarrier groups of the first hub node and the third and fourth optical subcarrier groups of the second hub node using the first received optical power, the second received optical power, the third received optical power, and the fourth received optical power; compare the first signal quality to a first target signal quality, the second signal quality to a second target signal quality, the third signal quality to a third target signal quality, and the fourth signal quality to a fourth target signal quality; determine a first power update for at least one of the first level of optical power of the first optical subcarrier group and the second level of optical power of the second optical subcarrier group of the first hub node when the first signal quality is different than the first target signal quality or the second signal quality is different than the second target signal quality, the first power update including at least one of a fifth level of optical power of the first optical subcarrier group and a sixth level of optical power of the second optical subcarrier group, and a second power update for at least one of the third level of optical power of the third optical subcarrier group and the fourth level of optical power of the fourth optical subcarrier group of the second hub node when the third signal quality is different than the third target signal quality or the fourth signal quality is different than the fourth target signal quality, the second power update including at least one of a seventh level of optical power of the third optical subcarrier group and an eighth level of optical power of the fourth optical subcarrier group of the second hub node, each of the fifth level of optical power and the sixth level of optical power being below the maximum transmission power value for each of the first and second optical subcarrier groups of the first hub node, and each of the seventh level of optical power and the eighth level of optical power being below the maximum transmission power value for each of the third and fourth optical subcarrier groups of the second hub node; and send the first power update including at least one of the fifth level of optical power of the first optical subcarrier group and the sixth level of optical power of the second optical subcarrier group to the first hub node and the second power update including at least one of the seventh level of optical power of the third optical subcarrier group and the eighth level of optical power of the fourth optical subcarrier group of the second hub node to the second hub node; wherein the first hub node is configured to adjust, based on the first power update, at least one of the first level of optical power to the fifth level of optical power and the second level of optical power to the sixth level of optical power; and wherein the second hub node is configured to adjust, based on the second power update, at least one of the third level of optical power to the seventh level of optical power and the fourth level of optical power to the eighth level of optical power.

Illustrative embodiment 46. The optical network system of illustrative embodiment 45, wherein each of the signal qualities is quantified as one of a signal to noise ratio, a bit error rate, a quality factor, mutual information, an error vector magnitude, and combinations thereof.

Illustrative embodiment 47. The optical network system of illustrative embodiment 46, wherein each of the first leaf node and the second leaf node comprises a coherent optical receiver and an analog to digital converter configured to convert optical signals into digital signals, and comprises a signal quality correction circuitry further comprises a receive digital signal processor, comprising: a digital demodulator and a bits-to-symbol component configured to receive the digital signals from the optical receiver and map each bit in the digital signals to a symbol in a constellation; and a processor configured to determine the signal quality of the digital signals using the symbols in the constellation and send the correction signals comprising the signal quality to the hub processor of the hub node.

Illustrative embodiment 48. The optical network system of illustrative embodiment 47, wherein each of the signal quality is quantified as a signal to noise ratio and each of the target signal quality is a target signal to noise ratio comprising a transmit signal to noise ratio of the leaf node plus a margin.

Illustrative embodiment 49. The optical network system of illustrative embodiment 45, wherein the first optical signal has a first transmission optical power and the second optical signal has a second transmission optical power different than the first transmission optical power.

Illustrative embodiment 50. A method of determining an achievable receive signal quality of a subcarrier group of an optical signal, comprising: receiving, by a hub node, an optical signal comprising a plurality of subcarrier groups each transmitted at a transmission output power from one or more leaf nodes; continuously running, by the hub node, a signal optimization cycle configured to iteratively adjust a receive signal quality of each of the plurality of subcarrier groups to be within a required signal quality margin, while staying within a transmission output power margin for each of the plurality of subcarrier groups, the signal optimization cycle comprising: determining, by the hub node, the receive signal quality of each subcarrier group of the plurality of subcarrier groups; determining, by the hub node, that one or more of the plurality of subcarrier groups is outside of the required signal quality margin by comparing the receive signal quality of each subcarrier group of the plurality of subcarrier groups to the required signal quality margin for each of the plurality of subcarrier groups; determining, by the hub node, a power adjustment to bring the receive signal quality of the one or more of the plurality of subcarrier groups that is outside of the required signal quality margin to within the required signal quality margin; and adjusting, by each leaf node, a transmission output power of each of the plurality of subcarrier groups based on the power adjustment necessary to bring the receive signal quality of one or more of the plurality of subcarrier groups within the required signal quality margin while staying within the transmission output power margin; determining, by the hub node, that each of the plurality of subcarrier groups is currently being transmitted within the required receive signal quality margin by comparing the receive signal quality of each subcarrier group of the plurality of subcarrier groups to the required receive signal quality margin; sending, by the hub node, a first signal to leaf nodes transmitting the plurality of sub-carrier groups, the first signal configured to cause the leaf nodes to report a current transmission output power of each of the plurality of subcarrier groups when each of the plurality of subcarrier groups is being transmitted within the required receive signal quality margin as a first transmission power to the hub node; sending, by the hub node, a second signal to a new leaf node in the one or more leaf nodes, the second signal configured to cause the new leaf node to begin transmitting a new subcarrier group that is combined in the optical signal and received by the hub node; running, by the hub node and the new leaf node, the signal optimization cycle configured to bring a receive signal quality of the new subcarrier group up to within the required receive signal quality margin by gradually increasing a transmission output power of the new subcarrier group until the receive signal quality of the new subcarrier group is within the required receive signal quality margin; sending, by the hub node, a third signal to the new leaf node, the third signal configured to cause the new leaf node to report a current transmission output power of the new subcarrier group when the receive signal quality of the new subcarrier group is within the required receive signal quality margin as a second transmission output power to the hub node; sending, by the hub node, a fourth signal to each of the leaf nodes transmitting the plurality of subcarrier groups and the new leaf node, the fourth signal configured to cause the new leaf node to gradually increase transmission output power of the new subcarrier group and cause the leaf nodes transmitting the plurality of subcarrier groups to continuously run the signal optimization cycle and adjust to receive signal quality changes caused by the increasing transmission output power of the new leaf node; monitoring, by the hub node, the plurality of subcarrier groups and the new subcarrier group to determine if any of the plurality of subcarrier groups and the new subcarrier group has reached a maximum transmission output power; monitoring, by the hub node, a signal quality of each of the plurality of subcarrier groups to determine if the receive signal quality of any of the plurality of subcarrier groups and the new subcarrier group begins to degrade; determining, by the hub node, that one or more of the plurality of subcarrier groups and the new subcarrier group has reached the maximum transmission output power or that the signal quality of one or more of the plurality of subcarrier groups and the new subcarrier group has begun to degrade; and determining, by the hub node, a current receive signal quality of the new subcarrier group when one or more of the plurality of subcarrier groups and the new subcarrier group has reached the maximum transmission output power or the receive signal quality of one or more of the plurality of subcarrier groups and the new subcarrier group has begun to degrade, the current receive signal quality of the new subcarrier group being the achievable received signal quality of the new subcarrier group without degrading the signal quality of the plurality of subcarrier groups.

Illustrative embodiment 51. The method of illustrative embodiment 50, wherein after determining the achievable receive signal quality of the new subcarrier group, the hub node sends a fifth signal to each of the leaf nodes transmitting the plurality of subcarrier groups and the new leaf node, the fifth signal configured to cause the leaf nodes transmitting the plurality of subcarrier groups to return the transmission output power of each of the plurality of subcarrier groups to the first transmission output power and the new leaf node to return the new subcarrier group to the second transmission output power.

Illustrative embodiment 52. The method of illustrative embodiment 50, wherein after determining the achievable receive signal quality of the new subcarrier group, the hub node sends a fifth signal to the new leaf node, the fifth signal configured to cause the new leaf node to return the new subcarrier group to the second transmission output power and the leaf nodes transmitting the plurality of subcarrier groups adjusts the transmission output powers of the plurality of subcarrier groups to within the required signal quality margin by continuously running the optimization cycle.

Illustrative embodiment 53. The method of illustrative embodiment 50, wherein after determining that one or more of the plurality of subcarrier groups and the new subcarrier group has reached the maximum transmission output power or the receive signal quality of one or more of the plurality of subcarrier groups and the new subcarrier group has begun to degrade, the hub node sends a fifth signal to the new leaf node, the fifth signal configured to cause the new leaf node to determine a current transmission output power of the new subcarrier group and save the current transmission output power as an achievable transmission output power of the new subcarrier group without degrading the signal quality of the plurality of subcarrier groups.

Illustrative embodiment 54. The method of illustrative embodiment 53, wherein the hub node subtracts the second transmission output power of the new subcarrier group from the achievable transmission output power of the new subcarrier group to determine a transmission output power margin of the new subcarrier group.

Illustrative embodiment 55. The method of illustrative embodiment 50, wherein each of the receive signal quality is quantified as one of a signal to noise ratio, a bit error rate, a quality factor, mutual information, an error vector magnitude, and combinations thereof.

Illustrative embodiment 56. The method of illustrative embodiment 50, wherein each of the receive signal quality is quantified as a signal to noise ratio and each of the required receive signal quality margin is a target signal to noise ratio comprising a transmit signal to noise ratio of the leaf node transmitting a particular subcarrier group of the plurality of subcarrier groups plus a margin.

Illustrative embodiment 57. The method of illustrative embodiment 50, wherein monitoring the plurality of subcarrier groups and the new subcarrier group includes receiving, by the hub node, a current transmission output power for each of the plurality of subcarrier groups and the new subcarrier group each time the transmission output power is increased and saving a previous transmission output power of each of the plurality of subcarrier groups and the new subcarrier group as a last transmission output power; and wherein determining if any of the plurality of subcarrier groups and the new subcarrier group has reached a maximum transmission output power comprises one or more of: comparing the current transmission output power for each of the plurality of subcarrier groups and the new subcarrier group to a maximum transmission output power of each of the plurality of subcarrier groups and the new subcarrier group reported by each of the leaf nodes transmitting the plurality of subcarrier groups and the new leaf node; determining, by the hub node, that the current transmission output power of one or more of the plurality of subcarrier groups and the new subcarrier group is the same as the last transmission output power; and combinations thereof.

Illustrative embodiment 58. A method of determining an achievable receive signal quality of each subcarrier group of a plurality of subcarrier groups of an optical signal, comprising:

receiving, by a hub node, the optical signal comprising a plurality of subcarrier groups each transmitted at a transmission output power; determining, by the hub node, a receive signal quality of each of the plurality of subcarrier groups; determining, by the hub node, that each of the plurality of subcarrier groups is currently being transmitted at a required receive signal quality margin by comparing the receive signal quality of each of the plurality of subcarrier groups to the required receive signal quality margin; sending, by the hub node, a first signal to leaf nodes transmitting the plurality of subcarrier groups, the first signal configured to cause the leaf nodes to report a first transmission output power of each of the plurality of subcarrier groups when each of the plurality of subcarrier groups is being transmitted at the required receive signal quality margin to the hub node; sending, by the hub node, a second signal to each of the leaf nodes transmitting the plurality of subcarrier groups, the second signal configured to cause the leaf nodes to gradually increase the transmission output power of each of the plurality of subcarrier groups; monitoring, by the hub node, the plurality of subcarrier groups to determine if any of the plurality of subcarrier groups has reached a maximum transmission output power; monitoring, by the hub node, a signal quality of each of the plurality of subcarrier groups to determine if the receive signal quality of any of the plurality of subcarrier groups begins to degrade; determining, by the hub node, that one or more of the plurality of subcarrier groups has reached the maximum transmission output power or the receive signal quality of one or more of the plurality of subcarrier groups has begun to degrade; and determining, by the hub node, a current receive signal quality of each of the plurality of subcarrier groups when one or more of the plurality of subcarrier groups has reached the maximum transmission output power or the receive signal quality of one or more of the plurality of subcarrier groups has begun to degrade, the current receive signal quality of each of the plurality of subcarrier groups being an achievable receive signal quality of each of the plurality of subcarrier groups without degrading the receive signal quality of any other one of the plurality of subcarrier groups.

Illustrative embodiment 59. The method of illustrative embodiment 58, wherein after determining the achievable receive signal quality of each of the plurality of subcarrier groups, the hub node sends a third signal to each of the leaf nodes transmitting the plurality of subcarrier groups, the third signal configured to cause the leaf nodes transmitting the plurality of subcarrier groups to return the transmission output power of each of the plurality of subcarrier groups to the first transmission output power.

Illustrative embodiment 60. The method of illustrative embodiment 58, wherein after determining that one or more of the plurality of subcarrier groups has reached the maximum transmission output power or the receive signal quality of one or more of the plurality of subcarrier groups has begun to degrade, the hub node sends a third signal to each of the leaf nodes transmitting the plurality of subcarrier groups, the third signal configured to cause each of the leaf nodes transmitting the plurality of subcarrier groups to determine a current transmission output power of each of the plurality of subcarrier groups and save the current transmission output power as an achievable transmission output power of each of the plurality of subcarrier groups without degrading the signal quality of any other one of the plurality of subcarrier groups.

Illustrative embodiment 61. The method of illustrative embodiment 58, wherein the hub node subtracts the second transmission output power of the new subcarrier group from the achievable transmission output power of the new subcarrier group to determine a transmission output power margin of the new subcarrier group.

Illustrative embodiment 62. The method of illustrative embodiment 58, wherein each of the receive signal quality is quantified as one of a signal to noise ratio, a bit error rate, a quality factor, mutual information, an error vector magnitude, and combinations thereof.

Illustrative embodiment 63. The method of illustrative embodiment 58, wherein each of the receive signal quality is quantified as a signal to noise ratio and each of the required receive signal quality margin is a target signal to noise ratio comprising a transmit signal to noise ratio of the leaf node transmitting a particular subcarrier group of the plurality of subcarrier groups plus a margin.

Illustrative embodiment 64. The method of illustrative embodiment 58, wherein monitoring the plurality of subcarrier groups to determine if any of the plurality of subcarrier groups has reached a maximum transmission output power comprises receiving, by the hub node, a current transmission output power for each of the plurality of subcarrier groups each time the transmission output power is increased, and saving a previous transmission output power of each of the plurality of subcarrier groups as a last transmission output power; and wherein determining if any of the plurality of subcarrier groups has reached the maximum transmission output power comprises one or more of: comparing the current transmission output power for each of the plurality of subcarrier groups to a maximum transmission output power of each of the plurality of subcarrier groups reported by each of the leaf nodes transmitting the plurality of subcarrier groups; determining, by the hub node, that the current transmission output power of one or more of the plurality of subcarrier groups is the same as the last transmission output power; and combinations thereof.

From the above description, it is clear that the inventive concept(s) disclosed herein are well adapted to carry out the objects and to attain the advantages mentioned herein, as well as those inherent in the inventive concept(s) disclosed herein. While the implementations of the inventive concept(s) disclosed herein have been described for purposes of this disclosure, it will be understood that numerous changes may be made and readily suggested to those skilled in the art which are accomplished within the scope and spirit of the inventive concept(s) disclosed herein.

What is claimed is:

1. A method of optimizing signal quality in a network system having two or more hub nodes connected to a plurality of leaf nodes, comprising:

continuously outputting, by a first hub node of the two or more hub nodes, a first optical signal, the first optical signal comprising a first optical subcarrier group having a first level of optical power and a second optical subcarrier group having a second level of optical power different than the first level of optical power;

continuously outputting, by a second hub node of the two or more hub nodes, a second optical signal, the second optical signal comprising a third optical subcarrier group having a third level of optical power and a fourth optical subcarrier group having a fourth level of optical power different than the third level of optical power;

combining, by an optical coupler, the first optical signal and the second optical signal into a combined optical signal;

receiving, by a first leaf node of the plurality of leaf nodes, the combined optical signal;

determining, using signal correction circuitry of the first leaf node, a first received optical power of the first optical subcarrier group and a first signal quality of the first optical subcarrier group;

sending, by the first leaf node, a first correction signal comprising the first received optical power and the first signal quality to the first hub node;

receiving, by a second leaf node of the plurality of leaf nodes, the combined optical signal;

determining, using signal correction circuitry of the second leaf node, a second received optical power of the second optical subcarrier group and a second signal quality of the second optical subcarrier group;

sending, by the second leaf node, a second correction signal comprising the second received optical power and the second signal quality to the first hub node;

receiving, by a third leaf node of the plurality of leaf nodes, the combined optical signal;

determining, using signal correction circuitry of the third leaf node, a third received optical power of the third optical subcarrier group and a third signal quality of the third optical subcarrier group;

sending, by the third leaf node, a third correction signal comprising the third received optical power and the third signal quality to the second hub node;

receiving, by a fourth leaf node of the plurality of leaf nodes, the combined optical signal;

determining, using signal correction circuitry of the fourth leaf node, a fourth received optical power of the fourth optical subcarrier group and a fourth signal quality of the fourth optical subcarrier group;

sending, by the fourth leaf node, a fourth correction signal comprising the fourth received optical power and the fourth signal quality to the second hub node;

sending, by the first hub node, a first power optimization request to a network controller, the first power optimization request comprising the first level of optical power of the first optical subcarrier group and the second level of optical power of the second optical subcarrier group from an optical transmitter of the first hub node and the first received optical power, the second received optical power, the first signal quality, and the second signal quality received from the first leaf node and the second leaf node;

sending, by the second hub node, a second power optimization request to the network controller, the second power optimization request comprising the third level of optical power of the third optical subcarrier group and the fourth level of optical power of the fourth optical subcarrier group from the optical transmitter of the second hub node and the third received optical power, the fourth received optical power, the third signal quality, and the fourth signal quality received from the third leaf node and the fourth leaf node;

determining, by a controller processor of the network controller, a maximum transmission power value for each of the first and second optical subcarrier groups of the first hub node and the third and fourth optical subcarrier groups of the second hub node using the first received optical power, the second received optical power, the third received optical power, and the fourth received optical power;

comparing, by the controller processor of the network controller, the first signal quality to a first target signal quality, the second signal quality to a second target signal quality, the third signal quality to a third target signal quality, and the fourth signal quality to a fourth target signal quality;

determining, by the controller processor of the network controller, a first power update for at least one of the first level of optical power of the first optical subcarrier group and the second level of optical power of the second optical subcarrier group of the first hub node when the first signal quality is different than the first target signal quality or the second signal quality is different than the second target signal quality, the first power update including at least one of a fifth level of optical power of the first optical subcarrier group and a sixth level of optical power of the second optical subcarrier group, and a second power update for at least one of the third level of optical power of the third optical subcarrier group and the fourth level of optical power of the fourth optical subcarrier group of the second hub node when the third signal quality is different than the third target signal quality or the fourth signal quality is different than the fourth target signal quality, the second power update including at least one of a seventh level of optical power of the third optical subcarrier group and an eighth level of optical power of the fourth optical subcarrier group of the second hub node, each of the fifth level of optical power and the sixth level of optical power being below the maximum transmission power value for each of the first and second optical subcarrier groups of the first hub node, and each of the seventh level of optical power and the eighth level of optical power being below the maximum transmission power value for each of the third and fourth optical subcarrier groups of the second hub node;

sending, by the controller processor of the network controller, the first power update including at least one of the fifth level of optical power of the first optical subcarrier group and the sixth level of optical power of the second optical subcarrier group to the first hub node and the second power update including at least one of the seventh level of optical power of the third optical subcarrier group and the eighth level of optical power of the fourth optical subcarrier group of the second hub node to the second hub node;

adjusting, by the first hub node, based on the first power update at least one of the first level of optical power to the fifth level of optical power and the second level of optical power to the sixth level of optical power; and adjusting, by the second hub node, based on the second power update at least one of the third level of optical power to the seventh level of optical power and the fourth level of optical power to the eighth level of optical power.

2. The method of claim 1, wherein each of the signal qualities is quantified as one of a signal to noise ratio, a bit error rate, a quality factor, mutual information, an error vector magnitude, and combinations thereof.

3. The method of claim 2, wherein of each of the first leaf node and the second leaf node comprises a coherent optical receiver and an analog to digital converter configured to convert optical signals into digital signals and comprises signal quality correction circuitry comprising a receive digital signal processor, comprising:

a digital demodulator and a bits-to-symbol component configured to receive the digital signals from the coherent optical receiver and map each bit in the digital signals to a symbol in a constellation; and a processor configured to determine the signal quality of the digital signals using the symbols in the constellation and send correction signals comprising the signal quality to a hub processor of the hub node.

4. The method of claim 3, wherein each of the signal quality is quantified as a signal to noise ratio and each of the target signal quality is a target signal to noise ratio comprising a transmit signal to noise ratio of the leaf node plus a margin.

5. The method of claim 1, wherein the first optical signal has a first transmission optical power and the second optical signal has a second transmission optical power different than the first transmission optical power.

6. The method of claim 5, wherein the adjusting, by the first hub node, based on the first power update at least one of the first level of optical power to the fifth level of optical power and the second level of optical power to the sixth level of optical power adjusts the first transmission optical power; and adjusting, by the second hub node, based on the second power update at least one of the third level of optical power to the seventh level of optical power and the fourth level of optical power to the eighth level of optical power adjusts the second transmission optical power.

7. A method of signal optimization in a network, comprising:

continuously outputting, by a first hub node of two or more hub nodes, a first optical signal, the first optical signal comprising a first optical subcarrier group having a first level of optical power and a second optical subcarrier group having a second level of optical power different than the first level of optical power;

continuously outputting, by a second hub node of the two or more hub nodes, a second optical signal, the second optical signal comprising a third optical subcarrier group having a third level of optical power and a fourth optical subcarrier group having a fourth level of optical power different than the third level of optical power;

combining, by an optical coupler, the first optical signal and the second optical signal into a combined optical signal;

receiving, by a first leaf node of a plurality of leaf nodes, the combined optical signal;

determining, using signal correction circuitry of the first leaf node, a first signal quality of the first optical subcarrier group and a second signal quality of the second optical subcarrier group;

sending, by the first leaf node, the first signal quality and the second signal quality to the first hub node;

receiving, by a second leaf node of the plurality of leaf nodes, the combined optical signal;

determining, using signal correction circuitry of the second leaf node, a third signal quality of the third optical subcarrier group and a fourth signal quality of the fourth optical subcarrier group;

sending, by the second leaf node, the third signal quality and the fourth signal quality to the second hub node;

comparing, by the first hub node, the first signal quality to a first target signal quality and the second signal quality to a second target signal quality;

determining, by the first hub node, that the first signal quality is different than the first target signal quality or the second signal quality is different than the second target signal quality;

determining, by the first hub node, at least one of a first power adjustment of the first level of optical power and a second power adjustment of the second level of optical power;

sending, by the first hub node, at least one of the first power adjustment and the second power adjustment to a network controller;

comparing, by the second hub node, the third signal quality to a third target signal quality and the fourth signal quality to a fourth target signal quality;

determining, by the second hub node, that the third signal quality is different than the third target signal quality or the fourth signal quality is different than the fourth target signal quality;

determining, by the second hub node, at least one of a third power adjustment of the third level of optical power and a fourth power adjustment of the fourth level of optical power;

sending, by the second hub node, at least one of the third power adjustment and the fourth power adjustment to the network controller;

determining, by a controller processor of the network controller, that at least one of the first power adjustment, the second power adjustment, the third power adjustment, and the fourth power adjustment would negatively affect the combined optical signal;

updating, by the controller processor of the network controller, at least one of the first target signal quality to a new first target signal quality, the second target signal quality to a new second target signal quality, the third target signal quality to a new third target signal quality, and the fourth target signal quality to a new fourth target signal quality;

sending, by the controller processor of the network controller, the new first target signal quality and the new second target signal quality to the first hub node causing the first hub node to execute a first optimization cycle using the new first target signal quality and the new second target signal quality; and sending, by the controller processor of the network controller, the new third target signal quality and the new fourth target signal quality to the second hub node causing the second hub node to execute a second optimization cycle using the new third target signal quality and the new fourth target signal quality.

8. The method of claim 7, wherein each of the signal qualities is quantified as one of a signal to noise ratio, a bit error rate, a quality factor, mutual information, an error vector magnitude, and combinations thereof.

9. The method of claim 7, wherein a coherent optical receiver of each of the first leaf node and the second leaf node comprises a coherent optical receiver and an analog to digital converter configured to convert optical signals into digital signals and the signal correction circuitry further comprises a receive digital signal processor, comprising:

a digital demodulator and a bits-to-symbol component configured to receive the digital signals from the coherent optical receiver and map each bit in the digital signals to a symbol in a constellation; and a processor configured to determine the signal quality of the digital signals using the symbols in the constellation and send correction signals comprising the signal quality to a hub processor of the hub node.

10. The method of claim 9, wherein each of the signal quality is quantified as a signal to noise ratio and each of the target signal quality is a target signal to noise ratio comprising a transmit signal to noise ratio of the leaf node plus a margin.

11. The method of claim 7, wherein the first optical signal has a first transmission optical power and the second optical signal has a second transmission optical power different than the first transmission optical power.

12. The method of claim 11, wherein executing the first optimization cycle using the new first target signal quality and the new second target signal quality causes the first hub node of two or more hub nodes to adjust the first level of optical power of the first optical subcarrier group and the second level of optical power of the second optical subcarrier group; and executing the second optimization cycle using the new third target signal quality and the new fourth target signal quality causes the second hub node of two or more hub nodes to adjust the third level of optical power of the third optical subcarrier group and the fourth level of optical power of the fourth optical subcarrier group.

13. An optical network system, comprising:

two or more hub nodes, including a first hub node and a second hub node, the first hub node configured to continuously output a first optical signal, the first optical signal comprising a first optical subcarrier group having a first level of optical power and a second optical subcarrier group having a second level of optical power different than the first level of optical power, the second hub node configured to continuously output a second optical signal, the second optical signal comprising a third optical subcarrier group having a third level of optical power and a fourth optical subcarrier group having a fourth level of optical power different than the third level of optical power;

an optical coupler configured to combine the first optical signal and the second optical signal into a combined optical signal;

a plurality of leaf nodes including a first leaf node, a second leaf node, a third leaf node, and a fourth leaf node, each of the plurality of leaf nodes configured to receive the combined optical signal, the first leaf node having signal correction circuitry configured to determine a first received optical power of the first optical subcarrier group and a first signal quality of the first optical subcarrier group, the first leaf node configured to send a first correction signal comprising the first received optical power and the first signal quality to the first hub node, the second leaf node having signal correction circuitry configured to determine a second received optical power of the second optical subcarrier group and a second signal quality of the second optical subcarrier group, the second leaf node configured to send a second correction signal comprising the second received optical power and the second signal quality to the first hub node, the third leaf node having signal correction circuitry configured to determine a third received optical power of the third optical subcarrier group and a third signal quality of the third optical subcarrier group, the third leaf node configured to send a third correction signal comprising the third received optical power and the third signal quality to the second hub node, the fourth leaf node having signal correction circuitry configured to determine a fourth received optical power of the fourth optical subcarrier group and a fourth signal quality of the fourth optical subcarrier group, the fourth leaf node configured to send a fourth correction signal comprising the fourth received optical power and the fourth signal quality to the second hub node; and a network controller having a controller processor, the network controller configured to receive from the first hub node a first power optimization request comprising the first level of optical power of the first optical subcarrier group and the second level of optical power of the second optical subcarrier group from an optical transmitter of the first hub node and the first received optical power, the second received optical power, the first signal quality, and the second signal quality received from the first leaf node and the second leaf node, the network controller configured to receive from the second hub node a second power optimization request comprising the third level of optical power of the third optical subcarrier group and the fourth level of optical power of the fourth optical subcarrier group from an optical transmitter of the second hub node and the third received optical power, the fourth received optical power, the third signal quality, and the fourth signal quality received from the third leaf node and the fourth leaf node;

wherein the controller processor of the network controller is configured to:

determine a maximum transmission power value for each of the first and second optical subcarrier groups of the first hub node and the third and fourth optical subcarrier groups of the second hub node using the first received optical power, the second received optical power, the third received optical power, and the fourth received optical power;

compare the first signal quality to a first target signal quality, the second signal quality to a second target signal quality, the third signal quality to a third target signal quality, and the fourth signal quality to a fourth target signal quality;

determine a first power update for at least one of the first level of optical power of the first optical subcarrier group and the second level of optical power of the second optical subcarrier group of the first hub node when the first signal quality is different than the first target signal quality or the second signal quality is different than the second target signal quality, the first power update including at least one of a fifth level of optical power of the first optical subcarrier group and a sixth level of optical power of the second optical subcarrier group, and a second power update for at least one of the third level of optical power of the third optical subcarrier group and the fourth level of optical power of the fourth optical subcarrier group of the second hub node when the third signal quality is different than the third target signal quality or the fourth signal quality is different than the fourth target signal quality, the second power update including at least one of a seventh level of optical power of the third optical subcarrier group and an eighth level of optical power of the fourth optical subcarrier group of the second hub node, each of the fifth level of optical power and the sixth level of optical power being below the maximum transmission power value for each of the first and second optical subcarrier groups of the first hub node, and each of the seventh level of optical power and the eighth level of optical power being below the maximum transmission power value for each of the third and fourth optical subcarrier groups of the second hub node; and send the first power update including at least one of the fifth level of optical power of the first optical subcarrier group and the sixth level of optical power of the second optical subcarrier group to the first hub node and the second power update including at least one of the seventh level of optical power of the third optical subcarrier group and the eighth level of optical power of the fourth optical subcarrier group of the second hub node to the second hub node;

wherein the first hub node is configured to adjust, based on the first power update, at least one of the first level of optical power to the fifth level of optical power and the second level of optical power to the sixth level of optical power; and wherein the second hub node is configured to adjust, based on the second power update, at least one of the third level of optical power to the seventh level of optical power and the fourth level of optical power to the eighth level of optical power.

14. The optical network system of claim 13, wherein each of the signal qualities is quantified as one of a signal to noise ratio, a bit error rate, a quality factor, mutual information, an error vector magnitude, and combinations thereof.

15. The optical network system of claim 14, wherein each of the first leaf node and the second leaf node comprises a coherent optical receiver and an analog to digital converter configured to convert optical signals into digital signals, and comprises a signal quality correction circuitry further comprises a receive digital signal processor, comprising:

a digital demodulator and a bits-to-symbol component configured to receive the digital signals from the coherent optical receiver and map each bit in the digital signals to a symbol in a constellation; and a processor configured to determine the signal quality of the digital signals using the symbols in the constellation and send correction signals comprising the signal quality to a hub processor of the hub node.

16. The optical network system of claim 15, wherein each of the signal quality is quantified as a signal to noise ratio and each of the target signal quality is a target signal to noise ratio comprising a transmit signal to noise ratio of the leaf node plus a margin.

17. The optical network system of claim 13, wherein the first optical signal has a first transmission optical power and the second optical signal has a second transmission optical power different than the first transmission optical power.

18. The optical network system of claim 17, wherein the adjusting, by the first hub node, based on the first power update at least one of the first level of optical power to the fifth level of optical power and the second level of optical power to the sixth level of optical power adjusts the first transmission optical power; and adjusting, by the second hub node, based on the second power update at least one of the third level of optical power to the seventh level of optical power and the fourth level of optical power to the eighth level of optical power adjusts the second transmission optical power.

19. The optical network system of claim 13, wherein the network controller is cloud-based.

20. The optical network system of claim 13, wherein the network controller is connected to the first hub node and the second hub node via an electrical network connection.

\* \* \* \* \*